United States Patent [19]

Brooks

[11] Patent Number: 4,641,236

[45] Date of Patent: Feb. 3, 1987

[54] PROGRAMMABLE MACHINE TOOL CONTROL SYSTEM

[75] Inventor: John R. Brooks, Renton, Wash.

[73] Assignee: The Boeing Company, Seattle, Wash.

[21] Appl. No.: 731,291

[22] Filed: May 6, 1985

[51] Int. Cl.⁴ .............................................. G06F 15/46
[52] U.S. Cl. .................................... 364/171; 318/568;
364/192; 364/474
[58] Field of Search ............... 364/474, 475, 167–171,
364/188, 189, 191–193; 318/568

[56] References Cited

U.S. PATENT DOCUMENTS

| | | | |
|---|---|---|---|
| 3,648,244 | 3/1972 | McGee | 340/172.5 |
| 3,783,253 | 1/1974 | Anderson et al. | 364/171 X |
| 3,828,318 | 8/1974 | Bennett et al. | 340/172.5 |
| 3,975,622 | 8/1976 | Horn et al. | 235/151.1 |
| 3,976,981 | 8/1976 | Bowder | 340/172.5 |
| 4,021,651 | 5/1977 | Mitsuhashi et al. | 235/151.11 |
| 4,074,349 | 2/1978 | Veda | 364/171 X |
| 4,074,350 | 2/1978 | Roch et al. | 364/107 |
| 4,138,718 | 2/1979 | Toke et al. | 364/200 |
| 4,187,550 | 2/1980 | Ramos | 364/900 |
| 4,204,253 | 5/1980 | Van den Hanenberg et al. | 364/200 |
| 4,393,449 | 7/1983 | Takeda et al. | 364/171 X |
| 4,399,502 | 8/1983 | MacDonald et al. | 364/189 |
| 4,404,625 | 9/1983 | Saito et al. | 364/144 |
| 4,415,965 | 11/1983 | Imazeki et al. | 364/136 |
| 4,433,373 | 2/1984 | Miller | 364/171 |
| 4,437,150 | 3/1984 | Dahlgren, Jr. et al. | 364/474 |
| 4,437,152 | 3/1984 | Jones | 364/138 |
| 4,443,861 | 4/1984 | Slater | 364/900 |
| 4,445,182 | 4/1984 | Morita et al. | 364/171 X |
| 4,471,462 | 9/1984 | Kurakake | 364/900 |
| 4,477,754 | 10/1984 | Roch et al. | 364/171 X |
| 4,530,046 | 7/1985 | Munekata et al. | 364/171 X |

FOREIGN PATENT DOCUMENTS 2054909 7/1979 United Kingdom .

Primary Examiner—Joseph Ruggiero
Attorney, Agent, or Firm—Bruce A. Kaser

[57] ABSTRACT

An "open loop" programmable machine tool control system is provided for a microprocessor controlled machine (12). An operator control program is entered into the microprocessor from a control panel (10) by a machine operator standing along side the machine (12). The machine (12) is controlled by first setting motion limiter cams (82), and then entering the control program as a series of sequential steps. The program is entered by activating and/or deactivating certain machine function push buttons on the control panel. The microprocessor then executes the control program, displaying the program on the control panel during its execution. The control program is edited by displaying the control program step to be edited on the control panel, and then activating and/or deactivating machine function push buttons until only desired machine functions are displayed. The edited step is then reentered into the microprocessor.

10 Claims, 17 Drawing Figures

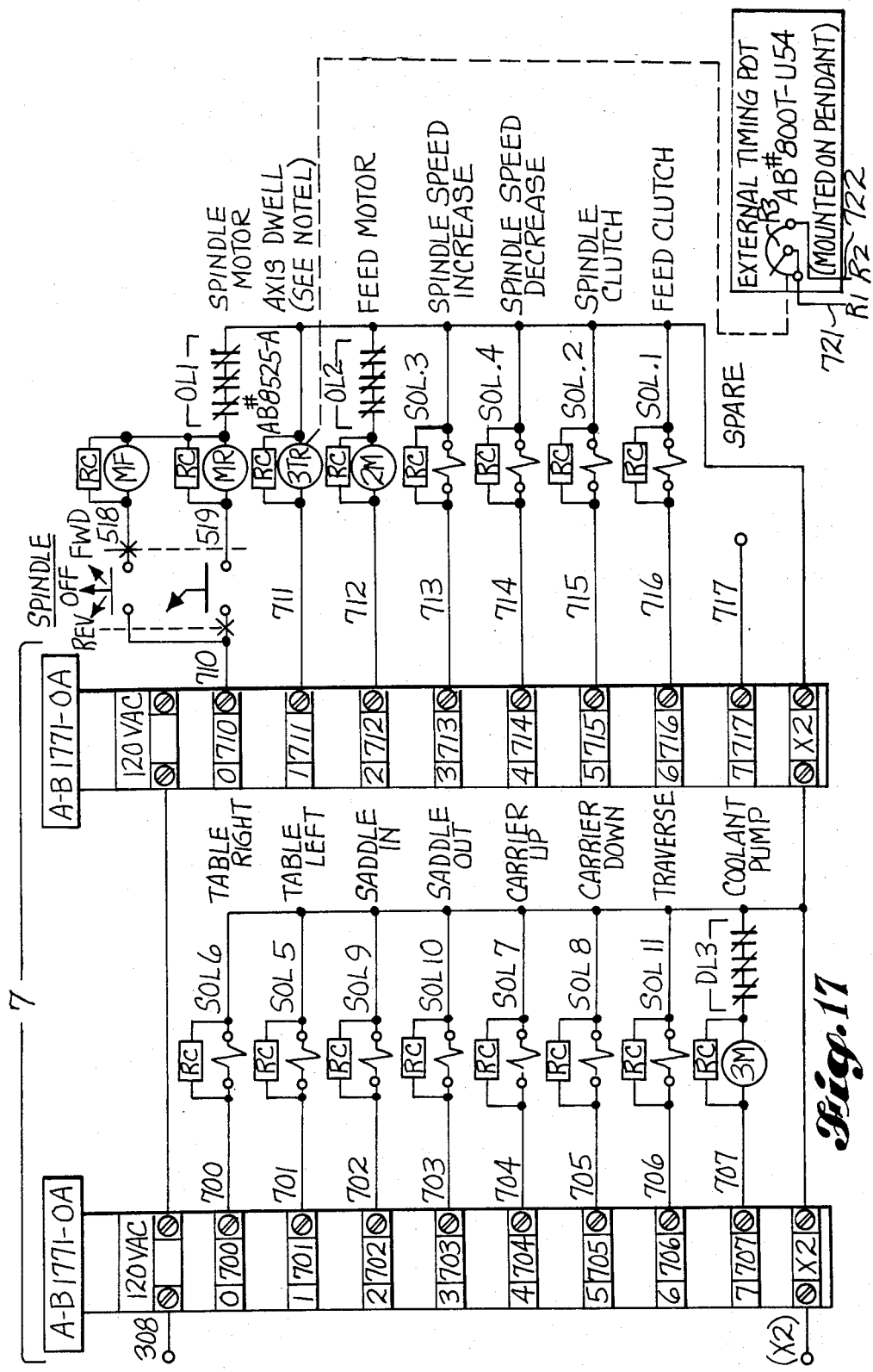

PROGRAMMABLE MACHINE TOOL CONTROL SYSTEM

DESCRIPTION

1. Technical Field

This invention relates generally to systems for controlling machine tools. More particularly, this invention relates to microprocessor controlled machine tools, wherein machine control commands are programed into a microprocessor by an operator working along side the machine.

2. Background Art

I. General Background

Control systems for operating machine tools have long been known in the art. Such systems, including certain types of numerical control systems which utilize microprocessors, and other systems of the manual program input control kind, have all undergone a continual evolution in their development. The development of numerical control systems, for example, is linked to the close marriage between numerical control and the use of microcomputer or microprocessor technology in the industrial arena.

One of the reasons for the development of machine control systems is that they provide the capability of boosting machine tool productivity. A machine that performs repetitive tasks must receive repetitive commands. Therefore, any type of automatic control system which can provide such commands will boost machine productivity by providing machine operation that is faster, less error prone, and in many cases cheaper than that which is provided by a human operator.

As a result of the advent of computer technology for industrial use, and in particular, the advent of microprocessor technology, industrial trends have been to automate machines by using numerical controls. Typically, however, numerical controls are expensive and tend to be used only in situations calling for high levels of sophisticated machine tool control. In situations calling for less sophisticated machine control, control systems of the manual program input type (which typically do not utilize microprocessors) have been found to be economically practical.

To be useful with respect to operating or controlling a machine tool, an automatic machine control system, be it a numerical system or a manual program input system, should have certain features. First, and of great importance, the system should be economical. Second, the system must be reliable and not subject to breakdown. Third, it is preferable that the system is adaptable for use on a wide variety of machines. In many instances, for example, control systems are typically designed and developed for use in connection with particular machines. Unfortunately, what this means is that a system tailored for use in association with one machine is not readily adaptable for use on other machines. Therefore, it should be appreciated that a system that is easily adaptable to many different machines would provide certain advantages over many currently existing control systems.

It goes without saying that a machine tool automatically operated by a control system will not be totally free from a certain amount of human control. Obviously, a certain amount of human participation is always required for such things as machine maintenance, which would include maintenance of the machine's control system. A certain amount of human input is also involved in providing a particular automatic control system with a set of instructions for operating a particular machine tool, and in changing such instructions when needed. In numerical control systems, for example, providing a set of operating instructions usually involves programming a microprocessor by entering into the microprocessor a complicated control program via magnetic tape or otherwise. The control program is typically designed or set up to operate the machine to produce a particular kind of part or to perform a desired series of operations. If it is desired to produce a different part or a different series of operations at a later time, then the microprocessor must be reprogrammed with a different control program. Such a task may be time consuming and could involve a high degree of skill on the part of the machine operator.

In at least one system of the manual input tape, wherein a microprocessor is not used, a machine operator inputs into the system machine control commands by means of programming pins which are plugged into industry standard printed circuit boards. The printed circuit boards are typically enclosed within a free standing electronic console located adjacent the machine. The circuit boards are constructed in a manner so that they provide a diode matrix having a certain number of rows and columns. Machine functions are programmed into the columns, and operator control program events or steps are programmed into the rows. The machine control program is actually developed or set up by physically inserting the programming pins into the circuit boards.

There are several problems associated with this latter system. One problem is that it is a time consuming task to insert programming pins into a circuit board. Often times several iterations are required before an acceptable machine control program is produced. Further, such an arrangement also makes it impossible to reprogram a particular control program without removing and reinserting all programming pins. Thus, a rather extensive and time consuming task may be involved even if it is desired to only slightly modify the control program. Still another problem associated with this system is that it has been found to be generally unreliable from a hardware standpoint. In spite of these problems, however, this type of system has been cheaper to implement than numerical control systems, at least for those machines not requiring a high degree of sophisticated control.

II. Relevant Prior Art

A person skilled in the art would realize that the last above-described system is used for the exclusive "open loop" control of a machine or machine tool. In such a system, machine functions are commanded by a control program which is input by means of, for example, the previously described peg and board system. Certain machine functions such as machine movements are limited by external limiting means, such as motion limiter switches. There is no communication or sensor feedback between the limiting means and the control program. At least within the knowledge of the applicant, no similar control system other than that disclosed herein has been designed and/or fabricated, wherein a standardly commercially available microprocessor is used for a similar kind of "open loop" control of machine functions.

There are many U.S. Patents which, to varying degrees, address a multitude of aspects relating to numerical control systems. An information disclosure statement has been included along with this application which includes several of those patents. Such patents are relevant since both they and the present invention utilize microprocessors for automatically controlling the operation of a machine. Of particular interest is U.S. Pat. No. 4,074,350 issued to Roch et al on Feb. 14, 1978.

It should be appreciated that many or most common machine tool control systems categorized as numerical control systems are characteristically a higher level of "closed loop" control system. Such systems employ the use of advanced microprocessors which are capable of providing a wide range of sophisticated machine tool control. The Roch patent, for example, is of this latter type. In the Roch system, a microprocessor is in continual communication with machine motion sensors and continually responds to feedback signals received therefrom.

To summarize, numerical control systems have not been economically practical with regard to the control of many machine tools. More specific to the instant case, such systems are not economically practical to replace the above-described peg and printed circuit board system. The invention described herein is therefore intended to serve as an economical substitute for that system.

3. Disclosure of the Invention

The present invention provides a means for the "open loop" control of a milling machine, or the like, whose functions are operated by a microprocessor. Practice of the invention involves preprogramming the microprocessor to operate the machine in accordance with an operator control program. The control program is entered into the microprocessor by a machine operator standing along side the machine. A control panel is provided for this purpose.

The control panel has a plurality of machine function controls which correspond to desired machine functions. Such functions may, for example, include certain machine movements and certain work operations such as the operation of a milling tool or the application of a coolant to a milling tool. The machine has motion limiter means which sets certain limitations on machine movements.

The operator enters the control program from the control panel by performing a series of sequential steps. First, the operator activates at least some of the controls on the panel which correspond to certain desired machine functions. Those activated controls are displayed on the panel after they have been activated. Then, the machine functions corresponding to the activated controls are entered into the microprocessor, wherein such entry makes up one step of the operator control program. Subsequently, additional steps are sequentially entered into the program in the same manner.

After the control program is entered, it is then run or executed by the microprocessor. The microprocessor executes each step of the program in sequence. A step that includes a movement function is executed by moving the machine in the direction commanded during that step, with the microprocessor being responsive to the motion limiter means so that machine movement is stopped at a certain position set by the motion limiter means. The microprocessor executes a step that includes a work operation function by causing the machine to perform such operation during the step, with the microprocessor continuing such operation until it is cancelled in a subsequent step of the control program.

While the operator control program is being executed, each step of the program is displayed on the control panel. This means that all machine functions of each step are displayed while they are actually being performed by the machine.

In preferred form, the control panel is provided with a plurality of machine function controls which are in the form of a plurality of push buttons. Some push buttons correspond to certain desired machine movements, and other push buttons correspond to certain desired machine work operations. Each push button is illuminated with light when it is activated. Further, each illuminated push button is extinguished when its associated machine function is entered into the microprocessor as a step of the control program. In accordance with what was stated above, when the microprocessor executes the control program, push buttons corresponding to machine functions executed during a particular step are illuminated while such step is performed by the machine.

The practice of the invention also includes providing machine function controls for inputting a subcycle operation into the operator control program. A subcycle operation permits the microprocessor to repeatedly execute certain preselected steps of the control program. A subcycle limiter means is provided for setting limitations on machine movements and operations when a subcycle operation is performed by the machine. The microprocessor is responsive to the subcycle limiter means to cancel a particular subcycle operation in accordance with the limits set thereby.

A dwell time may be provided in between each step of the operator control program during its execution. Further, the operator control program can be manually overrode by a machine operator so as to permit the operator to directly control machine functions independently of the control program.

An advantage to the present invention is that it permits a machine operator to easily edit the control program while standing along side the machine. To edit the program, the operator need only first select the program step which is to be edited. That step is then displayed on the control panel, wherein the push buttons associated with the machine functions of the step are illuminated on the control panel. Then, the step is edited by activating and/or deactivating appropriate push buttons so that certain desired machine functions may replace at least some of the functions originally entered into the step. After this is done, only desired machine functions are displayed on the control panel. The edited step is then reentered into the microprocessor at the same place in the control program that it was in prior to editing. Having this capability provides a definite advantage in that an operator can edit a microprocessor controlled machine without having a great deal of knowledge or expertise.

An associated advantage of the present invention is that if the invention is to be used to produce a certain part, an operator control program can be developed, meaning that it can be completed and tested, in an estimated 1/20 of the time formerly required using such previous methods as the above-described pin and circuit board method. Programming of this system can be simply accomplished by first setting the motion limiter means and then selecting and depressing the appropriate push buttons associated with desired machine functions. The operator can make a "dry run" of the program from the control panel without actually operating the machine.

Another advantage of the present invention is that it provides the capability for the operator to stop execution of the control program at any time. In addition, the invention also provides the operator with the capability of manually overriding the program at any time to directly control the machine.

These advantages and other advantages will become apparent to the reader upon consideration of the subsequent portions of this patent application.

BRIEF DESCRIPTION OF THE DRAWING

In the drawings, like descriptive and reference numerals and letters refer to like parts throughout the various views, and wherein:

FIG. 17 is a view much like FIGS. 10-16, but shows still another input/output module group of the microprocessor, wherein certain bit addresses are shown associated with certain solenoid switches for operating machine movement drive valves.

BEST MODE FOR CARRYING OUT THE INVENTION

Figure 1:
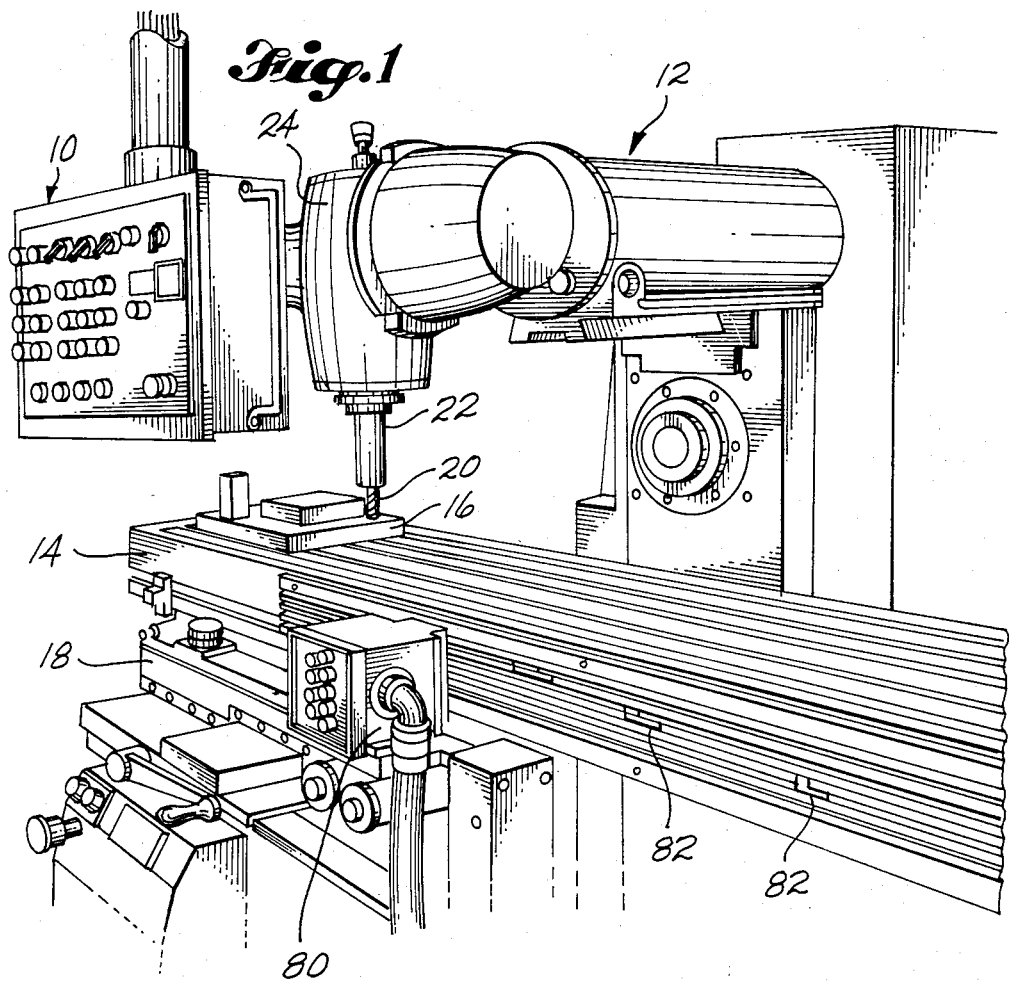
FIG. 1 is a pictorial view of a milling machine and a control panel to be used in connection with the present invention.

Referring now to FIG. 1, there is shown a preferred embodiment of the invention as applied for use in connection with the operation of a Cincinnati Verci-power milling machine. A control panel 10 is pendantly mounted adjacent the milling machine 12. The milling machine 12 includes a table portion 14 upon which a workpiece 16 may be placed. The workpiece 16 may be fixed in position on the table 14 by a clamp or other suitable means. The table 14 may be moved from right to left or left to right by an electric or hydraulic motor, which is not shown in the drawings. The table 14 rests upon a saddle portion 18 which is slidably mounted to the machine 12 for inward and outward movement. Such inward and outward movement is controlled by another hydraulic motor, which is also not shown in the drawings.

Movement of the table 14 and the saddle 18 permits two degrees of freedom of movement for positioning the workpiece 16 relative to a machine tool 20. The machine tool 20 is connected to a machine spindle 22. The spindle 22 drives the machine tool 20 in rotation for performing a milling operation on the workpiece 16. The machine 12 also includes a carrier portion 24 which houses a mechanism for vertically moving both the spindle 22 and the machine tool 20 upwardly and downwardly.

The machine 12 as thus described can therefore perform basically three movements for positioning the workpiece 16 relative to the machine tool 20. By moving either the table 14 or the saddle 18, the workpiece 16 can be moved left or right and inwardly or outwardly. The carrier portion 24 moves the machine tool 20 upwardly or downwardly. The machine 12 as described is typical in construction and would be well-known to a person skilled in the art.

During typical operation of the machine 12, the machine will be automatically operated by a suitable microprocessor, such as an Allen-Bradley PLC-2/15 programmable logic controller. Such microprocessor may be placed in any suitable location near the machine 12 and is not shown in the drawings. In addition to automatic operation, the machine 12 may also be manually controlled. Both automatic and manual control are accomplished by commands entered on the control panel 10. The description of the invention provided herein will first pertain to the automatic control of the machine 12, which will be followed by a description of manual control.

Figure 2:
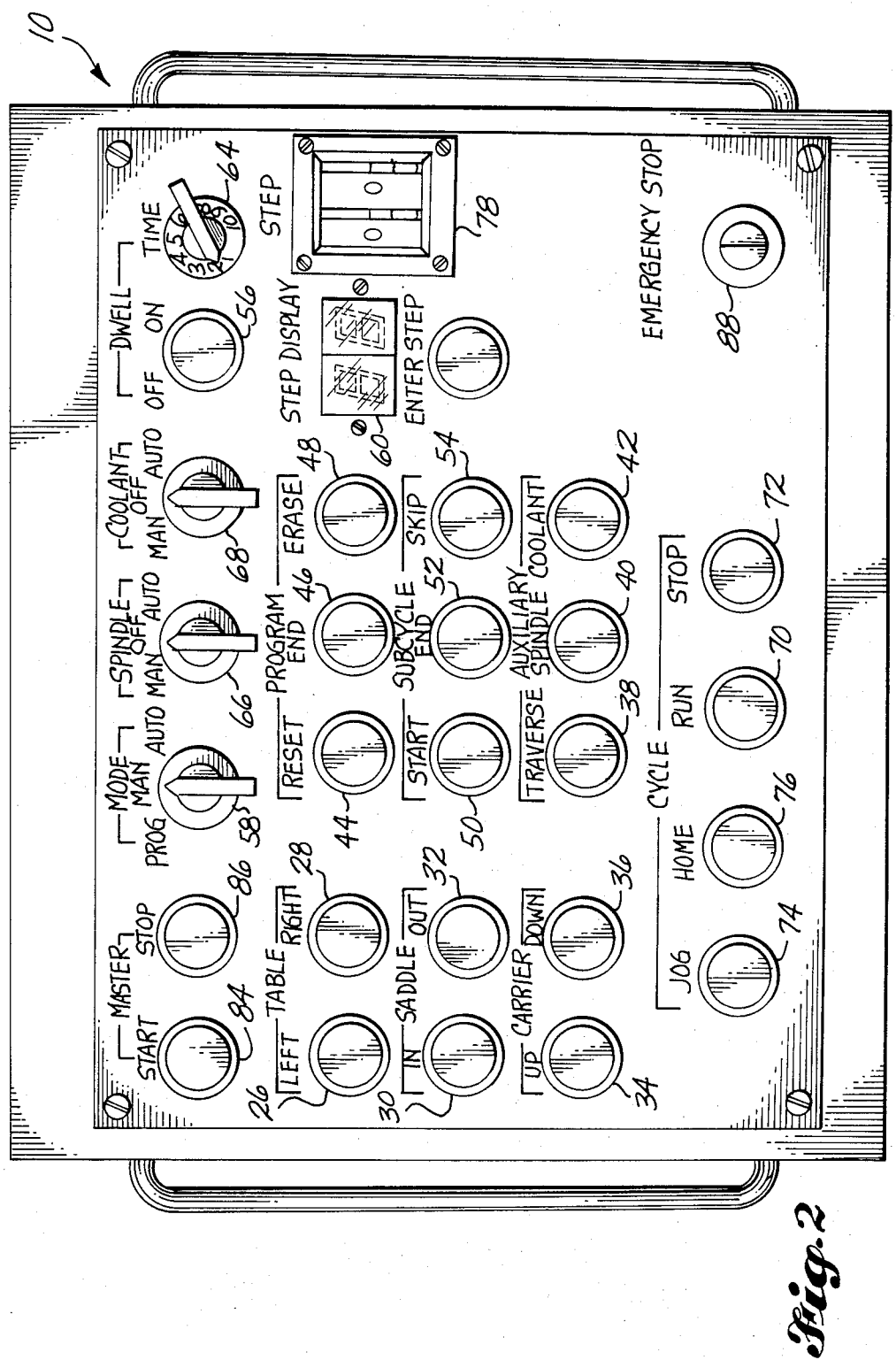
FIG. 2 is a front view of the control panel shown in FIG. 1, and shows various push buttons and switches associated with a preferred embodiment of the programmable control system of the present invention.

The control panel 10 includes a plurality of push buttons which corresponds to a variety of desired machine functions as shown in FIG. 2. In preferred form, and with specific application to the Cincinnati Vercipower machine 12, sixteen machine functions may be entered into the microprocessor from the control panel 10 as an operator control program. Of these functions, six relate to basic machine movements for positioning the workpiece 16 relative to the machine tool 20. For example, two push buttons 26, 28 correspond to entering control commands for causing the table 14 to move left or right, respectively. Two push buttons 30, 32 provide similar commands for moving the saddle 18 inwardly or outwardly. Similarly, two other push buttons 34, 36 correspond to moving the mechanism in the carrier portion 24 for moving the machine tool 20 upwardly and downwardly.

Other machine functions which can be commanded from the control panel 10 include a machine tool traverse button 38, a spindle on/off button 40, and a coolant on/off button 42. These buttons respectively correspond to machine traverse operations, turning the spindle 22 on or off for governing rotation of the machine tool 20, and supplying coolant to the machine tool 20 as it operates on the workpiece 16. The structure associated with supplying coolant to the machine tool 20 is not shown in the drawings. A person skilled in the art would, however, be familiar with such structure.

The nine functions thus described are basically machine movement and work operation functions pertaining to either desired machine movements or machine work operations which are to be performed on the workpiece 16. The remaining seven functions on the control panel 10 pertain to inputting desired machine movement and work operation functions into the microprocessor as part of the operator control program. For example, a reset button 44 is provided for "clearing" the microprocessor to receive the operator control program. A program "end" button 46 signals the microprocessor that the entire operator control program has been entered. If it is desired to erase a particular control program, this can be done by activating the erase push button 48.

If it is desired to repeat a series of machine movement or work operation functions, such functions may be entered as a subcycle portion of the control program. Subcycle start, end, and skip buttons 50, 52, 54 are provided for this purpose.

Machine functions in the control program are received, processed, and executed or run by the microprocessor as a series of sequential steps. A dwell function, corresponding to push button 56, provides a dwell time, if desired, between each step. The dwell function button 56 will be further explained later.

The sixteen functions relating to the various aspects of the operator control program therefore include two table movements, two saddle movements, two carrier movements, three program functions, three subcycle functions, three auxiliary functions (which may be used for further expansion), and one dwell function. The way these various functions are used as part of the operator control program will become apparent after the following description of how a typical operator control program is entered into the microprocessor.

Figure 3:
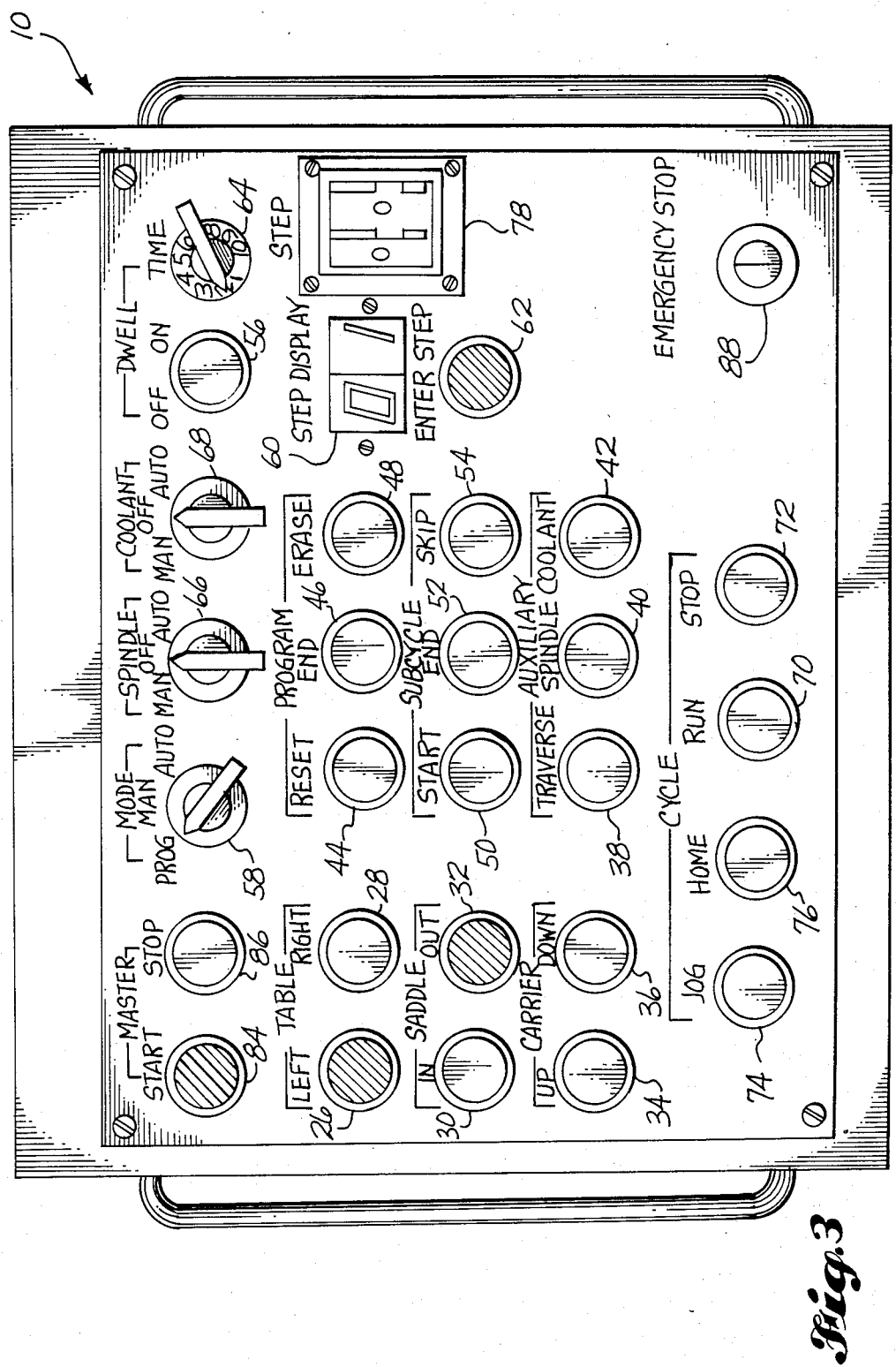
FIG. 3 is a view like FIG. 2, but shows the activation of various push buttons and switches on the control panel, and specifically, this Fig. shows the entering of a first step of an operator control program.

Before the operator control program is entered into the microprocessor, the mode selector switch 58 must first be placed in the program mode position as shown in FIG. 3. The program mode switch 58 determines whether the machine 12 is to be operated automatically, manually, or whether a control program is to be entered into the microprocessor. After the mode selector switch is placed in the program position, the operator control program may then be entered. This is accomplished by activating the appropriate buttons corresponding to desired machine functions. If a machine operator desires to enter a new control program, he would first activate the program reset button 44. After this button has been activated, a step display window 60 would show a one, indicating that the first step of the control program can be entered. The operator then enters desired machine functions for the first step of the program. For example, assume that as a first step the operator wishes to reposition the workpiece 16 relative to the machine tool 20 by moving the table left and moving the saddle out. To accomplish this, the operator would activate the table left button 26 and the saddle out button 32 in the manner shown in FIG. 3. The operator would then enter these functions as the first step of the control program by activating the step enter button 62. After activating this last button, table left and saddle out commands are entered into the microprocessor, and the step display window 60 shows the next sequential step which would be step two. Desired machine functions for step two can then be entered.

When the microprocessor executes the control program, it executes step one as described above by causing the motors which operate the table 14 and the saddle 18 to simultaneously move the table left and the saddle out. Such movements are limited by motion limiter switches located adjacent the table 14 and saddle 18. Movement of the mechanism in the carrier portion 24 upwardly or downwardly is also limited by motion limiter switches. These switches will be further described later.

Figure 4:
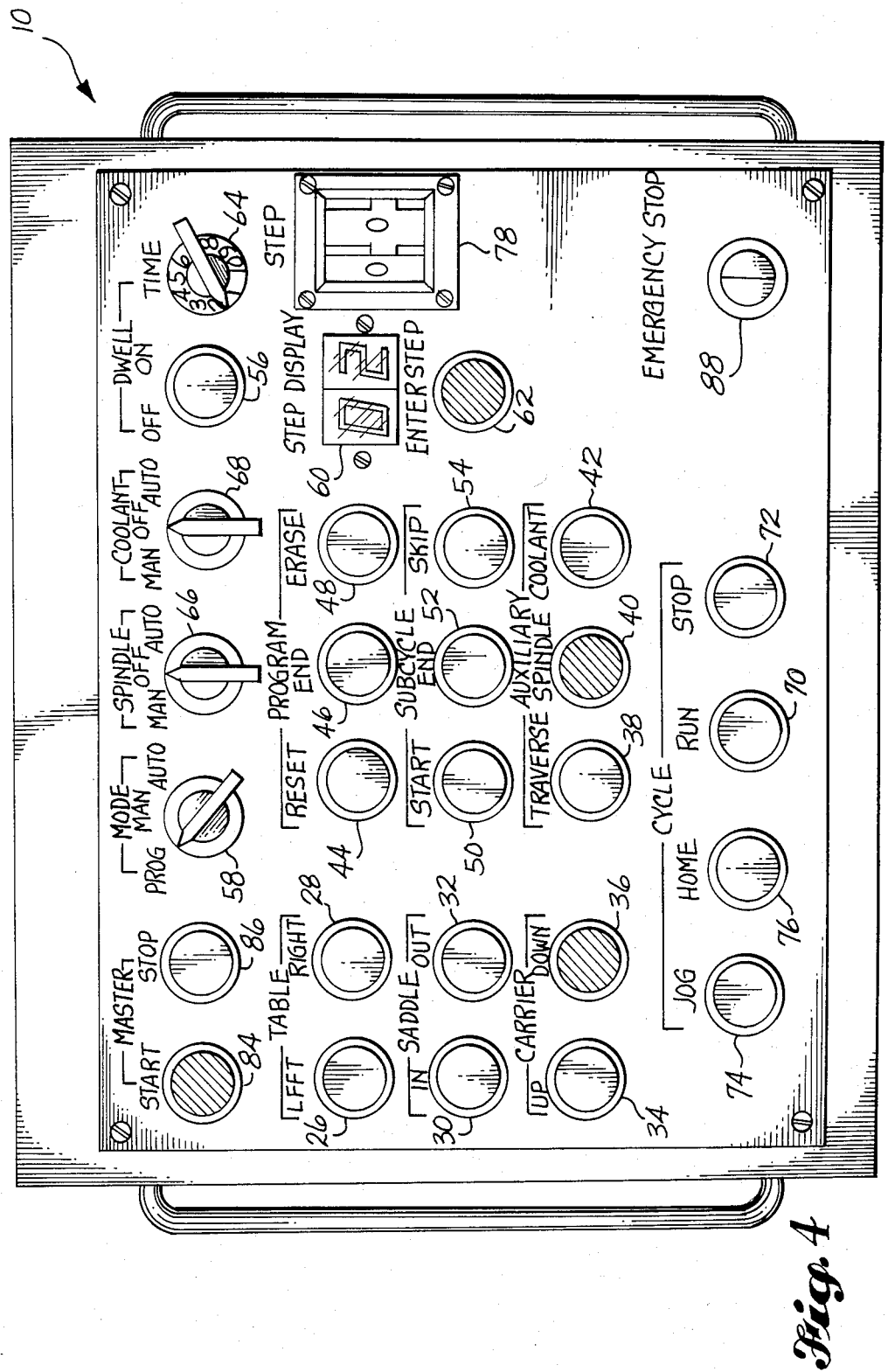
FIG. 4 is a view much like FIG. 3, but shows the entering of a second step into the operator control program.

In preferred form, a total of 99 sequential steps may be entered into the microprocessor as part of the operator control program. Therefore, after entering the first step as described above, the operator more than likely will enter subsequent steps. For example, as a second step, the operator may wish to move the carrier down and turn on the spindle 22 to perform a work operation on the workpiece 16. This can be accomplished by activating the carrier down button 36 and the spindle button 40, and then entering such step into the microprocessor in the manner shown in FIG. 4.

In a subsequent step, i.e., step three, the operator may wish to move the carrier up, meaning that the machine tool 20 may, for example, move away from the workpiece 16, and the operator may also wish to apply coolant to the machine tool 20. To accomplish this, and referring now to FIG. 5, the operator merely activates the carrier up button 34 and the coolant button 42. These functions are then entered into the microprocessor as step three in the manner shown.

Figure 5:
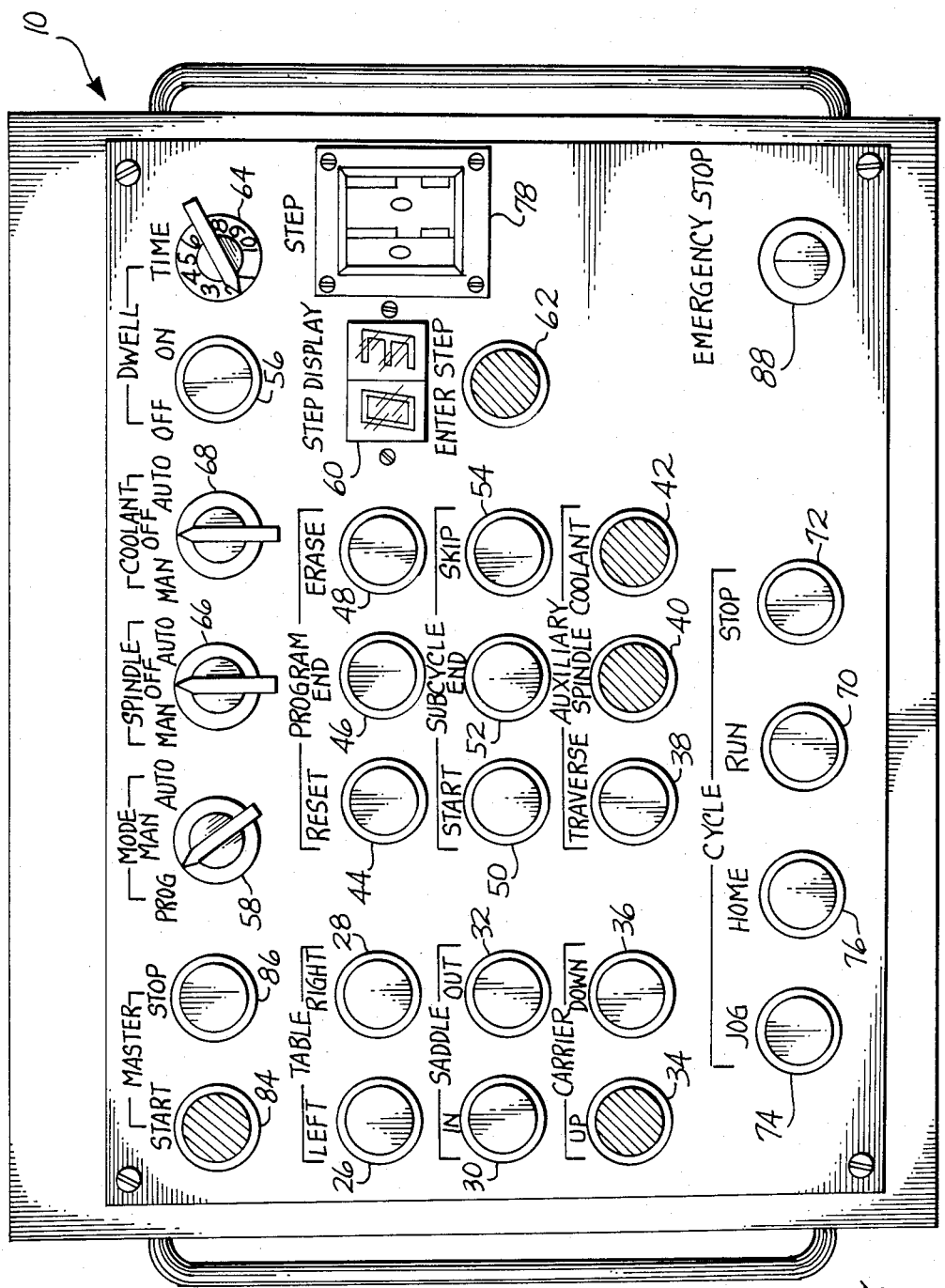
FIG. 5 is a view much like FIGS. 3 and 4, but shows the entering of a third step into the operator control program.

The machine traverse, spindle and coolant functions corresponding to push buttons 38, 40, 42 are deemed to be auxiliary machine functions. If any one of these buttons are activated during a particular step of the control program, they will remain activated until they are deactivated in a subsequent step. Therefore, as shown in FIG. 5, since the spindle was turned on during step two, it remains in an on condition during step three. Likewise, it remains in an on condition during subsequent steps of the control program until spindle push button 40 is deactivated during a subsequent step. Further, the coolant push button 42 remains activated and coolant is supplied to the machine tool 20 during subsequent control program steps, until the coolant button is deactivated.

Figure 6:
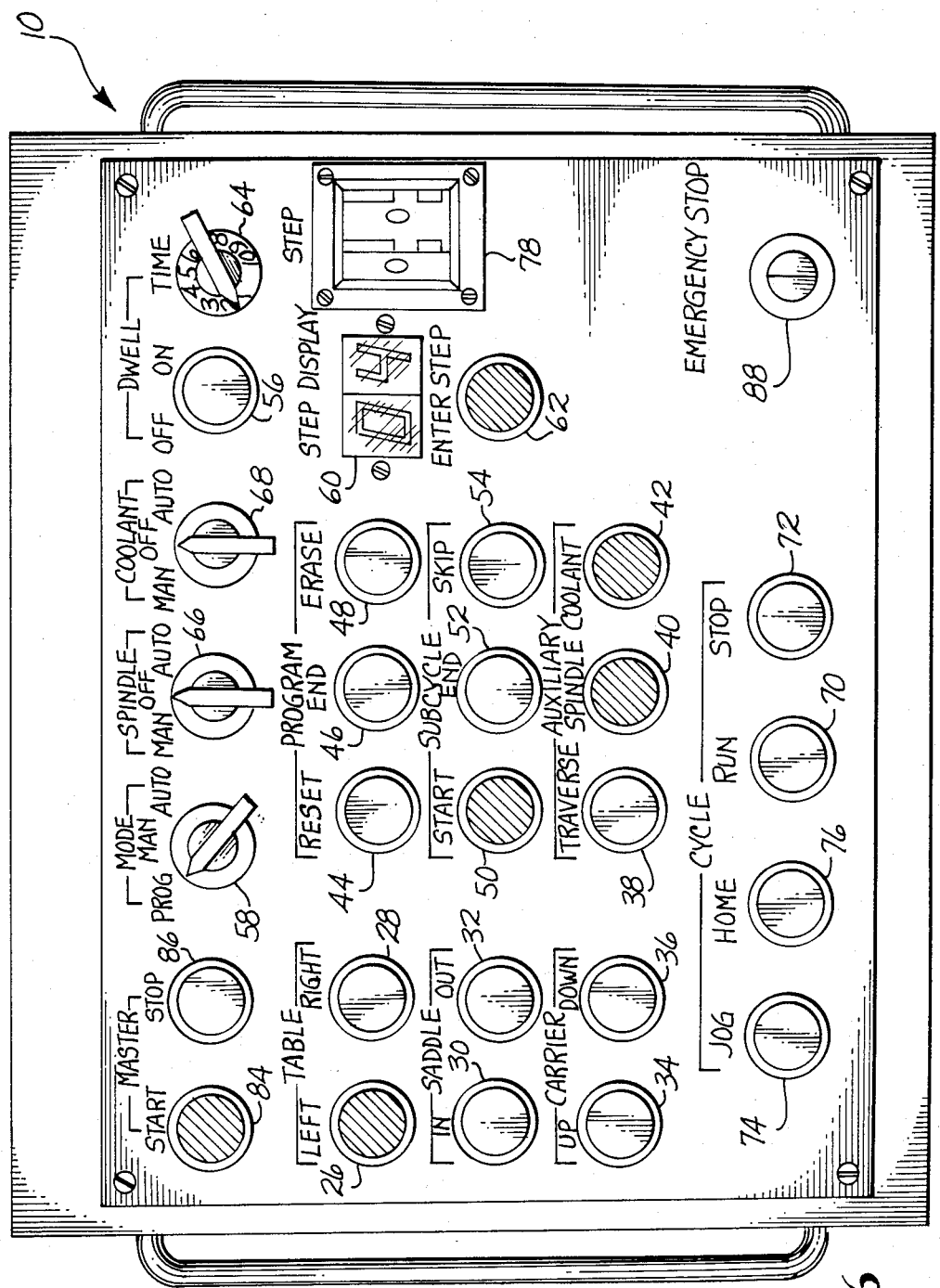
FIG. 6 is a view much like FIGS. 3-5, but shows the entering of a fourth step into the operator control program.

Suppose, for instance, it is desired to repeat a sequence of machine functions. By way of example, suppose it is desired to repeat the following sequence of machine functions: table left, saddle in, table right, and saddle out. It should be appreciated that this sequence of movements would cause the workpiece 16 to move in a square relative to the machine tool 20. This series of functions could be repeated by entering them as a subcycle into the control program. Referring now to FIG. 6, the entering of the first step of such subcycle is shown therein.

The operator first depresses the subcycle start button 50. Then the table left button 26 is activated corresponding to the first leg of the desired square movement. This step is entered as step four. It should be noted that the spindle and coolant buttons 40, 42 were left on from step three. The saddle in, table right and saddle out functions can then be entered as steps five, six, and seven, respectively. In step seven, the subcycle end button 52 would be activated. This is not shown in the drawings, however.

When the microprocessor executes the control program, steps four through seven would be continuously repeated causing the desired square movement until the triggering of a subcycle motion limiter switch. As thus described, the spindle 22 and coolant supplied to the machine tool 20 would remain on during such subcycle operation.

After the operator has entered all desired steps of a particular control program, the program end button 46 is activated. This indicates to the microprocessor that the entire program has been entered from start to finish.

With the above description, the ease of entering a control program into the microprocessor should be apparent. Except for the dwell and skip functions corresponding to buttons 56 and 54, all machine functions as they relate to the basic aspects of any particular control prorgram have now been described. The dwell function may be entered during any step of a control program by merely activating button 56. The amount of desired dwell time is governed by setting a timer switch 64. In preferred form, any dwell time in a range from zero to ten seconds may be set.

The skip function, corresponding to button 54, is utilized during the actual execution of the operator control program and will be further described.

Figure 7:
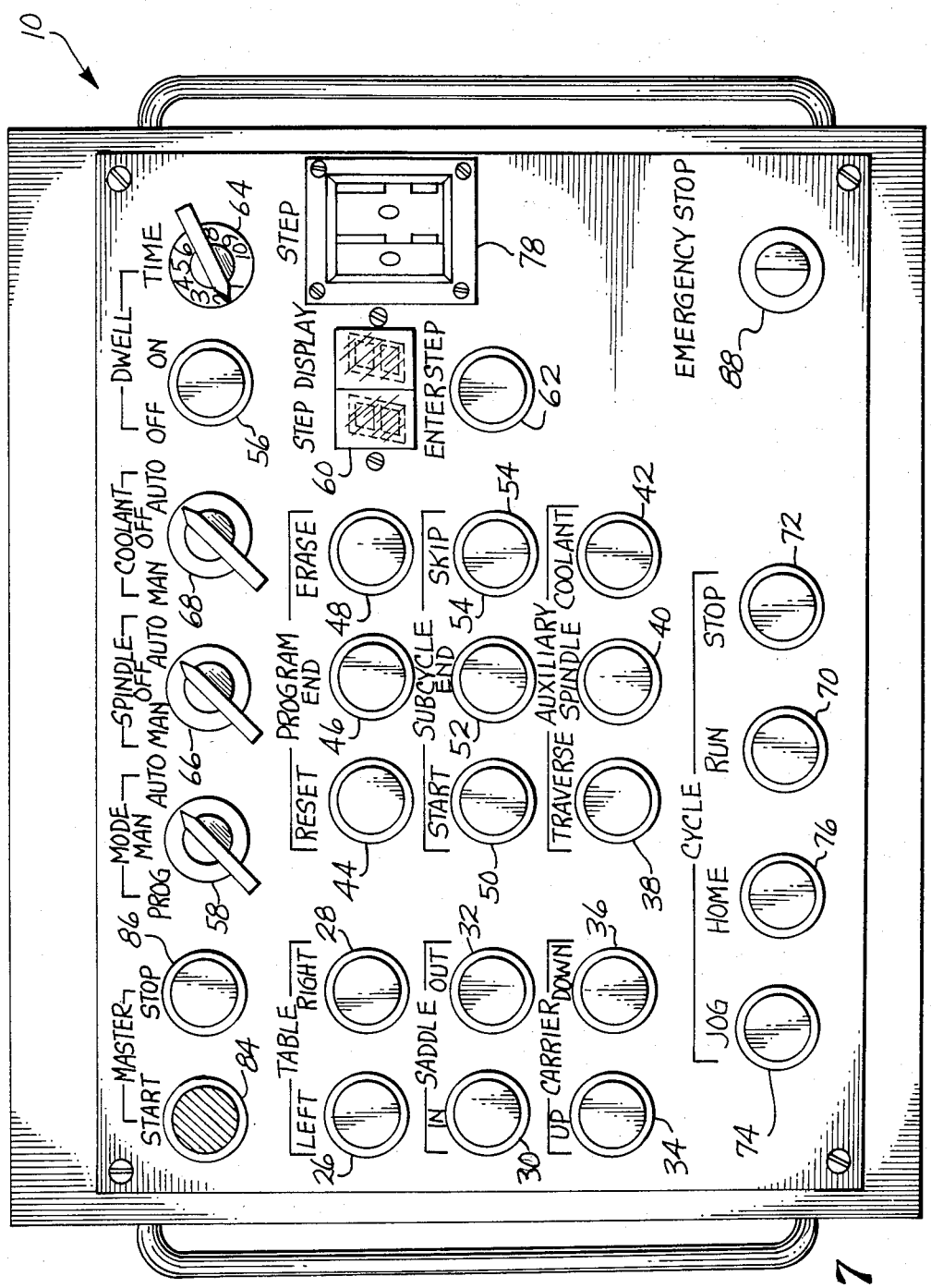
FIG. 7 is a view much like FIGS. 3-6, but shows the positions of switches on the control panel when the operator control program is executed by a microprocessor in the system of the present invention.

After the program is entered, it is then ready to be executed or run by the microprocessor. To accomplish this, the mode switch 58 must be moved to the automatic position as shown in FIG. 7. A spindle selector switch 66 and a coolant selector switch 68 must also be turned to the automatic position shown in FIG. 7. The spindle and coolant selector switches 66, 68 have three positions corresponding to manual, off, and automatic modes. Operation of spindle and coolant during the manual mode will be described later. However, the off mode overrides any automatic or manual operation. In nother words, as long as the spindle and coolant selector switches 66, 68 remain in the off position, there can be no spindle or coolant operation, even if commanded by the operator control program.

Once the mode selector switch 58, the spindle selector switch 66, and the coolant selector switch 68 are moved to the automatic position, then the operator control program can be executed or run by activating the run push button 70. At that time, the microprocessor executes each sequential step of the control program from the first to the last. If a subcycle operation is in the program, the operator can cancel such subcycle at any time during its operation by activating the skip push button 54. Similarly, execution of the program can be terminated at any time by activating the stop push button 72.

The various push buttons on the control panel 10 are back lighted for illuminating them when they are activated for the purpose of entering steps of the operator control program. Further, the push buttons corresponding to machine functions executed by the microprocessor during a particular control program step are also illuminated during such execution. In this manner, the machine operator can monitor machine operation and execution of the control program by merely viewing the push buttons on the control panel.

The control panel 10 includes four cycle buttons 70, 72, 74, 76, which correspond to various cycles that may be commanded during either automatic or manual operation of the machine 12. The run and stop buttons 70, 72 have already been described with regard to their purpose in executing the operator control program. Such buttons, along with a jog button 74 and a home button 76 may also be used in connection with manual operation of the machine, which will now be described.

To operate the machine 12 manually, the mode selector switch 58 must first be placed in the manual position shown in FIG. 2. Similarly, if it is desired to manually operate either the spindle 22, or supply coolant to the machine tool 20, then the spindle and coolant selector switches 66, 68 must also be placed in the manual position. This is not shown in the drawings, however.

The manual operation mode permits the machine operator to directly operate or control any of the nine machine movement and auxiliary functions previously described. If, for example, the operator desires to move the table left it is only necessary that he first activate the table left button 26, and then activate or depress the jog button 74. The table would move left within the physical constraints of the machine as long as the jog button 74 remained depressed. In a similar fashion, the table could be moved right, and the saddle and mechanism in the carrier portion 24 could also be moved.

If the machine operator so desires, he could manually execute more than one machine function at the same time in a manner similar to executing a single step of the automatic operator control program. This can be accomplished by activating those push buttons corresponding to desired machine functions, and then activating the run push button 70. The machine would then perform the desired functions. Such functions could be terminated, however, at any time by activating the stop push button 72.

In either the manual or program mode, an operator may desire to move the table 14, the saddle 18, or the mechanism in the carrier portion 24 to a "home" position. This can be accomplished by selecting the necessary movement functions on the control panel 10 and then activating the home cycle push button 76.

An advantage to the present system is that an operator control program can be edited in an easy manner after it has been entered into the microprocessor. To edit a particular program, the operator must first select the "program" position with the mode selector switch 58 and then depress the cycle run button 70. The particular program step to be edited may be selected by turning a set of thumb wheel switches 78 on the control panel. The step display window 60 will show the step corresponding to the number selected by the thumb wheel switches 78 and those push buttons corresponding to the machine function previously programmed in that step will then be illuminated. The selected step can be modified by depressing the "cycle stop" button 72 and then selecting new functions and/or deactivating other functions previously activated. After the operator has finished editing, the desired functions in the step are displayed on the control panel since their respective push buttons are illuminated. The operator then enters the edited step into the microprocessor by activating the step enter button 62.

Other steps in the operator control program may be edited in the same manner as that which was described above. The machine operator need only first depress the cycle run button 70 and then display the step to be edited by turning the thumb wheel switches 78 on the control panel. In all instances, to edit a step the cycle run 70 must first be terminated by operating the cycle stop button 72. After the cycle stop button 72 is depressed, the panel 10 will continue to display the step selected by means of turning the thumb wheel switches 78. At that point, the step can be modified and reentered into the microprocessor. After entry of the edited step, the step display window 60 displays the step number of the next sequential step after the edited step. At his option, the operator may similarly edit any number of steps in the operator control program.

The control panel 10 also includes master start and stop buttons 84, 86. These buttons turn the system on or off, respectively. Also included in the system is an emergency stop switch 88, which can be used to terminate operation of the machine 12 irregardless of whether the machine is being operated automatically or manually.

As was mentioned previously, the chief advantage to the present invention is that it can be easily used by a relatively unskilled operator. If an operator was to set up a control program for working on a particular workpiece, he would first set appropriate motion limiter switches for limiting the various machine movements commanded from the control panel 10. Suitable limiter switches to be applied in connection with the present invention are well-known in the art. Referring back to FIG. 1, there is shown a typical embodiment of a motion limiter switch box 80 positioned adjacent the machine table 14. In the preferred embodiment of the system described herein, the switch box 80 includes nine motion limiter switches corresponding to two table left movements, two table right movements, two table overtravel movements, table movement during a subcycle operation, a table home movement, and an auxiliary limiter switch which may be used for expansion purposes.

The motion limiter switches in box 80 are triggered by cams or dogs 82 mounted to the side of the table 14. There is a separate triggering lug 82 for each table left, right, overtravel, subcycle, and home movement. The switch box 80, including the motion limiter switches contained therein, and the switching cams would all be familiar to a person skilled in the art. Such apparatus is standardly used in connection with the aforementioned Cincinnati Verci-power milling machine, for example.

A similar set of motion limiter switches are used for both the movement of the saddle 18 and movement of the mechanism in the carrier portion 24. Such switches are not shown in the drawings, as they would be familiar to a person skilled in the art.

With respect to saddle movement, nine motion limiter switches may be used; two each for inward and outward movement of the saddle, two for saddle overtravel, one for a home movement, and one for a subcycle operation. A saddle auxiliary switch is also included for future expansion.

Similar to the switches for both the table 14 and the saddle 18, nine motion limiter switches may be provided for movement of the mechanism in the carrier portion 24. Three of such switches relate to carrier down movements, one switch relative to a carrier up movement, two switches relate to carrier up and down overtravel, and two other switches relate to a carrier subcycle operation and a carrier home movement, respectively, with a last switch being provided as an auxiliary for future expansion.

Figure 8:
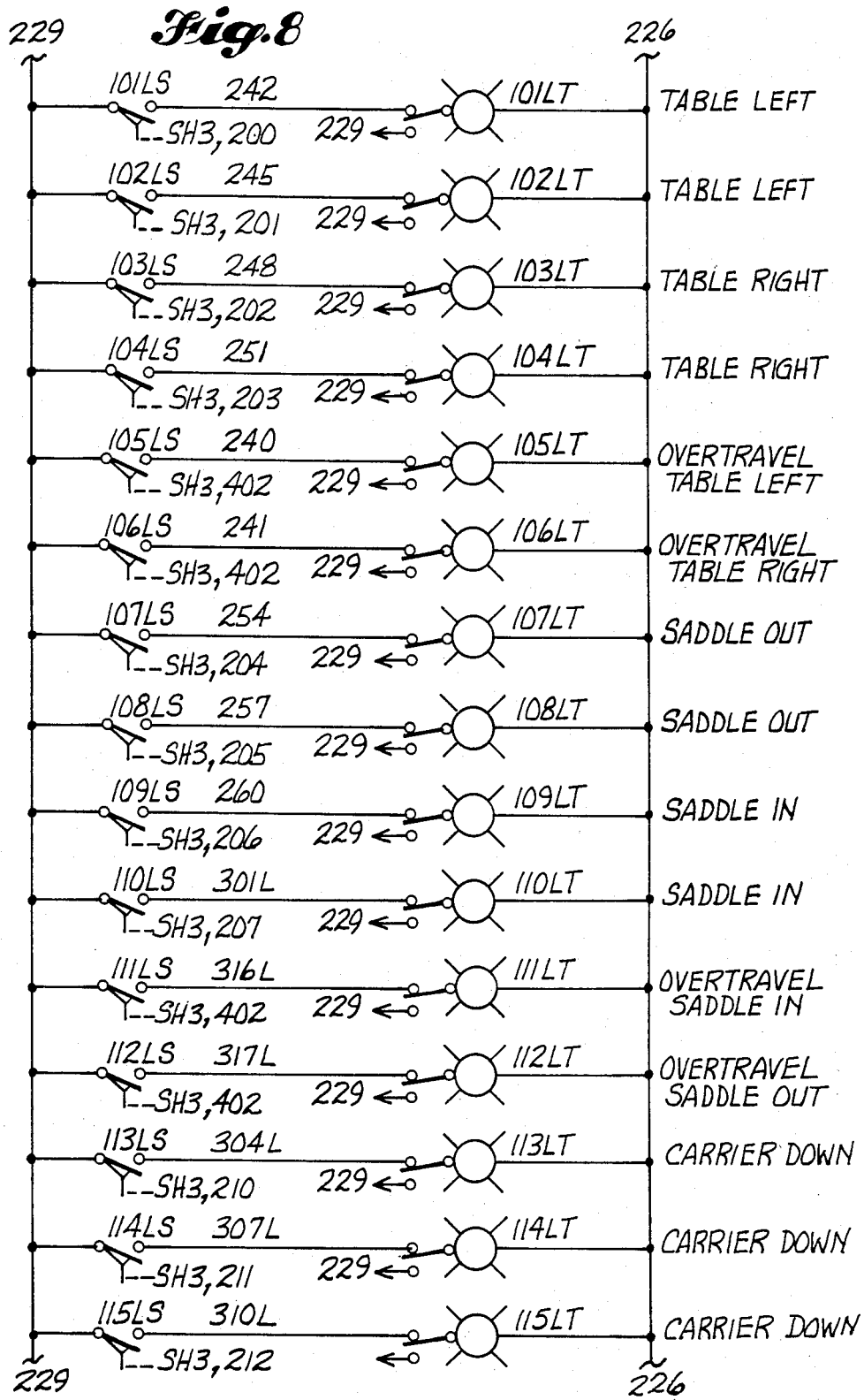
FIG. 8 is a schematic view showing the wiring connections between various motion limiter switch indicator lamps, and associated machine movements as practiced in a preferred embodiment of the present invention.
Figure 9:
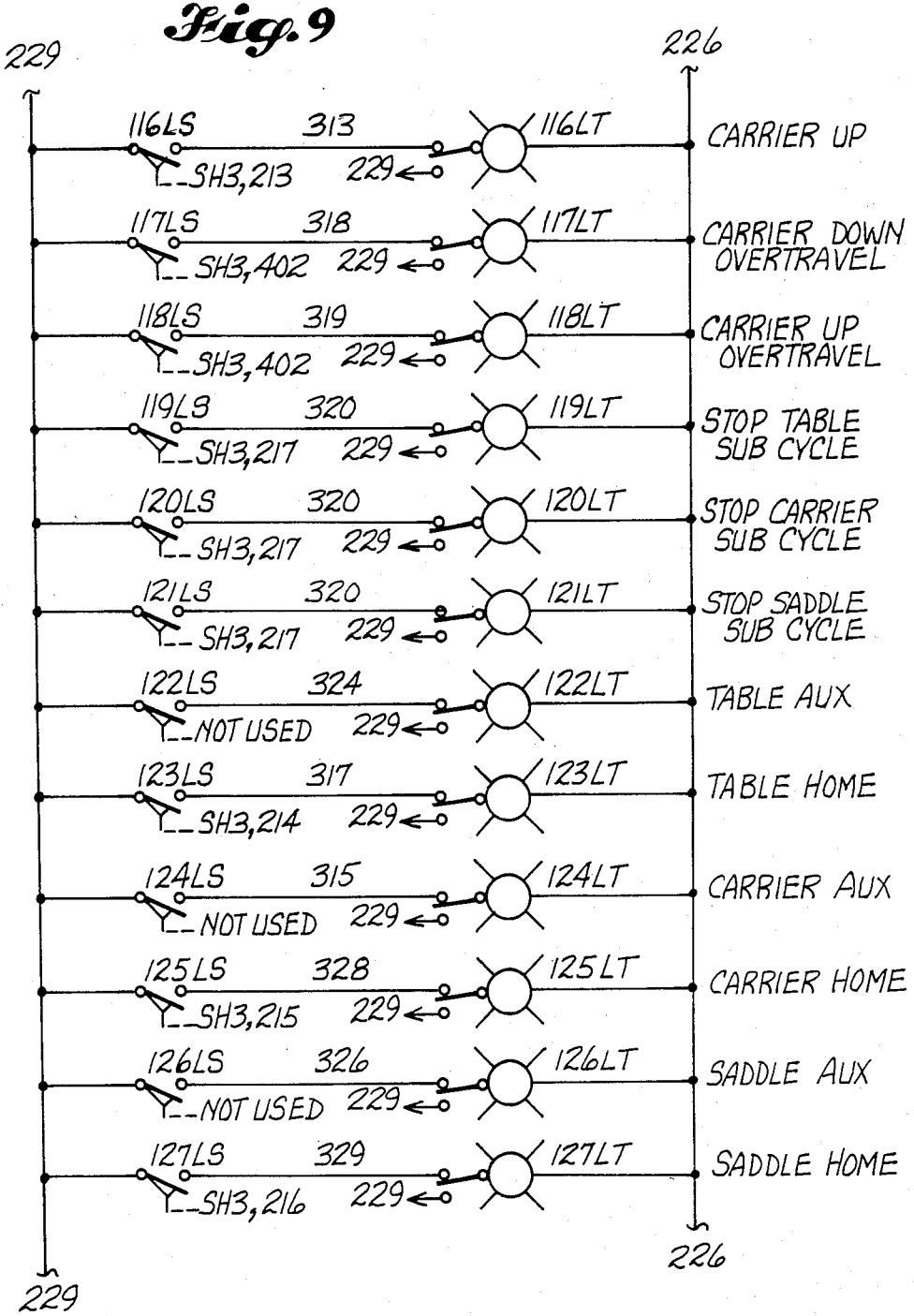
FIG. 9 is a view much like FIG. 8, but shows motion limiter indicator lamp connections for different machine movements.

The wiring for all of the above described switches, including how such switches may be wired to both a switch box and the previously described Allen-Bradley microprocessor, is shown in FIGS. 8 and 9.

After the motion limiter switches are set by positioning their respective triggering cams, the operator then enters the control program into the microprocessor. Basically, the operator knows where machine movement is to be limited because of the various switch settings. He then commands various movement directions and work operations from the control panel by entering the control program. For example, the first table left function which is executed in the control program will cause the table to move left from whatever position it is in when such command is executed. The table will continue to move left until a table left cam triggers a motion limiter switch. If a subsequent table left movement is executed, the table will likewise move left until the next table left lug on the table 14 triggers another motion limiter switch. The system operates in this same manner for both saddle and carrier movement. Subcycle operations are also terminated in the same manner by the subcycle limiter switches.

The previously described Allen-Bradley microprocessor is preprogrammed to operate the machine 12 in accordance with the operator control program input from the control panel 10. The necessary microprocessor programming is included in Appendix A of this application. Such program is in the well-known "ladder" format, which is described in the Allen-Bradley Program and Operations Manual No. 1772-804.

FIGS. 10-17 show the necessary hard wire connections between the various racks or module groups in the Allen-Bradley microprocessor and the machine 12. Such Figs. include the necessary machine function input and output addresses so that, along with the program described in Appendix A and the Allen-Bradley programming and operations manual, a person skilled in the art could build the system described herein.

Figure 10:
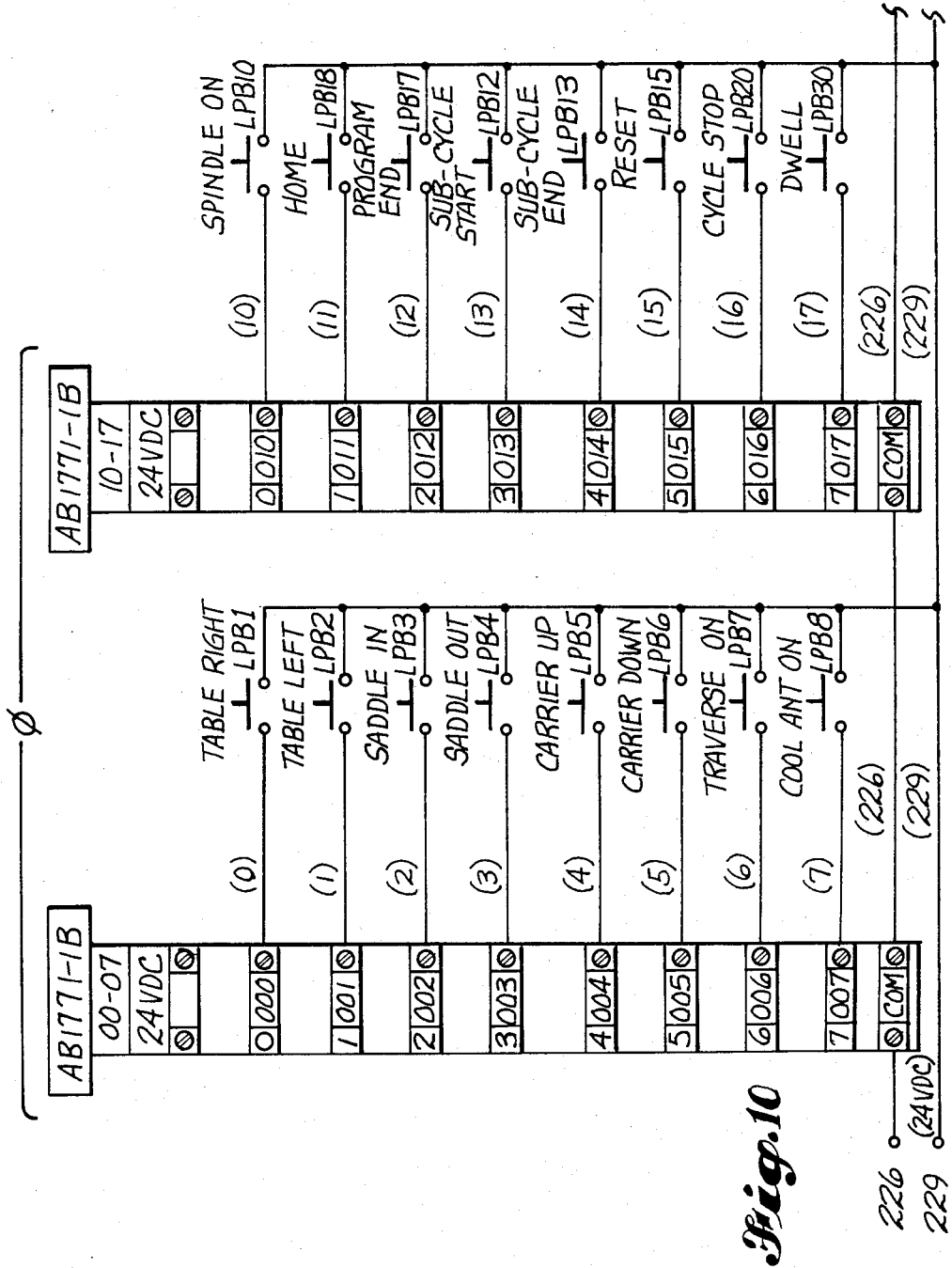
FIG. 10 is a schematic diagram of an input/output module group in a preferred microprocessor which is to be used in accordance with the practice of the present invention, wherein certain bit addresses are shown associated with certain machine functions.
Figure 11:
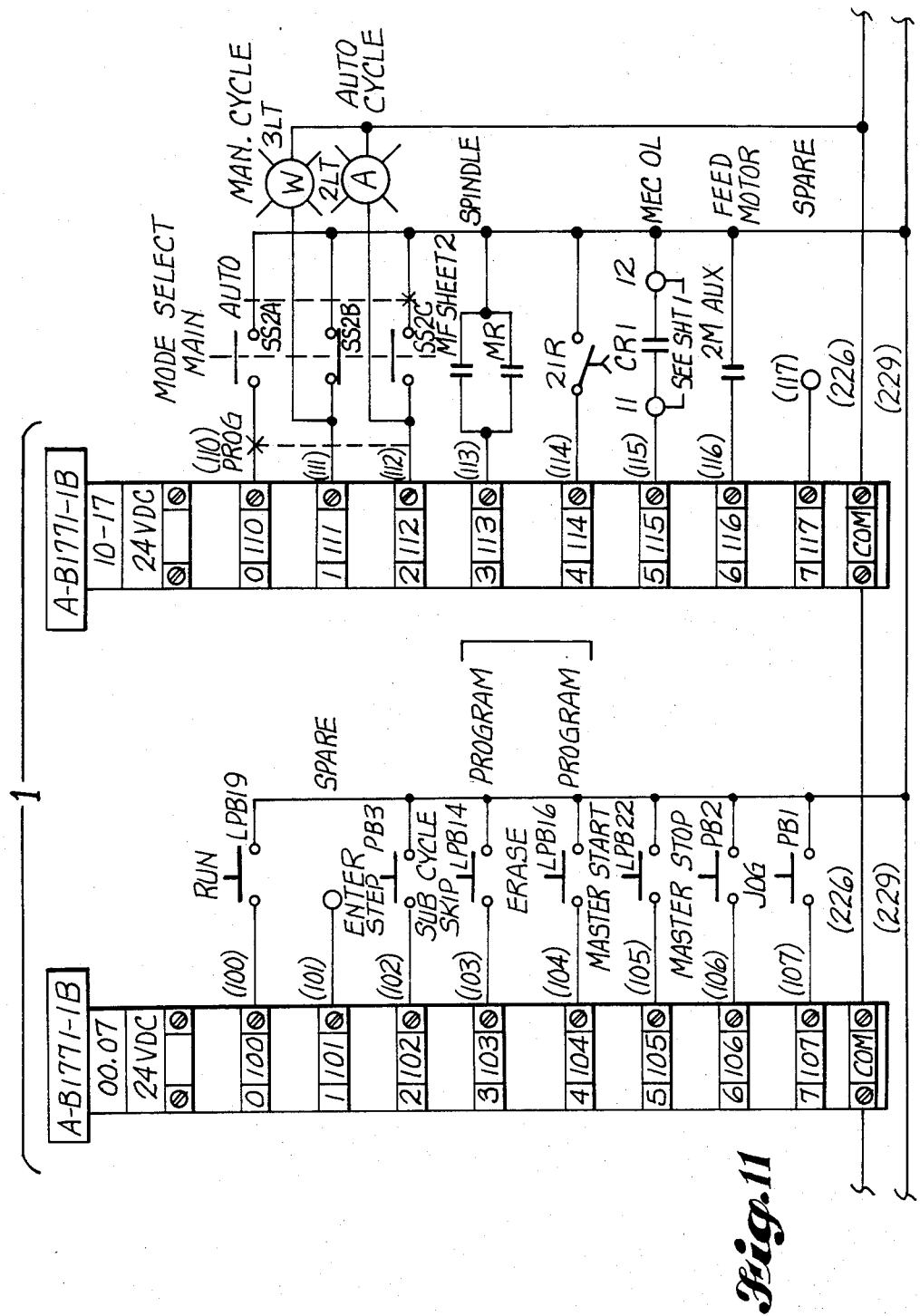
FIG. 11 is a view much like FIG. 10, but shows a different input/output module group of the microprocessor.
Figure 12:
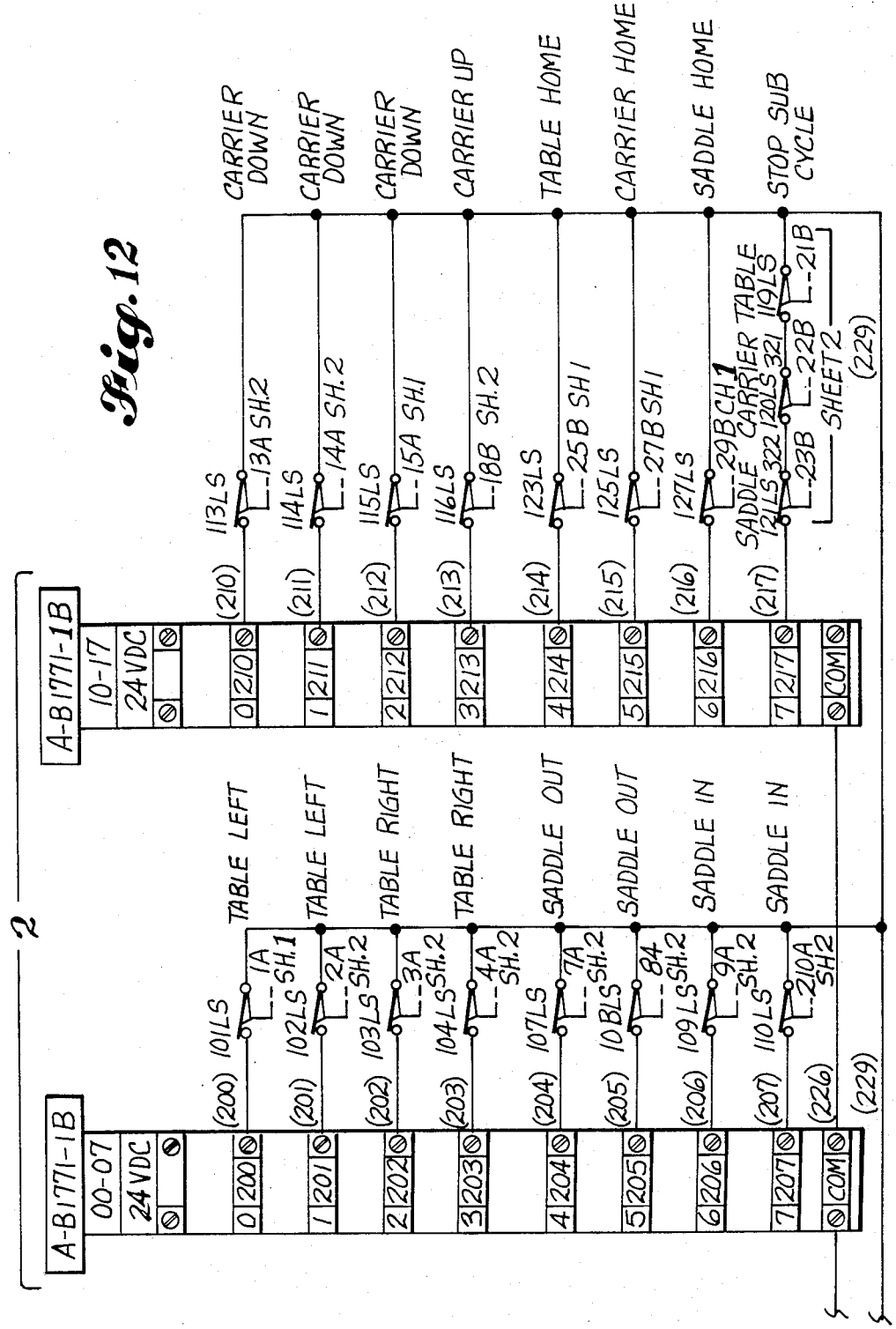
FIG. 12 is a view much like FIGS. 10 and 11, but shows still another input/output module group of the microprocessor.
Figure 13:
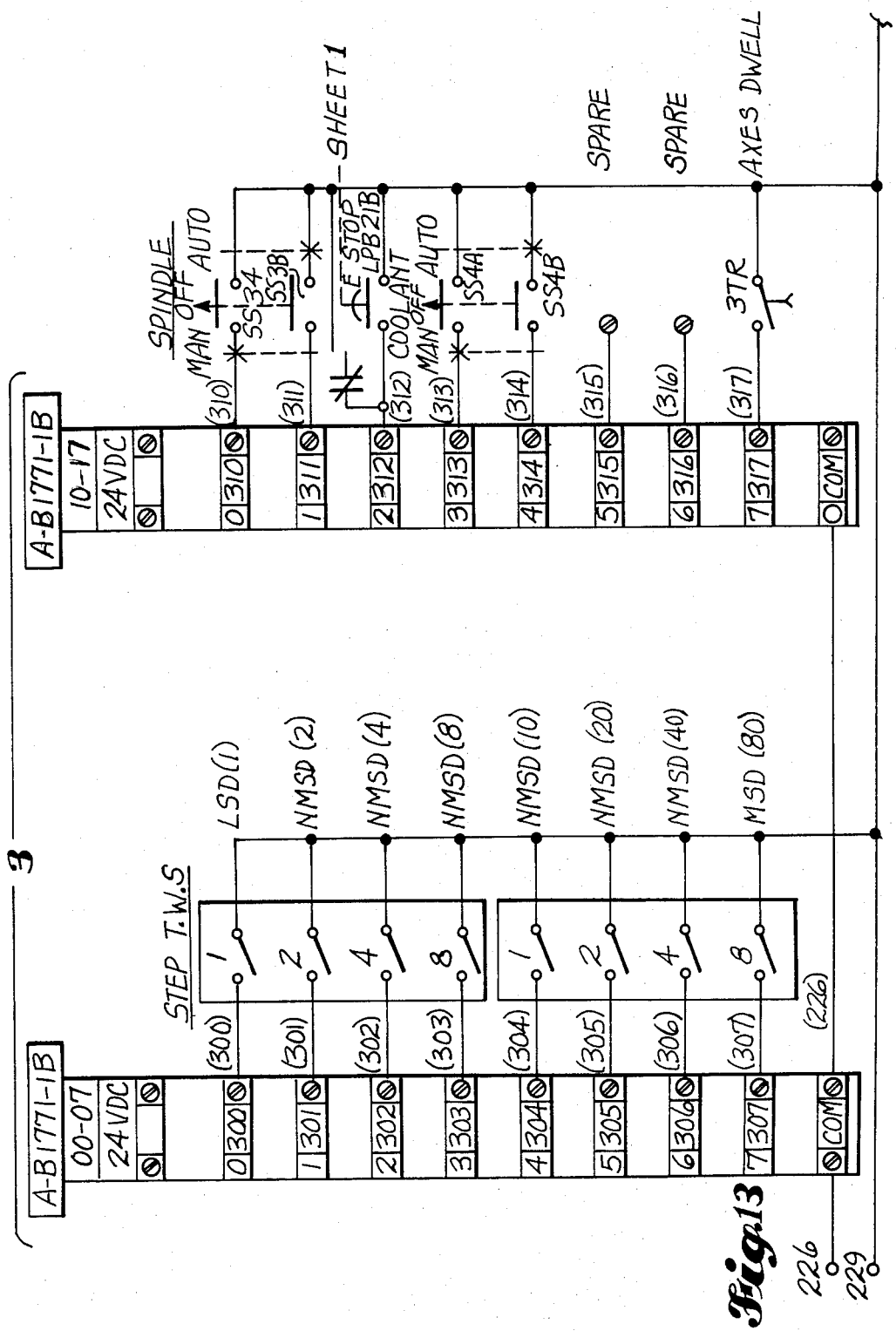
FIG. 13 is a view much like FIGS. 10-12, but shows still another input/output module group of the microprocessor.
Figure 14:
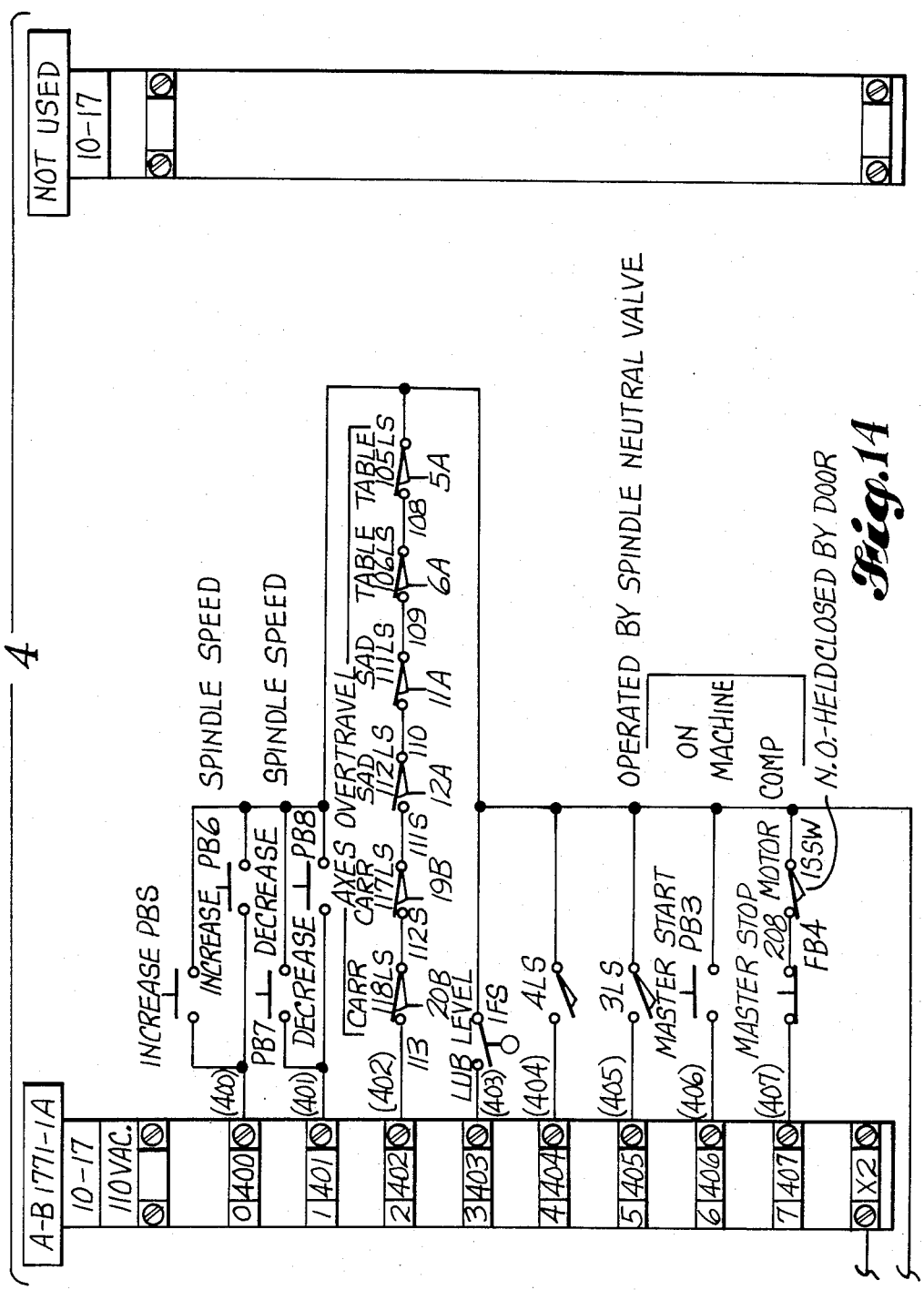
FIG. 14 is a view much like FIGS. 10-13, but shows still another input/output module group of the microprocessor.
Figure 15:
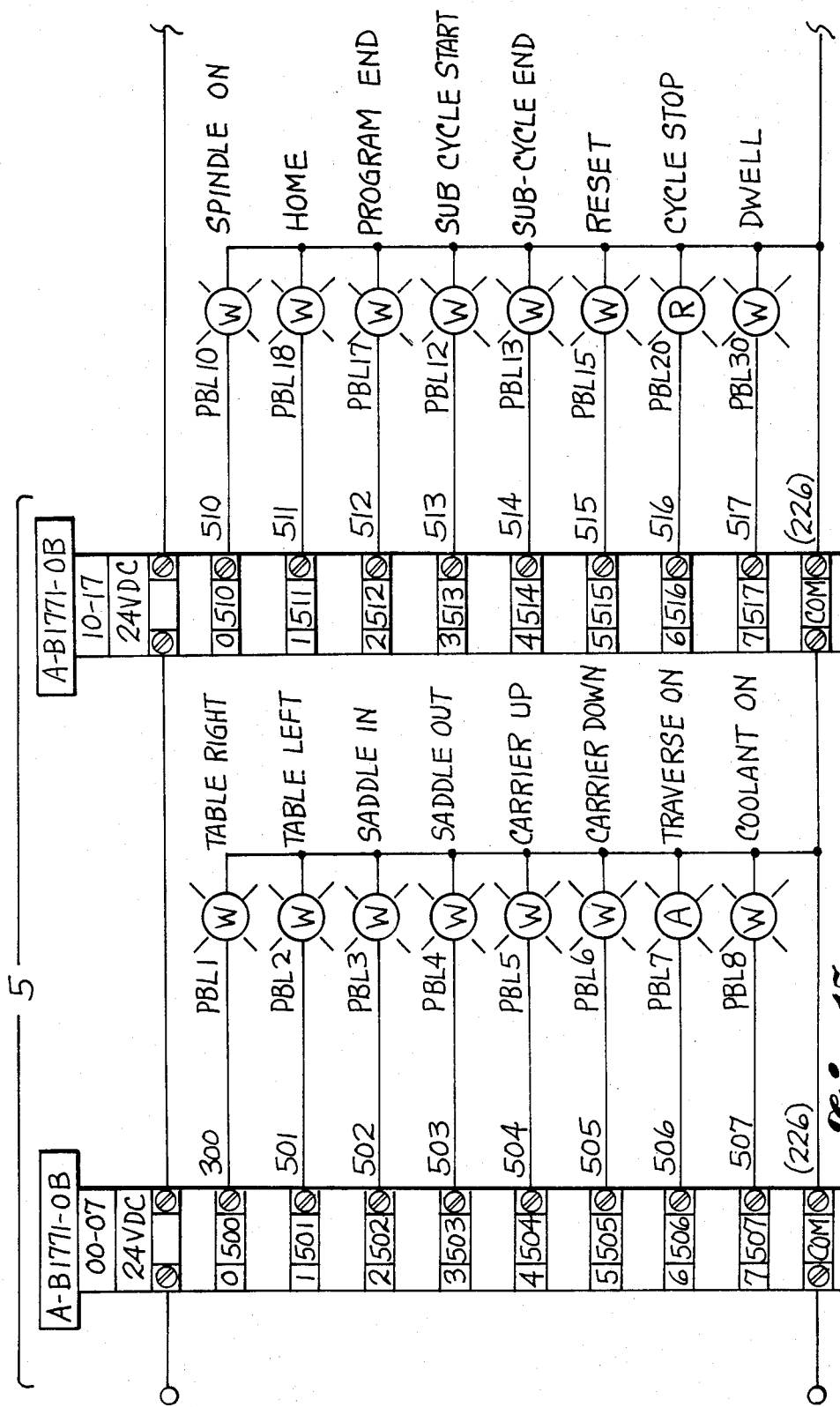
FIG. 15 is a view much like FIGS. 10-14, but shows still another input/output module group of the microprocessor.
Figure 16:
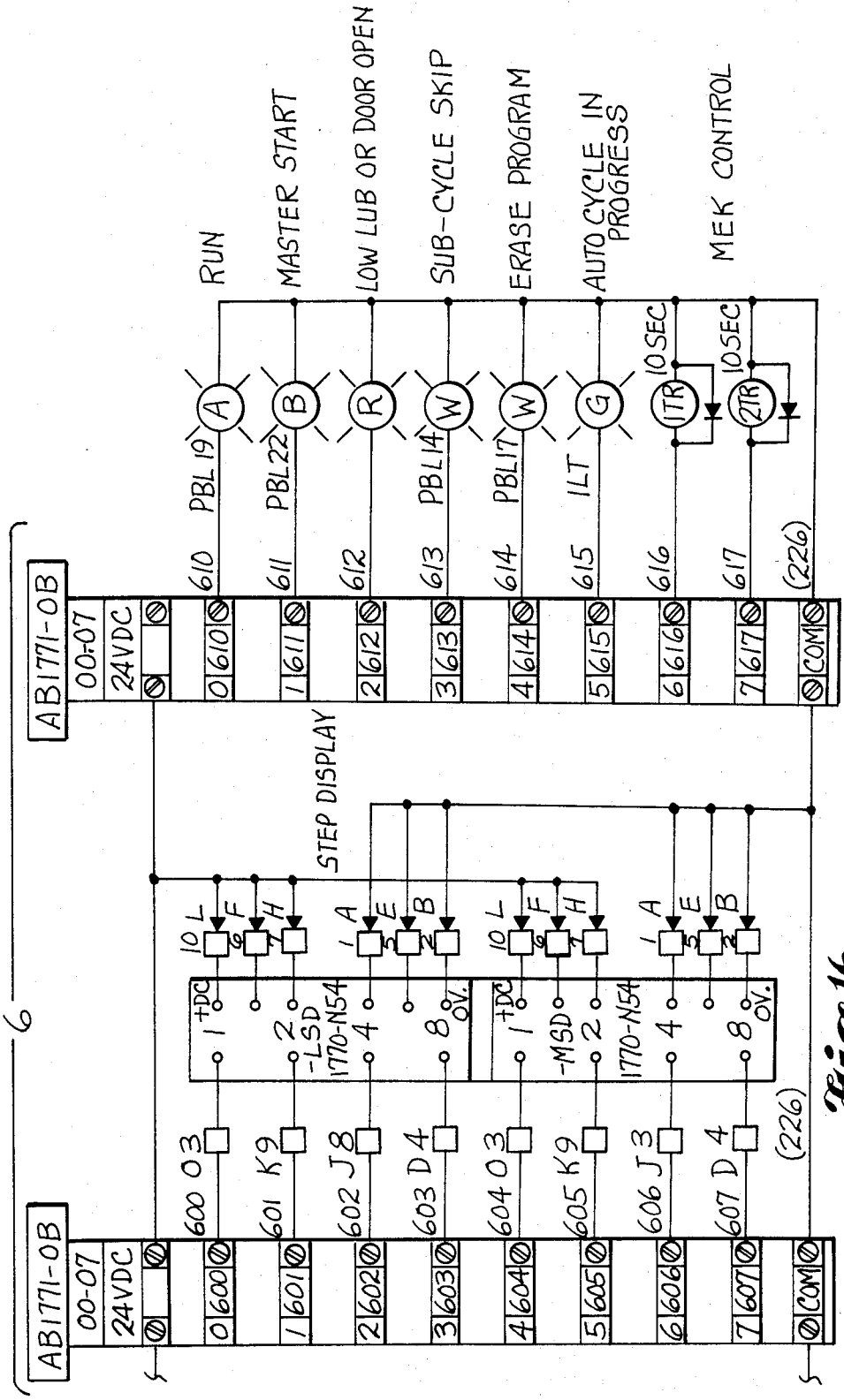
FIG. 16 is a view much like FIGS. 10-15, but shows still another input/output module group of the microprocessor.

Briefly, FIG. 10 is a schematic diagram of an input-/output module group or rack in the Allen-Bradley microprocessor. Various machine functions are shown therein along with their respective microprocessor bit addresses. FIGS. 12-16 are views much like FIG. 10, but show the microprocessor bit addresses for various other machine functions. FIG. 17 shows the microprocessor bit addresses associated with certain machine solenoids switches which are used for operating machine drive motors. FIGS. 7 and 8 show the wiring connections between various motion limiter switches in the system and their associated machine movements.

Using the Allen-Bradley programming and operations manual, the information depicted in FIGS. 8-17, and the preferred microprocessor program shown in Appendix A, a person skilled in the art could build the system described herein.

The system described herein is no more than an exemplary embodiment of the instant invention. This description is not meant to be limiting in any manner. The spirit and scope of the invention is to be limited only by the appended claims which follow.

APPENDIX A

BOEING PROGRAMMABLE MACHINE CONTROL — 20-Mar-85

```
     | 113/12                                                                     020/00   | ] [ 2,3,160
 1   +---]/[------------------------------------------------------------------------( )----+
     |
     | 020/00
 2   +---] [---------------------------------------------------------------------------(MCR)---+
     |1
     | 114/02    020/00                                                              020/01   | ] [ 4,29,30
 3   +---] [---------] [-------------------------------------------------------------( )----+
     |           1
     | 114/07   111/06    114/06                                                     020/02   |
 4   +---] [---]/[----+---] [------------------------------------+--------------------( )---- xref below
     |                |                                          |
     |                | 111/05                                   |
     |                +---] [------------------------------------+
     |                |                                          |
     |                | 111/16    020/01    020/02    111/13     |
     |                +---] [---------] [---------] [---------] [---+
     |                            3           4 cross ref for  020/02 ] [ 4,5,12,150,155,156,157,158,160,172

| 113/13    064/00                020/02                                        020/04   | ] [ 168
 5   +---] [---------] [-----------+---] [---------------------------------------------( )----+
     |                             14
     | 113/14    111/12   021/00   023/07 |
     +---] [---------] [---------] [---------] [---+
                   29           115
     | 113/10    065/00                114/05    020/12    111/13                     020/03   | ] [ 133,155
 6   +---] [---------] [-----------------]/[---------]/[---------] [-------------------( )----+ 156,172
     |                                              24                                        ]/[ 8,9
     | 113/11    111/12   021/00   023/10 |
     +---] [---------] [---------] [---------] [---+
                   29           116
     | 114/04    111/14    111/15    021/00                                           020/11   | ] [ 41
 7   +---]/[---------] [---------]/[-----+---] [-----------------------------------------( )---+
     |                             |29   |
     |                             | 021/01 |
     |                             +---] [---+
     |                                  30
     | 114/00    114/05    020/03                                                     020/05   | ] [ 170
 8   +---] [---------]/[---------]/[---------------------------------------------------( )----+
     |                     6
     | 114/01    114/05    020/03                                                     020/06   | ] [ 171
 9   +---] [---------]/[---------]/[---------------------------------------------------( )----+
     |                     6
     | 111/12    346/11    031/15    346/17                                           020/14   | ] [ 11,99,101
10   +---] [---------] [---------]/[---------]/[---------------------------------------( )----+ ]/[ 169
     |
     | 020/14    022/14                                                                030     | ** bit 15 **
11   +---] [---------] [---------------------------------------------------------------(TON 0.1)--+ ]/[ 99,99
     |110        101                                                                   PR 010   |
     | 020/02                                                                          020/07   | ] [ 27,173
12   +---] [---------------------------------------------------------------------------( )----+
     |4
     | 023/00    021/00                                                                020/10   | ] [ 22,103
13   +---] [---+---] [---------+---------------------------------------------------------( )----+ ]/[ 100,101
     |103      |29             |                                                                102
     | 023/01  | 021/01         |
     +---] [---+---] [---------+
     |109       |30
     | 023/02  | 021/01    020/15 |
     +---] [---+---] [---------]/[---------] [---+
     |110       |30           27
     | 023/03  |
     +---] [---+
     |111
     | 023/04  |
     +---] [---+
     |112
```

```
      :  023/05  :
      +---] [---+
      :113
      :  110/17    111/10                                                              071
   14 +---] [-------] [---+------------------------------------------------------------(CTU)---+
      :                                                                               PR 999
      :  021/10    071/00  :
      +---] [-------] [---+
      :64
      :  111/11    071/00  :
      +---] [-------] [---+

:  110/00    056/00    111/12    020/15                                          055
   15 +---] [-------]/[-------]/[-------]/[---------------------------------------------(CTU)---+
      :                       27                                                      PR 999
      :  111/12    055/00                          :
      +---] [-------] [----------------------------+

:  055/00    021/10                          :
      +---] [-------] [----------------------------+
      :            64
      :  111/10    021/01    055/00    112/14    067/00  :
      +---]/[-------] [-------] [-------]/[-------] [---+
      :            30
      :  055/00    110/01                          :
      +---] [-------] [----------------------------+

:  110/01    055/00    111/12    020/15                                          056
   16 +---] [-------]/[-------]/[-------]/[---------------------------------------------(CTU)---+
      :                       27                                                      PR 999
      :  111/12    056/00                          :
      +---] [-------] [----------------------------+

:  056/00    021/10                          :
      +---] [-------] [----------------------------+
      :            64
      :  111/10    021/01    056/00    112/14    067/00  :
      +---]/[-------] [-------] [-------]/[-------] [---+
      :            30
      :  056/00    110/00                          :
      +---] [-------] [----------------------------+

:  110/02    060/00    111/12    020/15                                          057
   17 +---] [-------]/[-------]/[-------]/[---------------------------------------------(CTU)---+
      :                       27                                                      PR 999
      :  111/12    057/00                          :
      +---] [-------] [----------------------------+

:  057/00    021/10                          :
      +---] [-------] [----------------------------+
      :            64
      :  111/10    021/01    057/00    112/16    067/00  :
      +---]/[-------] [-------] [-------]/[-------] [---+
      :            30
      :  057/00    110/03                          :
      +---] [-------] [----------------------------+

:  110/03    057/00    111/12    020/15                                          060
   18 +---] [-------]/[-------]/[-------]/[---------------------------------------------(CTU)---+
      :                       27                                                      PR 999
      :  111/12    060/00                          :
      +---] [-------] [----------------------------+

:  060/00    021/10                          :
      +---] [-------] [----------------------------+
      :            64
      :  111/10    021/01    060/00    112/16    067/00  :
      +---]/[-------] [-------] [-------]/[-------] [---+
      :            30
      :  060/00    110/02                          :
      +---] [-------] [----------------------------+
```

```
20-Mar-85                    BOEING PROGRAMMABLE MACHINE CONTROL -- 20-Mar-85
00:42:30
       : 110/04    062/00    111/12    020/15                                                061    :
    19 +---] [-----]/[-------]/[-------] [------+                                         ---(CTU)---+
       :                       27              :                                             PR 000  :
       : 111/12    061/00                      :
       +---] [-----] [--------------------------+
       :
       : 061/00    021/10                      :
       +---] [-----] [--------------------------+
       :             64                        :
       : 111/10    021/01    061/00    112/15    067/00 :
       +---]/[-----] [-------] [-------]/[-------] [---+
       :             30                        :
       : 061/00    110/05                      :
       +---] [-----] [--------------------------+

: 110/05    061/00    111/12    020/15                                                062    :
    20 +---] [-----]/[-------]/[-------] [------+                                         ---(CTU)---+
       :                       27              :                                             PR 999  :
       : 111/12    062/00                      :
       +---] [-----] [--------------------------+
       :
       : 062/00    021/10                      :
       +---] [-----] [--------------------------+
       :             64                        :
       : 111/10    021/01    062/00    112/15    067/00 :
       +---]/[-----] [-------] [-------]/[-------] [---+
       :             30                        :
       : 062/00    110/04                      :
       +---] [-----] [--------------------------+

: 111/12    110/06              021/00    021/03                                      063    :
    21 +---]/[-----] [-----------------+---]/[-------]/[-------------------------------- ---(CTU)---+
       :                               :29        31                                        PR 999  :
       : 063/00    021/10              :
       +---] [-----] [-----------------+
       :             64                :
       : 111/12    063/00              :
       +---] [-----] [-----------------+
       :
       : 111/11    020/12    063/00    :
       +---] [-----] [-------] [-------+
       :             24                :
       : 111/10    020/13    063/00    :
       +---] [-----] [-------] [-------+
       :             25                :
       : 111/10    066/00    023/06    047/17    022/13                                      031    :
    22 +---]/[-----]/[-------] [-------]/[-------] [------+                               ---(TON 1.0)-+ xref below
       :                      114               :        99                                 PR 003  :
       :                               : 020/15    020/10 :
       :                               +---] [-------] [--+
       :                                 27         13
    cross ref for  031   ** bit 15 **
                        ] [ 10,167
                        ** bit 17 **
                        ]/[ 99

: 111/11    113/13    110/07    021/03                                                064    :
    23 +---] [-----] [-------] [---+---]/[----------------------------------------------- ---(CTU)---+
       :                           :31                                                      PR 999  :
       : 111/10    110/07          :
       +---] [-----] [-------------+
       :
       : 111/11    020/12    064/00    :
       +---] [-----] [-------] [-------+
       :             24                :
       : 111/12    113/13    110/07    :
       +---] [-----] [-------] [-------+
       :
       : 111/10    113/13    064/00    :
       +---]/[-----]/[-------] [-------+
```

```
20-Mar-85                       BOEING PROGRAMMABLE MACHINE CONTROL -- 20-Mar-85
00:42:30

!  111/10    020/13    064/00  !
     +---] [-----] [-------] [---+
     !            25
     !  063/00    111/10                                                                 020/12  ! ] [ 21,23,24
  24 +---] [--+--] [---+-----------------------------------------------------------------( )---+ 26
     !        !        !                                                                        ! ]/[ 6
     !  064/00 ! 020/12 !
     +---] [--+--] [---+
     !           !24
     !  065/00   !
     +---] [-----+

!  063/00    111/12                                                                 020/13  ! ] [ 21,23,25
  25 +---] [--+--] [---+-----------------------------------------------------------------( )---+ 26,28
     !        !        !
     !  064/00 ! 020/13 !
     +---] [--+--] [---+
     !           !25
     !  065/00   !
     +---] [-----+
     !           !
     !  067/00   !
     +---] [-----+

!  111/11    113/10    110/10    114/05    021/03                                   065     !
  26 +---] [-----] [-------] [-------] [-------]/[-------------------------------------(CTU)---+
     !                                !31                                                PR 999 !
     !  111/10    110/10              !
     +---] [-----] [-----------------+
     !
     !  111/12    113/10    110/10    114/05  !
     +---] [-----] [-------] [-------]/[---+
     !
     !  111/11    020/12    065/00           !
     +---] [-----] [-------] [------------+
     !            24
     !  111/10    113/10    065/00           !
     +---]/[-----]/[-------] [------------+
     !
     !  111/10    020/13    065/00           !
     +---] [-----] [-------] [------------+
     !            25
     !  111/10    111/13    065/00           !
     +---]/[-----]/[-------] [------------+

!  111/07    111/11    020/07    021/01                                             020/15  !
  27 +---] [-----] [-------] [-------]/[--------------------------------------------------( )---+ xref below
     !                      12         30
  cross ref for  020/15 ] [ 13,22,108,109,110,111,112,113,167
     !                   ]/[ 15,16,17,18,19,20
     !
     !  111/12    110/11    021/01    021/00    021/03                                   067     !
  28 +---]/[-----] [-------]/[------+--]/[-----]/[--------------------------------------(CTU)---+
     !                      30      !29        31                                        PR 999 !
     !  021/10    067/00            !
     +---] [-----] [---------------+
     !64                            !
     !  047/15    021/01    067/00  !
     +---] [-----] [-------] [---+
     !            30              !
     !  021/02    067/00           !
     +---] [-----] [-------------+
     !39
     !  111/12    067/00           !
     +---] [-----] [-------------+
     !
     !  111/10    020/13    067/00 !
     +---] [-----] [-------] [---+
     !            25
```

```
     ¦ 111/00    016/12    111/12    020/01    021/13                                      021/00 ¦
 29  +---] [------]/[---+---] [-----] [------]/[-----------------------------------------------( )----+ xref below
     ¦           151    ¦            3         58                                                 ¦
     ¦ 021/00    021/02 ¦                                                                         ¦
     +---] [------]/[---+
     ¦29         39
cross ref for   021/00  ] [ 5,6,7,13,29,41,45,46,51,55,58,71,99,149,154,167
                        ]/[ 21,28,53,56,65,75

¦ 111/00    016/12            111/11    020/01                                      021/01 ¦
 30  +---] [------]/[-----+---------] [------] [----------------------------------------------( )----+ xref below
     ¦           151      ¦                   3                                                   ¦
     ¦ 021/01    021/02   022/13 ¦
     +---] [------]/[------] [---+
     ¦30         39       99
cross ref for   021/01  ] [ 7,13,15,16,17,18,19,20,28,30,99,108,108,109,109,110,110,111,111,112,112,113,113,149,167
                        ]/[ 13,27,28,53

¦ 111/00              111/10                                                        021/03 ¦
 31  +---] [----------+----] [-----------------------------------------------------------------( )----+ xref below
     ¦                ¦
     ¦ 021/03    021/02 ¦
     +---] [------]/[---+
     ¦31         39
cross ref for   021/03  ] [ 31,32,33,34,35,37,38,149
                        ]/[ 21,23,26,28,36,53,69,70,72,114,115,118,119,120,123,125,126,127,128,129,130,133,134,139
                            140

¦ 021/03    077       124                                                            126    ¦ (+) 70
 32  +---] [------[G]-------[G]----------------------------------------------------------(-)-----+
     ¦31         001        001                                                                  ¦
     ¦ 021/03                                          +---------------------------------+  077/15 ¦
 33  +---] [------------------------------------------+        File-Word Move            +----(DN)----+
     ¦31                                              ¦  Counter    077                  ¦
                                                      ¦  Length     101                  ¦
                                                      ¦  File A     200   - 344          ¦
                                                      ¦  Word       345                  ¦
                                                      +---------------------------------+

¦ 021/03    120       124                                                            347    ¦ [G] 35
 34  +---] [------[G]-------[G]----------------------------------------------------------(+)-----+
     ¦31         000        001
     ¦ 021/03    347        350                                                            077    ¦ [G] 32
 35  +---] [------[G]-------[<]----------------------------------------------------------(PUT)----+ File-Word Move
     ¦31         001        101                                                                  ¦ 33
     ¦ 021/03    123                                                                       345    ¦ File-Word Move
 36  +---]/[-----[G]------------------------------------------------------------------------(PUT)----+ 33
     ¦31         000
     ¦ 021/03    021/12     120                                                            075    ¦
 37  +---] [------] [-------[G]---------------------------------------------------------(PUT)----+ xref below
     ¦31         74         000
cross ref for   075     [G] 70
                        (PUT) 69,73
                        (-) 38
                        Seq. Load 123

¦ 021/03    021/12     120       124                                                  075    ¦
 38  +---] [------]/[-------[G]-------[G]----------------------------------------------------(-)-----+ xref below
     ¦31         74         000       001
cross ref for   075     [G] 70
                        (PUT) 37,69,73
                        Seq. Load 123

¦ 110/16    111/12                                                                    021/02 ¦ ] [ 28,40
 39  +---] [------]/[---+------------------------------------------------------------------------( )----+ ]/[ 29,30,31
     ¦                  ¦
     ¦ 066/15    110/16 ¦
     +---] [------]/[---+
```

```
20-Mar-85                    BOEING PROGRAMMABLE MACHINE CONTROL -- 20-Mar-85
00:42:30
      ! 021/02                                                                          066  !
 40   +---] [-----------------------------------------------------------------------(CTR)---+ xref below
      !39                                                                          PR 002  !
cross ref for   066    (CTU) 41
                       ** bit 15 **
                       ] [ 39
                       ** preset **
                       (CTU) 41

! 110/16   111/12                                                                  066  !
 41   +---] [------] [--------+------------------------------------------------------(CTU)---+ xref below
      !                       !                                                      PR 002  !
      ! 111/00   066/00   021/00 !
      +---] [------] [------] [--+
      !                 29       !
      ! 111/11   066/00          !
      +---] [------] [-----------+
      !
      ! 020/11   066/00          !
      +---] [------]/[-----------+
      !17
cross ref for   066    (CTR) 40
                       ** bit 15 **
                       ] [ 39
                       ** preset **
                       (CTR) 40
      ! 111/10   110/13              021/04                                              051  !
 42   +---] [------] [-------------+---]/[-------------------------------------------(CTU)---+
      !                            !43                                                 PR 000 !
      ! 111/10   052/00   021/10   051/00 !
      +---] [------] [------] [------] [--+
      !                 64                !
      ! 111/10   051/00                   !
      +---]/[------] [--------------------+
      !
      ! 051/00   021/10                                                           021/04 ! ] [ 43
 43   +---] [------] [-+------------------------------------------------------------( )---+ ]/[ 42
      !          64    !
      ! 021/04   052/00 !
      +---] [------]/[--+
      !43
      ! 111/10   110/14   051/00                                                         052  !
 44   +---] [------] [------] [-+--------------------------------------------------(CTU)---+
      !                         !                                                    PR 000 !
      ! 111/10   021/10   052/00 !
      +---] [------] [------] [--+
      !          64               !
      ! 111/10   052/00           !
      +---]/[------] [------------+

! 021/00   021/06   346/13   346/14   076     124                              125  ! [G] 47,52
 45   +---] [------]/[------] [------]/[------[G]------[G]-------------------------(-)---+
      !29       46                        009     001
      ! 022/13   346/13   021/00   110/15   054/17                                021/06 ! ] [ 46
 46   +---] [------] [------] [---+---]/[------]/[-----------------------------------( )---+ ]/[ 45
      !99                29        !
      ! 021/06   021/07   021/11  !
      +---] [------]/[------]/[---+
      !46       53       65
      ! 346/14   346/13   346/12   022/13   070/00   125                              076  !
 47   +---] [------]/[------]/[------]/[------]/[------[G]----------------------------(PUT)---+ xref below
      !                                 99             004
cross ref for   076    [G] 45,71,75
                       (PUT) 52,54,67
                       (-) 68
                       Seq. Output 124

! 346/12   346/13   346/14   070/00   110/15                                  021/05 ! ] [ 48,50
 48   +---] [------] [------] [------]/[---+---]/[-----------------------------------( )---+
      !                                    !
      ! 021/05   054/17   111/12           !
      +---] [------] [------] [------------+
      !48
```

```
     ¦ 111/03    111/12                                                                              070      ¦
  49 +---] [------] [----------+---------------------------------------------------------------------(CTU)---+
     ¦ 112/17                  ¦                                                                    PR 999   ¦
     +---]/[-------------------+
     ¦
     ¦ 111/12    070/00        ¦
     +---]/[------] [----------+
     ¦
     ¦ 054/15    022/13    070/00 ¦
     +---] [------] [------] [----+
                  99
     ¦ 070/00    022/13    346/14                                                                    054     ¦
  50 +---] [------]/[------] [---+----------------------------------------------------------------(TON 0.1)--+ xref below
               99                                                                                   PR 005   ¦
     ¦ 054/17    070/00        ¦
     +---] [------] [----------+
     ¦
     ¦ 021/05    070/00    346/13 ¦
     +---] [------] [------] [----+
     ¦48
 cross ref for   054   ** bit 15 **
                       ] [ 49
                       ** bit 17 **
                       ] [ 50
                       ]/[ 46,48

¦ 022/13    346/12    346/14    021/00    070/00                                                021/14  ¦ ] [ 51,52
  51 +---]/[------] [------] [------] [---+---]/[--------------------------------------------------( )------+ ]/[ 124
     ¦99                             29   ¦
     ¦ 021/14    047/15    110/15        ¦
     +---] [------]/[------]/[-----------+
     ¦51
     ¦ 021/14    111/00    125                                                                        076    ¦
  52 +---] [------] [------[G]-----------------------------------------------------------------------(PUT)---+ xref below
     ¦51                   004
 cross ref for   076   [G] 45,71,75
                       (PUT) 47,54,67
                       (-) 68
                       Seq. Output 124

¦ 110/15                          021/03    021/01    111/11    021/00                          021/07  ¦ ] [ 53,54,75
  53 +---] [------------------------+---]/[------]/[------]/[------]/[----------------------------( )-------+ 121
     ¦                              ¦31        30                 29                                         ¦ ]/[ 46,57,65
     ¦ 021/07    111/02    072/00   ¦
     +---] [------]/[------] [------+
     ¦53
     ¦ 050/15                       ¦
     +---] [------------------------+
     ¦ 110/15    021/07    123                                                                        076    ¦
  54 +---] [---+--] [------[G]-------------------------------------------------------------------------(PUT)-+ xref below
     ¦        ¦53          000
     ¦ 050/15 ¦
     +---] [--+
     ¦
 cross ref for   076   [G] 45,71,75
                       (PUT) 47,52,67
                       (-) 68
                       Seq. Output 124

¦ 110/12    111/10                                                                              072      ¦
  55 +---] [------] [----------+----------------------------------------------------------------------(CTU)---+
     ¦                         ¦                                                                    PR 999    ¦
     ¦ 021/10    072/00        ¦
     +---] [------] [----------+
     ¦54
     ¦ 110/15    072/00    111/12 ¦
     +---] [------] [------] [----+
     ¦
     ¦ 346/12    021/00        ¦
     +---] [------] [----------+
```

```
20-Mar-85                    BOEING PROGRAMMABLE MACHINE CONTROL -- 20-Mar-85
00:42:30
                29
        111/12   111/00   072/00
     +---] [------] [------] [---+
     :                           :
     : 111/11   072/00           :
     +---] [------] [-----------+
     :                           :
     : 021/11   072/00           :
     +---] [------] [-----------+
     :65
     : 021/00   123                                                          346  : Seq. Output
 56  +---]/[------[G]-------------------------------------------------(PUT)---+ 124
     :29        000                                                           050  : ** bit 15 **
     : 346/15   346/12                                                       (TOF 0.1)-+ ] [ 53,54
 57  +---] [------] [-----                                                   PR 001  : ] [ 57
     :
     : 050/17   021/07
     +---] [------]/[---+
            53
     : 346/12   022/13   110/15   021/11                                     021/13  : ] [ 58,58,71
 58  +---] [------]/[------]/[------]/[---                                   -( )---+ ]/[ 29,75,124
            99              65
     : 021/00   021/13
     +---] [------] [---+
     :29        58
     : 111/00   021/13
     +---]/[------] [---+
            58
     : 111/04   111/10                                                       073
 59  +---] [------] [---+                                                    -(CTU)---+
                                                                             PR 999
     : 073/00   032/15
     +---] [------] [---+

: 073/00   111/10
     +---] [------]/[---+
                                                                       +----+ 074/15  : ]/[ 61
     : 032/17                                             Word-File Move      +---(DN)---+
 60  +---] [----------------------------------+   Counter    074       :
                                              :   Length     100       :
                                              :   Word       123       :
                                              :   File R     200  - 343:
                                              :                        :
                                              +------------------------+
     : 073/00   021/10                                                       032
 61  +---] [------] [-----+                                                  -(TON 0.1)-+ xref below
            :64                                                              PR 099
            : 032/17   074/15
            +---] [------]/[---+
                   60
    cross ref for   032   [G] 62,63
                         ** bit 15 **
                         ] [ 59
                         ** bit 17 **
                         ] [ 60,61,62
                         ]/[ 64,73

: 032/17   032                                                          074  : (PUT) 63
 62  +---] [------[G]------------------------------------------------(PUT)---+ Word-File Move
                000                                                          : 60
     : 073/00   032                                                          074  : (PUT) 62
 63  +---]/[------[G]------------------------------------------------(PUT)---+ Word-File Move
                000                                                          : 60
     : 111/02   111/10   032/17                                              021/10  :
 64  +---] [------] [------]/[                                               -( )---+ xref below cross ref for   021/10 ] [ 14,15,16,17,18,19,20,21,28,42,43,44,55,61,73,123
```

```
              111/02    111/12    021/00    021/07                                                021/11   ] [ 55,67,68
     65  +---] [-------] [-------]/[-------]/[----------------------------------------------------( )---+ ]/[ 46,58
                          29        53
         : 113/0                                                                                  120    : [G] 34,37,38
     66  +---[B]----------------------------------------------------------------------------------(PUT)--+ 67,68,74
         : 000
         : 021/11    021/12    120                                                                076
     67  +---] [-------] [-------[G]---------------------------------------------------------------(PUT)-+ xref below
            65        74        000
         cross ref for   076   [G] 45,71,75
                               (PUT) 47,52,54
                               (-) 68
                               Seq. Output 124

021/11    021/12    120     124                                                     076
     68  +---] [-------]/[-------[G]-------[G]-----------------------------------------------------(-)---+ xref below
            65        74        000     001
         cross ref for   076   [G] 45,71,75
                               (PUT) 47,52,54,67
                               Seq. Output 124

111/10    110/15    072/00    021/03    123                                         075
     69  +---] [-------] [-------]/[-------]/[--------[G]------------------------------------------(PUT)-+ xref below
                                  31                 000
         cross ref for   075   [G] 70
                               (PUT) 37,73
                               (-) 38
                               Seq. Load 123

111/10    021/03    110/15    075       126                                         126    : (-) 32
     70  +---] [-------]/[-------]/[--------[G]-------[G]-----------------------------------------(+)---+
                         31                 000      001
              111/12    111/00    021/00    076                                                   121    : (+) 75
     71  +---] [-------]/[-----+---] [------+--[G]--------------------------------------------(PUT)----+
                                129         : 009
                                : 021/13    :
                                +---] [-----+
                                58
              111/02    111/10    021/03    015                                                   127    : Seq. Load
     72  +---]/[-------] [-------]/[--------[G]------------------------------------------------(PUT)----+ 123
                          31                000
              111/10    073/00    032/17    021/10    123                                         075
     73  +---] [-------] [-------]/[--------] [-------[G]------------------------------------------(PUT)-+ xref below
                                  64                 000
         cross ref for   075   [G] 70
                               (PUT) 37,69
                               (-) 38
                               Seq. Load 123

111/11    120       124                                                             021/12  : ] [ 37,67
     74  +---]/[-------[G]-------[C]--------------------------------------------------------------( )---+ ]/[ 38,68
                        000       001
              111/12    021/13    021/00    076       124                                         121     : (PUT) 71
     75  +---] [---+---]/[----+--]/[--------[G]-------[G]------------------------------------------(+)---+
                   :58         129          009       001
                   : 021/07    :
                   +---] [-----+
                    53
              126/00    111/10                                                                    022/00  : ] [ 141
     76  +---] [-------] [----+---------------------------------------------------------------(  )---+
                              :
              : 121/00    111/12  :
              +---] [-------] [---+

126/01    111/10                                                                    022/01  : ] [ 142
     77  +---] [-------] [----+---------------------------------------------------------------(  )---+
                              :
              : 121/01    111/12  :
              +---] [-------] [---+

126/02    111/10                                                                    022/02  : ] [ 143
     78  +---] [-------] [---------------------------------------------------------------------(  )---+
```

```
20-Mar-85                    BOEING PROGRAMMABLE MACHINE CONTROL -- 20-Mar-85
00:42:30
      !
      ! 121/02    111/12 !
      +---] [------] [---+
      !                  !
      ! 126/03    111/10 !                                                        022/03  ! ] [ 144
   79 +---] [------] [---+----------------------------------------------------------( )---+
      !                  !
      ! 121/03    111/12 !
      +---] [------] [---+
      !
      ! 126/04    111/10 !                                                        022/04  ! ] [ 145
   80 +---] [------] [---+----------------------------------------------------------( )---+
      !                  !
      ! 121/04    111/12 !
      +---] [------] [---+
      !
      ! 126/05    111/10 !                                                        022/05  ! ] [ 146
   81 +---] [------] [---+----------------------------------------------------------( )---+
      !                  !
      ! 121/05    111/12 !
      +---] [------] [---+
      !
      ! 126/06    111/10 !                                                        022/06  ! ] [ 147
   82 +---] [------] [---+----------------------------------------------------------( )---+
      !                  !
      ! 121/06    111/12 !
      +---] [------] [---+
      !
      ! 126/07    111/10 !                                                        022/07  ! ] [ 148
   83 +---] [------] [---+----------------------------------------------------------( )---+
      !                  !
      ! 121/07    111/12 !
      +---] [------] [---+
      !
      !                                                                             033    ! ** bit 15 **
      ! 112/02    023/00 !                                                       -(TON .01)-+ ] [ 88
   84 +---]/[---+--] [---+------------------------------------------------------     PR 010 ! ] [ 84
      !         !108     !
      !         ! 033/17 !
      !         +---] [--+
      !
      !                                                                             034    ! ** bit 15 **
      ! 112/03    023/00 !                                                       -(TON .01)-+ ] [ 88
   85 +---]/[---+--] [---+------------------------------------------------------     PR 010 ! ] [ 85
      !         !108     !
      !         ! 034/17 !
      !         +---] [--+
      !
      !                                                                             035    ! ** bit 15 **
      ! 112/00    023/01 !                                                       -(TON .01)-+ ] [ 88
   86 +---]/[---+--] [---+------------------------------------------------------     PR 010 ! ] [ 86
      !         !109     !
      !         ! 035/17 !
      !         +---] [--+
      !
      !                                                                             036    ! ** bit 15 **
      ! 112/01    023/01 !                                                       -(TON .01)-+ ] [ 88
   87 +---]/[---+--] [---+------------------------------------------------------     PR 010 ! ] [ 87
      !         !109     !
      !         ! 036/17 !
      !         +---] [--+
      !
      ! 112/02   112/03   112/00   112/01 !                                       022/10   ! ] [ 99
   88 +---] [----] [------] [------] [----+----------------------------------------( )----+ ]/[ 101
      !                                   !
      ! 033/15   034/15   035/15   036/15 !
      +---] [----] [------] [------] [----+
      !                                   !
      ! 023/00   023/00   023/01   023/01 !
      +---]/[----]/[------]/[------]/[----+
      !108       108       109       109
      !                                                                            037    ! ** bit 15 **
      ! 112/06    023/02 !                                                       -(TON .01)-+ ] [ 93
   89 +---]/[---+--] [---+------------------------------------------------------     PR 010 ! ] [ 89
      !         !110     !
      !         ! 037/17 !
      !         +---] [--+
```

```
     ! 112/07    023/02                                                                    040   ! ** bit 15 **
 90  +---]/[----+---] [---+                                                        --------(TON .01)-+ ] [ 93
     !          !110     !                                                                 PR 010   ! ] [ 90
     !          ! 040/17 !
     !          +---] [--+
     !
     !
     ! 112/04    023/03                                                                    041   ! ** bit 15 **
 91  +---]/[----+---] [---+                                                        --------(TON .01)-+ ] [ 93
     !          !111     !                                                                 PR 010   ! ] [ 91
     !          ! 041/17 !
     !          +---] [--+
     !
     ! 112/05    023/03                                                                    042   ! ** bit 15 **
 92  +---]/[----+---] [---+                                                        --------(TON .01)-+ ] [ 93
     !          !111     !                                                                 PR 010   ! ] [ 92
     !          ! 042/17 !
     !          +---] [--+
     !
     !  112/06    112/07   112/04    112/05                                               022/11  ! ] [ 99
 93  +---] [----+---] [---+---] [---+---] [---+                                           -( )----+ ]/[ 101
     !          !         !         !         !
     ! 037/15 ! 040/15  ! 041/15  ! 042/15 !
     +---] [----+---] [---+---] [---+---] [---+
     !          !         !         !         !
     !          !         !         !         !
     ! 023/02 ! 023/02  ! 023/03  ! 023/03 !
     +---]/[----+---]/[---+---]/[---+---]/[---+
     !110       110       111       111
     ! 112/10    023/05                                                                    043   ! ** bit 15 **
 94  +---]/[----+---] [---+                                                        --------(TON .01)-+ ] [ 98
     !          !113     !                                                                 PR 010   ! ] [ 94
     !          ! 043/17 !
     !          +---] [--+
     !
     ! 112/11    023/05                                                                    044   ! ** bit 15 **
 95  +---]/[----+---] [---+                                                        --------(TON .01)-+ ] [ 98
     !          !113     !                                                                 PR 010   ! ] [ 95
     !          ! 044/17 !
     !          +---] [--+
     !
     ! 112/12    023/05                                                                    045   ! ** bit 15 **
 96  +---]/[----+---] [---+                                                        --------(TON .01)-+ ] [ 98
     !          !113     !                                                                 PR 010   ! ] [ 96
     !          ! 045/17 !
     !          +---] [--+
     ! 112/13    023/04                                                                    046   ! ** bit 15 **
 97  +---]/[----+---] [---+                                                        --------(TON .01)-+ ] [ 98
     !          !112     !                                                                 PR 010   ! ] [ 97
     !          ! 046/17 !
     !          +---] [--+
     !
     !  112/10    112/11   112/12    112/13                                               022/12  ! ] [ 99
 98  +---] [----+---] [---+---] [---+---] [---+                                           -( )----+ ]/[ 101
     !          !         !         !         !
     ! 043/15 ! 044/15  ! 045/15  ! 046/15 !
     +---] [----+---] [---+---] [---+---] [---+
     !          !         !         !         !
     ! 023/05 ! 023/05  ! 023/05  ! 023/04 !
     +---]/[----+---]/[---+---]/[---+---]/[---+
     !113       113       113       112
     ! 030/15    113/17    022/10    022/11    022/12    021/00    047/15    031/17       022/13  ! xref below
 99  +---]/[----+---]/[---+---] [---+---] [---+---] [---+---] [---+---]/[---+---]/[---+   -( )----+
     !                     88        93        98       !29        !         !
     ! 067/00                                          ! 021/01 !  ! 022/13 !
     +---] [-------------------------------------------+---] [--+  +---] [--+
     !                                                  !30        99
     ! 346/11    113/17
     +---] [----+---]/[----------------------------+
     !
     ! 346/17    113/17
     +---] [----+---]/[----------------------------+
```

```
 .ar-85                      BOEING PROGRAMMABLE MACHINE CONTROL — 20-Mar-85
00:42:30
       : 020/14    030/15                       :
       +---]/[---------]/[--------------------+
       :10
cross ref for    022/13 ] [ 22,30,46,49,99,100,101,102,103,105,106,107,108,109,110,111,112,113,124,161,162,163,164
       :                   165,166,169
       :                ]/[ 47,50,51,58
       :
       : 022/14    066/00    020/10    022/13                                                  047
100  +---]/[--------]/[--------]/[--------] [--------------------------------------------(TON 0.1)-+ xref below
       :101            13        99                                                       PR 005  :
cross ref for    047    ** bit 15 **
       :                ] [ 28
       :               ]/[ 51,99
       :                ** bit 17 **
       :               ]/[ 22

: 022/10       346/17    020/16    022/13                                                 022/14 :
101  +---]/[-----------] [-------]/[---+--] [------------------------------------------------( )-----+ xref below
       :38             :          103    :99                                                        :
       : 022/11        : 020/14          :
       +---]/[---------+---] [-----------+
       :93             :10
       : 022/12        :
       +---]/[---------+
       :98
       : 022/14
       +---] [---------+
       :101            :
       : 020/10    053/15 :
       +---]/[--------] [---+
       :13             :
       : 020/17        :
       +---] [---------+
       :104
cross ref for    022/14 ] [ 11,101,122,169
       :                ]/[ 100,161,162,163,164,165,166,167
       :
       : 022/13    346/17    020/10                                                        053    : ** bit 15 **
102  +---] [--------] [--------]/[-----------------------------------------------------(TON 0.1)-+ ] [ 101
       :99            13                                                                  PR 004  :
       : 022/15    346/11    346/17    022/13    020/10                                     020/16 : ]/[ 101
103  +---]/[---+---] [--------] [--------] [-------] [---------------------------------------( )-----+
       :105    :                       99        13                                                 :
       : 022/16 :
       +---]/[---+
       :106     :
       : 022/17 :
       +---]/[---+
       :107
       : 112/14    346/11    346/17                                                         020/17 : ] [ 101
104  +---]/[---+---] [--------] [-------------------------------------------------------------( )-----+
       :         :
       : 112/16 :
       +---]/[---+
       :
       : 112/15 :
       +---]/[---+

: 112/14    067/00    022/13                                                         022/15 : ] [ 105
105  +---]/[---+---] [---+---] [---------------------------------------------------------------( )-----+ ]/[ 103,108
       :         :99                                                                                : 108,109,109
       : 022/15 : 346/11 :
       +---] [---+---] [---+
       :105
       : 112/16    067/00    022/13                                                         022/16 : ] [ 106
106  +---]/[---+---] [---+---] [---------------------------------------------------------------( )-----+ ]/[ 103,110
       :         :99                                                                                : 110,111,111
       : 022/16 : 346/11 :
       +---] [---+---] [---+
       :106
       : 112/15    067/00    022/13                                                         022/17 : ] [ 107
```

```
107 +---]/[---+---] [---+---] [----------------------------------------------( )---+ ]/[ 103,112
    :        :        199                                                         : 112,113,113
    : 022/17 : 346/11 :                                                           :
    +---] [---+---] [---+
    :107
    : 020/15    055/00                      346/01                       023/00 : ] [ 13,84,85
108 +---] [-------] [--------------------+---]/[-----------------------------( )---+ 125,161,161
    :27                                                                           : ]/[ 88,88
    : 345/00                             :
    +---] [------------------------------+
    :
    : 055/00    021/01    022/15    067/00 :
    +---] [-------] [-------]/[-------] [---+
    :           30         105             :
    : 346/00    346/11                     :
    +---] [--------]/[---------------------+
    :
    : 346/00    022/15    346/11           :
    +---] [--------]/[--------] [----------+
    :           105                        :
    : 055/00    021/01    022/13           :
    +---] [-------] [--------] [-----------+
    :           30         99
    : 020/15    056/00                      346/00                       023/01 : ] [ 13,86,87
109 +---] [-------] [--------------------+---]/[-----------------------------( )---+ 126,162,162
    :27                                                                           : ]/[ 88,88
    : 345/01                             :
    +---] [------------------------------+
    :
    : 055/00    021/01    022/15    067/00 :
    +---] [-------] [-------]/[-------] [---+
    :           30         105             :
    : 346/01    346/11                     :
    +---] [--------]/[---------------------+
    :
    : 346/01    022/15    346/11           :
    +---] [--------]/[--------] [----------+
    :           105                        :
    : 056/00    021/01    022/13           :
    +---] [-------] [--------] [-----------+
    :           30         99
    : 020/15    057/00                      346/03                       023/02 : ] [ 13,89,90
110 +---] [-------] [--------------------+---]/[-----------------------------( )---+ 127,163,163
    :27                                                                           : ]/[ 93,93
    : 345/02                             :
    +---] [------------------------------+
    :
    : 057/00    021/01    022/16    067/00 :
    +---] [-------] [-------]/[-------] [---+
    :           30         106             :
    : 346/02    346/11                     :
    +---] [--------]/[---------------------+
    :
    : 346/02    022/16    346/11           :
    +---] [--------]/[--------] [----------+
    :           -106                       :
    : 057/00    021/01    022/13           :
    +---] [-------] [--------] [-----------+
    :           30         99
    : 020/15    060/00                      346/02                       023/03 : ] [ 13,91,92
111 +---] [-------] [--------------------+---]/[-----------------------------( )---+ 128,164,164
    :27                                                                           : ]/[ 93,93
    : 345/03                             :
    +---] [------------------------------+
    :
    : 060/00    021/01    022/16    067/00 :
    +---] [-------] [-------]/[-------] [---+
    :           30         106             :
    : 346/03    346/11                     :
    +---] [--------]/[---------------------+
    :
```

```
20    -85
00:42:30

: 346/03    022/15    346/11   :
      +---] [--------]/[------] [----+
      :               108
      : 060/00    021/01    022/13   :
      +---] [--------] [--------] [--+
      :         30        99
      : 020/15    061/00              346/05                              023/04  : ] [ 13,97,129
  112 +---] [--------] [--------------+---]/[-----------------------------( )----+ 165,165
      :27                                                                        : ]/[ 98
      : 345/04                        :
      +---] [-------------------------+
      :
      : 061/00    021/01    022/17    067/00  :
      +---] [--------] [--------]/[------] [--+
      :         30        107
      : 346/04    346/11              :
      +---] [--------]/[--------------+
      :
      : 346/04    022/17    346/11    :
      +---] [--------]/[------] [-----+
      :               107
      : 061/00    021/01    022/13    :
      +---] [--------] [--------] [---+
      :         30        99
      : 020/15    062/00              346/04                              023/05  :
  113 +---] [--------] [--------------+---]/[-----------------------------( )----+ xref below
      :27                                                                        :
      : 345/05                        :
      +---] [-------------------------+
      :
      : 062/00    021/01    022/17    067/00  :
      +---] [--------] [--------]/[------] [--+
      :         30        107
      : 346/05    346/11              :
      +---] [--------]/[--------------+
      :
      : 346/05    022/17    346/11    :
      +---] [--------]/[------] [-----+
      :               107
      : 062/00    021/01    022/13    :
      +---] [--------] [--------] [---+
      :         30        99
cross ref for    023/05 ] [ 13,94,95,96,130,165,166
                        ]/[ 98,98,98
      :
      :                                                                  023/06  : ] [ 22,131
      : 063/00    021/03              :                                          -( )----+ 167
  114 +---] [--------]/[--------------+
      :         31                    :
      : 346/06                        :
      +---] [-------------------------+
      :
      : 345/06                        :
      +---] [-------------------------+
```

```
         | 346/07    113/14                                         023/07  | ] [ 5,132
115  +---] [-------] [---+---------------------------------------------( )---+
     |                   |
     | 064/00    021/03  |
     +---] [--------]/[--+
     |           31      |
     | 345/07            |
     +---] [-------------+
     |
     | 346/10                                                       023/10  | ] [ 6
116  +---] [---------------------------------------------------------( )---+
     |
     | 346/11                                                       023/11  | ] [ 134
117  +---] [---+----------------------------------------------------( )---+
     |         |
     | 345/11  |
     +---] [---+
     |
     | 345/12                                                       023/12  | ] [ 135
118  +---] [---+----------------------------------------------------( )---+
     |         |
     | 072/00    021/03  |
     +---] [--------]/[--+
     |           31      |
     | 345/12            |
     +---] [-------------+
     |
     | 346/13                                                       023/13  | ] [ 136
119  +---] [---+----------------------------------------------------( )---+
     |         |
     | 051/00    021/03  |
     +---] [--------]/[--+
     |           31      |
     | 345/13            |
     +---] [-------------+
     |
     | 346/14                                                       023/14  | ] [ 137
120  +---] [---+----------------------------------------------------( )---+
     |         |
     | 052/00    021/03  |
     +---] [--------]/[--+
     |           31      |
     | 345/14            |
     +---] [-------------+
     |
     | 021/07                                                       023/15  | ] [ 138
121  +---] [---+----------------------------------------------------( )---+
     |53       |
     | 345/15  |
     +---] [---+
     |
     | 345/17                                                       023/17  | ] [ 140
122  +---] [---+----------------------------------------------------( )---+
     |         |
     | 346/17    022/14  |
     +---] [--------] [--+
     |           101     |
     | 021/10    073/00    021/03                    +-------------+ 075/17 |
123  +---] [--------]/[--------]/[-------------------+  Seq. Load  +--(EN)--+
     |64                 31                          | Counter  075|        |
     |                                               | Steps    100|  075/15|
     |                                               | Words/stp 001+--(DN)-+
     |                                               | File   201 - 344     |
     |                                               |                      |
     |                                               | Load    127          |
     |                                               |                      |
     |                                               +-------------+        |
```

```
        : 021/14   022/13   111/12   021/13                     +----------------------------+  076/17    : ] [ 161,162
124 +---]/[-------] [-------] [---]/[-----------------------+   :      Seq. Output          +-----(EN)----+ 163,164,165
    :51       99            58                              :   : Counter   076              :  076/15    : 166
    :                                                       :   : Steps     100              +-----(DN)---+
    :                                                       :   : Words/stp 001              :
    :                                                       :   : File      201  - 344       :
    :                                                       :   : Mask      122  - 122       :
    :                                                       :   : Output    345              :
    :                                                       :   :                            :
    :                                                       :   :                            :
    :                                                       :   +----------------------------+
    :
    : 021/03   055/00                                                                           015/00
125 +---]/[-------] [---+-------------------------------------------------------------------------( )---+
    :31                 :
    : 023/00            :
    +---] [-------------+
    :108
    : 021/03   056/00                                                                           015/01
126 +---]/[-------] [---+-------------------------------------------------------------------------( )---+
    :31                 :
    : 023/01            :
    +---] [-------------+
    :109
    : 021/03   057/00                                                                           015/02
127 +---]/[-------] [---+-------------------------------------------------------------------------( )---+
    :31                 :
    : 023/02            :
    +---] [-------------+
    :110
    : 021/03   060/00                                                                           015/03
128 +---]/[-------] [---+-------------------------------------------------------------------------( )---+
    :31                 :
    : 023/03            :
    +---] [-------------+
    :111
    : 021/03   061/00                                                                           015/04
129 +---]/[-------] [---+-------------------------------------------------------------------------( )---+
    :31                 :
    : 023/04            :
    +---] [-------------+
    :112
    : 021/03   062/00                                                                           015/05
130 +---]/[-------] [---+-------------------------------------------------------------------------( )---+
    :31                 :
    : 023/05            :
    +---] [-------------+
    :113
    : 023/06                                                                                    015/06
131 +---] [-------------------------------------------------------------------------------------( )---+
    :114
    : 023/07                                                                                    015/07
132 +---] [-------------------------------------------------------------------------------------( )---+
    :115
    : 020/03                                                                                    015/10
133 +---] [-------------+-------------------------------------------------------------------------( )---+
    :6                  :
    : 065/00   021/03   :
    +---] [-------]/[---+
    :         31        :
    : 345/10            :
    +---] [-------------+
    :
    : 057/00   021/03                                                                           015/11
134 +---] [-------]/[---+-------------------------------------------------------------------------( )---+
    :         31        :
    : 023/11            :
    +---] [-------------+
```

```
       !117
       ! 023/12                                                            015/12  !
   135 +---] [-----------------------------------------------------------------( )---+
       !118
       ! 023/13                                                            015/13  !
   136 +---] [-----------------------------------------------------------------( )---+
       !119
       ! 023/14                                                            015/14  !
   137 +---] [-----------------------------------------------------------------( )---+
       !120
       ! 023/15                                                            015/15  !
   138 +---] [-----------------------------------------------------------------( )---+
       !121
       ! 066/00    021/03                                                  015/16  !
   139 +---] [-------]/[----------------------------------------------------------( )---+
       !           31
       ! 021/03    071/00                                                  015/17  !
   140 +---]/[------] [---+------------------------------------------------------( )---+
       !31              !
       ! 023/17         !
       +---] [----------+
       !122
       ! 022/00                                                            016/00  !
   141 +---] [-----------------------------------------------------------------( )---+
       !76
       ! 022/01                                                            016/01  !
   142 +---] [-----------------------------------------------------------------( )---+
       !77
       ! 022/02                                                            016/02  !
   143 +---] [-----------------------------------------------------------------( )---+
       !78
       ! 022/03                                                            016/03  !
   144 +---] [-----------------------------------------------------------------( )---+
       !79
       ! 022/04                                                            016/04  !
   145 +---] [-----------------------------------------------------------------( )---+
       !80
       ! 022/05                                                            016/05  !
   146 +---] [-----------------------------------------------------------------( )---+
       !81
       ! 022/06                                                            016/06  !
   147 +---] [-----------------------------------------------------------------( )---+
       !82
       ! 022/07                                                            016/07  !
   148 +---] [-----------------------------------------------------------------( )---+
       !83
       ! 021/00                                                            016/10  !
   149 +---] [---+------------------------------------------------------------( )---+
       !29       !
       ! 021/01  !
       +---] [---+
       !30       !
       ! 021/03  !
       +---] [---+
       !31
       ! 020/02                                                            016/11  !
   150 +---] [-----------------------------------------------------------------( )---+
       !4
       ! 114/03                                                            016/12  ! ]/[ 29,30
   151 +---]/[-----------------------------------------------------------------( )---+
       !
       ! 070/00                                                            016/13  !
   152 +---] [-----------------------------------------------------------------( )---+
       !
       ! 073/00                                                            016/14  !
   153 +---] [-----------------------------------------------------------------( )---+
       !
       ! 021/00                                                            016/15  !
   154 +---] [-----------------------------------------------------------------( )---+
```

```
       !29
       ! 020/03    020/02                                                      016/16 !
  155  +---] [------] [--------------------------------------------------------( )---+
       !6       4
       ! 020/03    020/02                                                      016/17 !
  156  +---] [------] [--------------------------------------------------------( )---+
       !6       4
       ! 020/02                                                                017/10 !
  157  +---] [------------------------------------------------------------------( )---+
       !4
       ! 020/02                                                                017/12 !
  158  +---] [------------------------------------------------------------------( )---+
       !4
       !
  159  +----------------------------------------------------------------------(MCR)--+
       !
       ! 111/10    020/00    020/02
  160  +---]/[-----] [--------] [---------------------------------------------(MCR)--+
       !          1         4
       ! 066/00    023/00    111/11                022/14                      017/00 !
  161  +---]/[--+--] [--------] [--------------------+---]/[--------------------( )--+
       !       !108                                 !101
       !       ! 023/00    076/17   111/12   022/13 !
       !       +---] [------] [-------] [-------] [-+
       !         108       124              99
       ! 066/00    023/01    111/11                022/14                      017/01 !
  162  +---]/[--+--] [--------] [--------------------+---]/[--------------------( )--+
       !       !109                                 !101
       !       ! 023/01    076/17   111/12   022/13 !
       !       +---] [------] [-------] [-------] [-+
       !         109       124              99
       ! 066/00    023/02    111/11                022/14                      017/02 !
  163  +---]/[--+--] [--------] [--------------------+---]/[--------------------( )--+
       !       !110                                 !101
       !       ! 023/02    076/17   111/12   022/13 !
       !       +---] [------] [-------] [-------] [-+
       !         110       124              99
       ! 066/00    023/03    111/11                022/14                      017/03 !
  164  +---]/[--+--] [--------] [--------------------+---]/[--------------------( )--+
       !       !111                                 !101
       !       ! 023/03    076/17   111/12   022/13 !
       !       +---] [------] [-------] [-------] [-+
       !         111       124              99
       ! 066/00    023/04    111/11                022/14                      017/04 !
  165  +---]/[--+--] [--------] [--------------------+---]/[--------------------( )--+
       !       !112                                 !101
       !       ! 023/04    076/17   111/12   022/13 !
       !       +---] [------] [-------] [-------] [-+
       !         112       124              99
       ! 066/00    023/05    111/11                022/14                      017/05 !
  166  +---]/[--+--] [--------] [--------------------+---]/[--------------------( )--+
       !       !113                                 !101
       !       ! 023/05    076/17   111/12   022/13 !
       !       +---] [------] [-------] [-------] [-+
       !         113       124              99
       ! 022/14   114/02    023/06    020/15   031/15                          017/06 !
  167  +---]/[-----] [--------] [---+--] [--------] [---------------------------( )--+
       !101                 114    !27
       !                           ! 021/00 !
       !                           +---] [--+
       !                           !29
       !                           ! 021/01 !
       !                           +---] [--+
       !                            30
       ! 020/04                                                                017/07 !
  168  +---] [------------------------------------------------------------------( )--+
       !5
       ! 022/14    020/14    022/13                                            017/11 !
```

```
169 +---] [------]/[-------] [-------------------------------------------------( )---+
    |101      10       99                                                            |
    | 020/05                                                                017/13   |
170 +---] [----------------------------------------------------------------------( )---+
    |8                                                                               |
    | 020/06                                                                017/14   |
171 +---] [----------------------------------------------------------------------( )---+
    |9                                                                               |
    | 020/03   020/02                                                       017/15   |
172 +---] [------] [--------------------------------------------------------------( )---+
    |6        4                                                                      |
    | 020/07                                                                017/16   |
173 +---] [----------------------------------------------------------------------( )---+
    |12                                                                              |
    |                                                                                |
174 +--------------------------------------------------------------------------(MCR)--+
    |                                                                                |
    |                                                                                |
175 +--------------------------------------------------------------------------(END)--+
    |                                                                                |
```

Address Usage Report

| Word address | Type of references |
|---|---|
|  | 17 ---- ---- 00  17 ---- ---- 00  17 ---- ---- 00  17 ---- ---- 00 |
| 000 | ........ ........  ........ ........  ........ ........  ........ ........ |
| 004 | ........ ........  ........ ........  ........ ........  ........ ........ |
| 010 | ........ ........  ........ ........  ........ ........  ........ ........ |
| 014 | ........ ........  SSSSSSS SSSSSSS  SSSSSSS SSSSSSS  .SSSSSS SSSSSSS |
| 020 | SSSSSSS SSSSSSS  ...SSSS SSSSSSS  SSSSSSS SSSSSSS  S.SSSSS SSSSSSS |
| 024 | ........ ........  ........ ........  ........ ........  ........ ........ |
| 030 | SSSSSSS SSSSSSS  SSSSSSS SSSSSSS  SSSSSSS SSSSSSS  SSSSSSS SSSSSSS |
| 034 | SSSSSSS SSSSSSS  SSSSSSS SSSSSSS  SSSSSSS SSSSSSS  SSSSSSS SSSSSSS |
| 040 | SSSSSSS SSSSSSS  SSSSSSS SSSSSSS  SSSSSSS SSSSSSS  SSSSSSS SSSSSSS |
| 044 | SSSSSSS SSSSSSS  SSSSSSS SSSSSSS  SSSSSSS SSSSSSS  SSSSSSS SSSSSSS |
| 050 | SSSSSSS SSSSSSS  SSSSSSS SSSSSSS  SSSSSSS SSSSSSS  SSSSSSS SSSSSSS |
| 054 | SSSSSSS SSSSSSS  SSSSSSS SSSSSSS  SSSSSSS SSSSSSS  SSSSSSS SSSSSSS |
| 060 | SSSSSSS SSSSSSS  SSSSSSS SSSSSSS  SSSSSSS SSSSSSS  SSSSSSS SSSSSSS |
| 064 | SSSSSSS SSSSSSS  SSSSSSS SSSSSSS  SSSSSSS SSSSSSS  SSSSSSS SSSSSSS |
| 070 | SSSSSSS SSSSSSS  SSSSSSS SSSSSSS  SSSSSSS SSSSSSS  SSSSSSS SSSSSSS |
| 074 | SSSSSSS SSSSSSS  SSSSSSS SSSSSSS  SSSSSSS SSSSSSS  SSSSSSS SSSSSSS |
| 100 | ........ ........  ........ ........  ........ ........  ........ ........ |
| 104 | ........ ........  ........ ........  ........ ........  ........ ........ |
| 110 | SSSSSSS SSSSSSS  .SSSSSS SSSSS.S  SSSSSSS SSSSSSS  S..SSSS SSSSSSS |
| 114 | ........ SSSSSSS  ........ ........  ........ ........  ........ ........ |
| 120 | SSSSSSS SSSSSSS  SSSSSSS SSSSSSS  SSSSSSS SSSSSSS  SSSSSSS SSSSSSS |
| 124 | SSSSSSS SSSSSSS  SSSSSSS SSSSSSS  SSSSSSS SSSSSSS  SSSSSSS SSSSSSS |
| 130 | SSSSSSS SSSSSSS  SSSSSSS SSSSSSS  SSSSSSS SSSSSSS  SSSSSSS SSSSSSS |
| 134 | SSSSSSS SSSSSSS  SSSSSSS SSSSSSS  SSSSSSS SSSSSSS  SSSSSSS SSSSSSS |
| 140 | SSSSSSS SSSSSSS  SSSSSSS SSSSSSS  SSSSSSS SSSSSSS  SSSSSSS SSSSSSS |
| 144 | SSSSSSS SSSSSSS  SSSSSSS SSSSSSS  SSSSSSS SSSSSSS  SSSSSSS SSSSSSS |
| 150 | SSSSSSS SSSSSSS  SSSSSSS SSSSSSS  SSSSSSS SSSSSSS  SSSSSSS SSSSSSS |
| 154 | SSSSSSS SSSSSSS  SSSSSSS SSSSSSS  SSSSSSS SSSSSSS  SSSSSSS SSSSSSS |
| 160 | SSSSSSS SSSSSSS  SSSSSSS SSSSSSS  SSSSSSS SSSSSSS  SSSSSSS SSSSSSS |
| 164 | SSSSSSS SSSSSSS  SSSSSSS SSSSSSS  SSSSSSS SSSSSSS  SSSSSSS SSSSSSS |
| 170 | SSSSSSS SSSSSSS  SSSSSSS SSSSSSS  SSSSSSS SSSSSSS  SSSSSSS SSSSSSS |
| 174 | SSSSSSS SSSSSSS  ........ ........  ........ ........  SSSSSSS SSSSSSS |
| 200 | SSSSSSS SSSSSSS  SSSSSSS SSSSSSS  SSSSSSS SSSSSSS  SSSSSSS SSSSSSS |
| 204 | SSSSSSS SSSSSSS  SSSSSSS SSSSSSS  SSSSSSS SSSSSSS  SSSSSSS SSSSSSS |
| 210 | SSSSSSS SSSSSSS  SSSSSSS SSSSSSS  SSSSSSS SSSSSSS  SSSSSSS SSSSSSS |
| 214 | SSSSSSS SSSSSSS  SSSSSSS SSSSSSS  SSSSSSS SSSSSSS  SSSSSSS SSSSSSS |
| 220 | SSSSSSS SSSSSSS  SSSSSSS SSSSSSS  SSSSSSS SSSSSSS  SSSSSSS SSSSSSS |
| 224 | SSSSSSS SSSSSSS  SSSSSSS SSSSSSS  SSSSSSS SSSSSSS  SSSSSSS SSSSSSS |
| 230 | SSSSSSS SSSSSSS  SSSSSSS SSSSSSS  SSSSSSS SSSSSSS  SSSSSSS SSSSSSS |
| 234 | SSSSSSS SSSSSSS  SSSSSSS SSSSSSS  SSSSSSS SSSSSSS  SSSSSSS SSSSSSS |
| 240 | SSSSSSS SSSSSSS  SSSSSSS SSSSSSS  SSSSSSS SSSSSSS  SSSSSSS SSSSSSS |
| 244 | SSSSSSS SSSSSSS  SSSSSSS SSSSSSS  SSSSSSS SSSSSSS  SSSSSSS SSSSSSS |
| 250 | SSSSSSS SSSSSSS  SSSSSSS SSSSSSS  SSSSSSS SSSSSSS  SSSSSSS SSSSSSS |

BOEING PROGRAMMABLE MACHINE CONTROL — 20-Mar-85
Address Usage Report

| Word address | Type of references | | | | | | | |
|---|---|---|---|---|---|---|---|---|
| | 17 —— —— 00 | | 17 —— —— 00 | | 17 —— —— 00 | | 17 —— —— 00 | |
| 254 | SSSSSSS | SSSSSSS | SSSSSSS | SSSSSSS | SSSSSSS | SSSSSSS | SSSSSSS | SSSSSSS |
| 260 | SSSSSSS | SSSSSSS | SSSSSSS | SSSSSSS | SSSSSSS | SSSSSSS | SSSSSSS | SSSSSSS |
| 264 | SSSSSSS | SSSSSSS | SSSSSSS | SSSSSSS | SSSSSSS | SSSSSSS | SSSSSSS | SSSSSSS |
| 270 | SSSSSSS | SSSSSSS | SSSSSSS | SSSSSSS | SSSSSSS | SSSSSSS | SSSSSSS | SSSSSSS |
| 274 | SSSSSSS | SSSSSSS | SSSSSSS | SSSSSSS | SSSSSSS | SSSSSSS | SSSSSSS | SSSSSSS |
| 300 | SSSSSSS | SSSSSSS | SSSSSSS | SSSSSSS | SSSSSSS | SSSSSSS | SSSSSSS | SSSSSSS |
| 304 | SSSSSSS | SSSSSSS | SSSSSSS | SSSSSSS | SSSSSSS | SSSSSSS | SSSSSSS | SSSSSSS |
| 310 | SSSSSSS | SSSSSSS | SSSSSSS | SSSSSSS | SSSSSSS | SSSSSSS | SSSSSSS | SSSSSSS |
| 314 | SSSSSSS | SSSSSSS | SSSSSSS | SSSSSSS | SSSSSSS | SSSSSSS | SSSSSSS | SSSSSSS |
| 320 | SSSSSSS | SSSSSSS | SSSSSSS | SSSSSSS | SSSSSSS | SSSSSSS | SSSSSSS | SSSSSSS |
| 324 | SSSSSSS | SSSSSSS | SSSSSSS | SSSSSSS | SSSSSSS | SSSSSSS | SSSSSSS | SSSSSSS |
| 330 | SSSSSSS | SSSSSSS | SSSSSSS | SSSSSSS | SSSSSSS | SSSSSSS | SSSSSSS | SSSSSSS |
| 334 | SSSSSSS | SSSSSSS | SSSSSSS | SSSSSSS | SSSSSSS | SSSSSSS | SSSSSSS | SSSSSSS |
| 340 | SSSSSSS | SSSSSSS | SSSSSSS | SSSSSSS | SSSSSSS | SSSSSSS | SSSSSSS | SSSSSSS |
| 344 | SSSSSSS | SSSSSSS | SSSSSSS | SSSSSSS | SSSSSSS | SSSSSSS | SSSSSSS | SSSSSSS |
| 350 | SSSSSSS | SSSSSSS | ........ | ........ | ........ | ........ | ........ | ........ |
| 354 | ........ | ........ | ........ | ........ | ........ | ........ | ........ | ........ |
| 360 | ........ | ........ | ........ | ........ | ........ | ........ | ........ | ........ |
| 364 | ........ | ........ | ........ | ........ | ........ | ........ | ........ | ........ |
| 370 | ........ | ........ | ........ | ........ | ........ | ........ | ........ | ........ |
| 374 | ........ | ........ | ........ | ........ | ........ | ........ | ........ | ........ |

Unreferenced Description Report

| Address | Address description |
|---|---|

No unreferenced descriptions

Undefined Description Report

| Address | PC operation and references |
|---|---|
| 015/00 | |
| | ( ) 125 |
| 015/01 | |
| | ( ) 126 |
| 015/02 | |
| | ( ) 127 |
| 015/03 | |
| | ( ) 128 |
| 015/04 | |
| | ( ) 129 |
| 015/05 | |
| | ( ) 130 |
| 015/06 | |
| | ( ) 131 |
| 015/07 | |
| | ( ) 132 |
| 015/10 | |
| | ( ) 133 |
| 015/11 | |
| | ( ) 134 |
| 015/12 | |
| | ( ) 135 |
| 015/13 | |
| | ( ) 136 |
| 015/14 | |
| | ( ) 137 |
| 015/15 | |
| | ( ) 138 |
| 015/16 | |
| | ( ) 139 |

BOEING PROGRAMMABLE MACHINE CONTROL -- 20-Mar-85
Undefined Description Report

| Address | PC operation and references |
|---------|------------------------------|
| 015/17  |                              |
|         | ( ) 140                      |
| 016/00  |                              |
|         | ( ) 141                      |
| 016/01  |                              |
|         | ( ) 142                      |
| 016/02  |                              |
|         | ( ) 143                      |
| 016/03  |                              |
|         | ( ) 144                      |
| 016/04  |                              |
|         | ( ) 145                      |
| 016/05  |                              |
|         | ( ) 146                      |
| 016/06  |                              |
|         | ( ) 147                      |
| 016/07  |                              |
|         | ( ) 148                      |
| 016/10  |                              |
|         | ( ) 149                      |
| 016/11  |                              |
|         | ( ) 150                      |
| 016/12  |                              |
|         | I/I 29,30                    |
|         | ( ) 151                      |
| 016/13  |                              |
|         | ( ) 152                      |
| 016/14  |                              |
|         | ( ) 153                      |
| 016/15  |                              |
|         | ( ) 154                      |
| 016/16  |                              |
|         | ( ) 155                      |
| 016/17  |                              |
|         | ( ) 156                      |
| 017/00  |                              |
|         | ( ) 161                      |
| 017/01  |                              |
|         | ( ) 162                      |
| 017/02  |                              |
|         | ( ) 163                      |
| 017/03  |                              |
|         | ( ) 164                      |
| 017/04  |                              |
|         | ( ) 165                      |
| 017/05  |                              |
|         | ( ) 166                      |
| 017/06  |                              |
|         | ( ) 167                      |
| 017/07  |                              |
|         | ( ) 168                      |
| 017/10  |                              |
|         | ( ) 157                      |
| 017/11  |                              |
|         | ( ) 169                      |
| 017/12  |                              |
|         | ( ) 158                      |
| 017/13  |                              |
|         | ( ) 170                      |
| 017/14  |                              |
|         | ( ) 171                      |
| 017/15  |                              |
|         | ( ) 172                      |
| 017/16  |                              |
|         | ( ) 173                      |

```
Address     PC operation and references
            ──────────────────────────
020/00
            ] [ 2,3,160
            ( ) 1
020/01
            ] [ 4,29,30
            ( ) 3
020/02
            ] [ 4,5,12,150,155,156,157,158,160,172
            ( ) 4
020/03
            ] [ 133,155,156,172
            ]/[ 8,9
            ( ) 6
020/04
            ] [ 168
            ( ) 5
020/05
            ] [ 170
            ( ) 8
020/06
            ] [ 171
            ( ) 9
020/07
            ] [ 27,173
            ( ) 12
020/10
            ] [ 22,103
            ]/[ 100,101,102
            ( ) 13
020/11
            ] [ 41
            ( ) 7
020/12
            ] [ 21,23,24,26
            ]/[ 6
            ( ) 24
020/13
            ] [ 21,23,25,26,28
            ( ) 25
020/14
            ] [ 11,99,101
            ]/[ 169
            ( ) 10
020/15
            ] [ 13,22,108,109,110,111,112,113,167
            ]/[ 15,16,17,18,19,20
            ( ) 27
020/16
            ]/[ 101
            ( ) 103
020/17
            ] [ 101
            ( ) 104
021/00
            ] [ 5,6,7,13,29,41,45,46,51,55,58,71,99,149,154,167
            ]/[ 21,28,53,56,65,75
            ( ) 29
021/01
            ] [ 7,13,15,16,17,18,19,20,28,30,99,108,108,109,109,110,110,111,111,112,112,113,113,149,167
            ]/[ 13,27,28,53
            ( ) 30
021/02
            ] [ 28,40
            ]/[ 29,30,31
            ( ) 39
021/03
            ] [ 31,32,33,34,35,37,38,149
```

BOEING PROGRAMMABLE MACHINE CONTROL -- 20-Mar-85
Undefined Description Report

| Address | PC operation and references |
|---|---|
| | ]/[ 21,23,26,28,36,53,69,70,72,114,115,118,119,120,123,125,126,127,128,129,130,133,134,139,140 |
| | ( ) 31 |
| 021/04 | |
| | ] [ 43 |
| | ]/[ 42 |
| | ( ) 43 |
| 021/05 | |
| | ] [ 49,50 |
| | ( ) 49 |
| 021/06 | |
| | ] [ 46 |
| | ]/[ 45 |
| | ( ) 46 |
| 021/07 | |
| | ] [ 53,54,75,121 |
| | ]/[ 46,57,65 |
| | ( ) 53 |
| 021/10 | |
| | ] [ 14,15,16,17,18,19,20,21,28,42,43,44,55,61,73,123 |
| | ( ) 64 |
| 021/11 | |
| | ] [ 55,67,68 |
| | ]/[ 46,58 |
| | ( ) 65 |
| 021/12 | |
| | ] [ 37,67 |
| | ]/[ 38,68 |
| | ( ) 74 |
| 021/13 | |
| | ] [ 56,58,71 |
| | ]/[ 29,75,124 |
| | ( ) 58 |
| 021/14 | |
| | ] [ 51,52 |
| | ]/[ 124 |
| | ( ) 51 |
| 022/00 | |
| | ] [ 141 |
| | ( ) 76 |
| 022/01 | |
| | ] [ 142 |
| | ( ) 77 |
| 022/02 | |
| | ] [ 143 |
| | ( ) 78 |
| 022/03 | |
| | ] [ 144 |
| | ( ) 79 |
| 022/04 | |
| | ] [ 145 |
| | ( ) 80 |
| 022/05 | |
| | ] [ 146 |
| | ( ) 81 |
| 022/06 | |
| | ] [ 147 |
| | ( ) 82 |
| 022/07 | |
| | ] [ 148 |
| | ( ) 83 |
| 022/10 | |
| | ] [ 99 |
| | ]/[ 101 |
| | ( ) 68 |
| 022/11 | |
| | ] [ 99 |

```
Address    PC operation and references
           ---------+--------+---------
           ]/[ 101
           ( ) 93
022/12
           ] [ 99
           ]/[ 101
           ( ) 98
022/13
           ] [ 22,30,46,49,99,100,101,102,103,105,106,107,108,109,110,111,112,113,124,161,162,163,164,165,166,169
           ]/[ 47,50,51,58
           ( ) 99
022/14
           ] [ 11,101,122,169
           ]/[ 100,161,162,163,164,165,166,167
           ( ) 101
022/15
           ] [ 105
           ]/[ 103,108,108,109,109
           ( ) 105
022/16
           ] [ 106
           ]/[ 103,110,110,111,111
           ( ) 106
022/17
           ] [ 107
           ]/[ 103,112,112,113,113
           ( ) 107
023/00
           ] [ 13,84,85,125,161,161
           ]/[ 88,88
           ( ) 108
023/01
           ] [ 13,86,87,126,162,162
           ]/[ 88,88
           ( ) 109
023/02
           ] [ 13,89,90,127,163,163
           ]/[ 93,93
           ( ) 110
023/03
           ] [ 13,91,92,128,164,164
           ]/[ 93,93
           ( ) 111
023/04
           ] [ 13,97,129,165,165
           ]/[ 98
           ( ) 112
023/05
           ] [ 13,94,95,96,130,166,166
           ]/[ 98,98,98
           ( ) 113
023/06
           ] [ 22,131,167
           ( ) 114
023/07
           ] [ 5,132
           ( ) 115
023/10
           ] [ 6
           ( ) 116
023/11
           ] [ 134
           ( ) 117
023/12
           ] [ 135
           ( ) 118
```

Undefined Description Report

| Address | PC operation and references |
|---|---|
| 023/13 | |
| | ] [ 136 |
| | ( ) 119 |
| 023/14 | |
| | ] [ 137 |
| | ( ) 120 |
| 023/15 | |
| | ] [ 138 |
| | ( ) 121 |
| 023/17 | |
| | ] [ 140 |
| | ( ) 122 |
| 030/15 | |
| | ]/[ 99,99 |
| 031/15 | |
| | ] [ 10,167 |
| 031/17 | |
| | ]/[ 99 |
| 032/15 | |
| | ] [ 59 |
| 032/17 | |
| | ] [ 60,61,62 |
| | ]/[ 64,73 |
| 033/15 | |
| | ] [ 88 |
| 033/17 | |
| | ] [ 84 |
| 034/15 | |
| | ] [ 98 |
| 034/17 | |
| | ] [ 85 |
| 035/15 | |
| | ] [ 98 |
| 035/17 | |
| | ] [ 86 |
| 036/15 | |
| | ] [ 98 |
| 036/17 | |
| | ] [ 87 |
| 037/15 | |
| | ] [ 93 |
| 037/17 | |
| | ] [ 89 |
| 040/15 | |
| | ] [ 93 |
| 040/17 | |
| | ] [ 90 |
| 041/15 | |
| | ] [ 93 |
| 041/17 | |
| | ] [ 91 |
| 042/15 | |
| | ] [ 93 |
| 042/17 | |
| | ] [ 92 |
| 043/15 | |
| | ] [ 98 |
| 043/17 | |
| | ] [ 94 |
| 044/15 | |
| | ] [ 98 |
| 044/17 | |
| | ] [ 95 |
| 045/15 | |
| | ] [ 98 |
| 045/17 | |
| | ] [ 96 |

BOEING PROGRAMMABLE MACHINE CONTROL — 20-Mar-85
Undefined Description Report

| Address | PC operation and references |
|---|---|
| 046/15 | ] [ 98 |
| 046/17 | ] [ 97 |
| 047/15 | ] [ 28 |
|  | ]/[ 51,99 |
| 047/17 | ]/[ 22 |
| 050/15 | ] [ 53,54 |
| 050/17 | ] [ 57 |
| 051/00 | ] [ 42,42,43,44,119 |
| 052/00 | ] [ 42,44,44,120 |
|  | ]/[ 43 |
| 053/15 | ] [ 101 |
| 054/15 | ] [ 49 |
| 054/17 | ] [ 50 |
|  | ]/[ 46,48 |
| 055/00 | ] [ 15,15,15,15,108,108,108,125 |
|  | ]/[ 16 |
| 056/00 | ] [ 16,16,16,16,109,109,109,126 |
|  | ]/[ 15 |
| 057/00 | ] [ 17,17,17,17,110,110,110,127 |
|  | ]/[ 18 |
| 060/00 | ] [ 18,18,18,18,111,111,111,128 |
|  | ]/[ 17 |
| 061/00 | ] [ 19,19,19,19,112,112,112,129 |
|  | ]/[ 20 |
| 062/00 | ] [ 20,20,20,20,113,113,113,130 |
|  | ]/[ 19 |
| 063/00 | ] [ 21,21,21,21,24,25,114 |
| 064/00 | ] [ 5,23,23,23,24,25,115 |
| 065/00 | ] [ 6,24,25,26,26,26,26,133 |
| 066/00 | ] [ 41,41,132 |
|  | ]/[ 22,41,100,161,162,163,164,165,166 |
| 066/15 | ] [ 39 |
| 067/00 | ] [ 15,16,17,18,19,20,25,28,28,28,28,28,99,105,106,107,108,109,110,111,112,113,134 |
| 070/00 | ] [ 49,49,50,50,50,152 |
|  | ]/[ 47,48,51 |
| 071/00 | ] [ 14,14,140 |
| 072/00 | ] [ 53,55,55,55,55,55,118 |
|  | ]/[ 69 |
| 073/00 | ] [ 59,59,61,73,153 |
|  | ]/[ 63,123 |

| Address | PC operation and references |
|---------|------------------------------|
| 074/15  | |
|         | ]/[ 61 |
|         | Word-File Move 60 |
| 075/15  | |
|         | Seq. Load 123 |
| 075/17  | |
|         | Seq. Load 123 |
| 076/15  | |
|         | Seq. Output 124 |
| 076/17  | |
|         | ] [ 161,162,163,164,165,166 |
|         | Seq. Output 124 |
| 077/15  | |
|         | File-Word Move 33 |
| 110/00  | |
|         | ] [ 15,16 |
| 110/01  | |
|         | ] [ 15,16 |
| 110/02  | |
|         | ] [ 17,18 |
| 110/03  | |
|         | ] [ 17,18 |
| 110/04  | |
|         | ] [ 19,20 |
| 110/05  | |
|         | ] [ 19,20 |
| 110/06  | |
|         | ] [ 21 |
| 110/07  | |
|         | ] [ 23,23,23 |
| 110/10  | |
|         | ] [ 26,26,26 |
| 110/11  | |
|         | ] [ 28 |
| 110/12  | |
|         | ] [ 55 |
| 110/13  | |
|         | ] [ 42 |
| 110/14  | |
|         | ] [ 44 |
| 110/15  | |
|         | ] [ 53,54,55,69 |
|         | ]/[ 46,48,51,58,70 |
| 110/16  | |
|         | ] [ 39,41 |
|         | ]/[ 39 |
| 110/17  | |
|         | ] [ 14 |
| 111/00  | |
|         | ] [ 29,30,31,41,52,55 |
|         | ]/[ 50,71 |
| 111/02  | |
|         | ] [ 64,65 |
|         | ]/[ 53,72 |
| 111/03  | |
|         | ] [ 49 |
| 111/04  | |
|         | ] [ 59 |
| 111/05  | |
|         | ] [ 4 |
| 111/06  | |
|         | ]/[ 4 |
| 111/07  | |
|         | ] [ 27 |
| 111/10  | |
|         | ] [ 14,21,23,23,24,26,26,28,31,42,42,44,44,55,59,64,69,70,72,73,76,77,78,79,80,81,82,83 |
|         | ]/[ 15,16,17,18,19,20,22,23,26,26,42,44,59,160 |

BOEING PROGRAMMABLE MACHINE CONTROL -- 20-Mar-85
Undefined Description Report

| Address | PC operation and references |
|---|---|
| 111/11 | |
| | ] [ 14,21,23,23,26,26,27,30,41,55,161,162,163,164,165,166 |
| | ]/[ 53,74 |
| 111/12 | |
| | ] [ 5,6,10,15,16,17,18,19,20,21,23,25,26,28,29,41,48,49,55,55,65,71,75,76,77,78,79,80,81,82,83,124,161,162,163,164,165 |
| | 166 |
| | ]/[ 15,16,17,18,19,20,21,23,39,49 |
| 111/13 | |
| | ] [ 4,6 |
| | ]/[ 26 |
| 111/14 | |
| | ] [ 7 |
| 111/15 | |
| | ]/[ 7 |
| 111/16 | |
| | ] [ 4 |
| 112/00 | |
| | ] [ 88 |
| | ]/[ 86 |
| 112/01 | |
| | ] [ 88 |
| | ]/[ 87 |
| 112/02 | |
| | ] [ 88 |
| | ]/[ 84 |
| 112/03 | |
| | ] [ 88 |
| | ]/[ 85 |
| 112/04 | |
| | ] [ 93 |
| | ]/[ 91 |
| 112/05 | |
| | ] [ 93 |
| | ]/[ 92 |
| 112/06 | |
| | ] [ 93 |
| | ]/[ 89 |
| 112/07 | |
| | ] [ 93 |
| | ]/[ 90 |
| 112/10 | |
| | ] [ 98 |
| | ]/[ 94 |
| 112/11 | |
| | ] [ 98 |
| | ]/[ 95 |
| 112/12 | |
| | ] [ 98 |
| | ]/[ 96 |
| 112/13 | |
| | ] [ 98 |
| | ]/[ 97 |
| 112/14 | |
| | ]/[ 15,16,104,105 |
| 112/15 | |
| | ]/[ 19,20,104,107 |
| 112/16 | |
| | ]/[ 17,18,104,106 |
| 112/17 | |
| | ]/[ 49 |
| 113/10 | |
| | ] [ 6,26,26 |
| | ]/[ 26 |
| 113/11 | |
| | ] [ 6 |
| 113/12 | |
| | ]/[ 1 |

| Address | PC operation and references |
|---------|------------------------------|
| 113/13  | ] [ 5,23,23 |
|         | ]/[ 23 |
| 113/14  | ] [ 5,115 |
| 113/17  | ]/[ 99,99,99 |
| 114/00  | ] [ 8 |
| 114/01  | ] [ 9 |
| 114/02  | ] [ 3,167 |
| 114/03  | ]/[ 151 |
| 114/04  | ]/[ 7 |
| 114/05  | ]/[ 6,8,9,26,26 |
| 114/06  | ] [ 4 |
| 114/07  | ] [ 4 |
| 121/00  | ] [ 76 |
| 121/01  | ] [ 77 |
| 121/02  | ] [ 78 |
| 121/03  | ] [ 79 |
| 121/04  | ] [ 80 |
| 121/05  | ] [ 81 |
| 121/06  | ] [ 82 |
| 121/07  | ] [ 83 |
| 126/00  | ] [ 76 |
| 126/01  | ] [ 77 |
| 126/02  | ] [ 78 |
| 126/03  | ] [ 79 |
| 126/04  | ] [ 80 |
| 126/05  | ] [ 81 |
| 126/06  | ] [ 82 |
| 126/07  | ] [ 83 |
| 345/00  | ] [ 108 |
| 345/01  | ] [ 109 |
| 345/02  | ] [ 110 |
| 345/03  | ] [ 111 |
| 345/04  | ] [ 112 |
| 345/05  | ] [ 113 |

| Address | PC operation and references |
|---------|------------------------------|
| 345/06  | ] [ 114 |
| 345/07  | ] [ 115 |
| 345/10  | ] [ 133 |
| 345/11  | ] [ 117 |
| 345/12  | ] [ 118 |
| 345/13  | ] [ 119 |
| 345/14  | ] [ 120 |
| 345/15  | ] [ 121 |
| 345/17  | ] [ 122 |
| 346/00  | ] [ 108,108<br>]/[ 109 |
| 346/01  | ] [ 109,109<br>]/[ 108 |
| 346/02  | ] [ 110,110<br>]/[ 111 |
| 346/03  | ] [ 111,111<br>]/[ 110 |
| 346/04  | ] [ 112,112<br>]/[ 113 |
| 346/05  | ] [ 113,113<br>]/[ 112 |
| 346/06  | ] [ 114 |
| 346/07  | ] [ 115 |
| 346/10  | ] [ 116 |
| 346/11  | ] [ 99,103,104,105,106,107,108,109,110,111,112,113,117<br>]/[ 10,108,109,110,111,112,113 |
| 346/12  | ] [ 48,51,55,57,58,118<br>]/[ 47 |
| 346/13  | ] [ 45,46,47,48,50,119 |
| 346/14  | ] [ 47,48,50,51,120<br>]/[ 45 |
| 346/15  | ] [ 57 |
| 346/17  | ] [ 99,101,102,103,104,122<br>]/[ 10 |
| 015     | [G] 72 |
| 030     | (TON 0.1) 11 |
| 031     | (TON 1.0) 22 |
| 032     | (TON 0.1) 61<br>[G] 62,63 |

BOEING PROGRAMMABLE MACHINE CONTROL -- 20-Mar-85
Undefined Description Report

| Address | PC operation and references |
|---------|------------------------------|
| 033 | |
| | (TON .01) 84 |
| 034 | |
| | (TON .01) 85 |
| 035 | |
| | (TON .01) 86 |
| 036 | |
| | (TON .01) 87 |
| 037 | |
| | (TON .01) 89 |
| 040 | |
| | (TON .01) 90 |
| 041 | |
| | (TON .01) 91 |
| 042 | |
| | (TON .01) 92 |
| 043 | |
| | (TON .01) 94 |
| 044 | |
| | (TON .01) 95 |
| 045 | |
| | (TON .01) 96 |
| 046 | |
| | (TON .01) 97 |
| 047 | |
| | (TON 0.1) 100 |
| 050 | |
| | (TOF 0.1) 57 |
| 051 | |
| | (CTU) 42 |
| 052 | |
| | (CTU) 44 |
| 053 | |
| | (TON 0.1) 102 |
| 054 | |
| | (TON 0.1) 50 |
| 055 | |
| | (CTU) 15 |
| 056 | |
| | (CTU) 16 |
| 057 | |
| | (CTU) 17 |
| 060 | |
| | (CTU) 18 |
| 061 | |
| | (CTU) 19 |
| 062 | |
| | (CTU) 20 |
| 063 | |
| | (CTU) 21 |
| 064 | |
| | (CTU) 23 |
| 065 | |
| | (CTU) 26 |
| 066 | |
| | (CTU) 41 |
| | (CTR) 40 |
| 067 | |
| | (CTU) 28 |
| 070 | |
| | (CTU) 49 |
| 071 | |
| | (CTU) 14 |
| 072 | |
| | (CTU) 55 |
| 073 | |
| | (CTU) 59 |

BOEING PROGRAMMABLE MACHINE CONTROL -- 20-Mar-85
Undefined Description Report

| Address | PC operation and references |
|---------|------------------------------|
| 074 | |
| | (PUT) 62,63 |
| | Word-File Move 60 |
| 075 | |
| | [G] 70 |
| | (PUT) 37,69,73 |
| | (-) 38 |
| | Seq. Load 123 |
| 076 | |
| | [G] 45,71,75 |
| | (PUT) 47,52,54,67 |
| | (-) 68 |
| | Seq. Output 124 |
| 077 | |
| | [G] 32 |
| | (PUT) 35 |
| | File-Word Move 33 |
| 120 | |
| | [G] 34,37,38,67,68,74 |
| | (PUT) 66 |
| 121 | |
| | (PUT) 71 |
| | (+) 75 |
| 122 | |
| | Seq. Output 124 |
| 123 | |
| | [G] 36,54,56,69,73 |
| | Word-File Move 60 |
| 124 | |
| | [G] 32,34,38,45,68,70,75 |
| | [C] 74 |
| 125 | |
| | [G] 47,52 |
| | (-) 45 |
| 126 | |
| | (+) 70 |
| | (-) 32 |
| 127 | |
| | (PUT) 72 |
| | Seq. Load 123 |
| 130 | |
| | (TON 0.1) 11 |
| 131 | |
| | (TON 1.0) 22 |
| 132 | |
| | (TON 0.1) 61 |
| 133 | |
| | (TON .01) 84 |
| 134 | |
| | (TON .01) 85 |
| 135 | |
| | (TON .01) 86 |
| 136 | |
| | (TON .01) 87 |
| 137 | |
| | (TON .01) 89 |
| 140 | |
| | (TON .01) 90 |
| 141 | |
| | (TON .01) 91 |
| 142 | |
| | (TON .01) 92 |
| 143 | |
| | (TON .01) 94 |
| 144 | |
| | (TON .01) 95 |
| 145 | |
| | (TON .01) 96 |

Undefined Description Report

| Address | PC operation and references |
|---|---|
| 146 | |
| | (TON .01) 97 |
| 147 | |
| | (TON 0.1) 100 |
| 150 | |
| | (TOF 0.1) 57 |
| 151 | |
| | (CTU) 42 |
| 152 | |
| | (CTU) 44 |
| 153 | |
| | (TON 0.1) 102 |
| 154 | |
| | (TON 0.1) 50 |
| 155 | |
| | (CTU) 15 |
| 156 | |
| | (CTU) 16 |
| 157 | |
| | (CTU) 17 |
| 160 | |
| | (CTU) 18 |
| 161 | |
| | (CTU) 19 |
| 162 | |
| | (CTU) 20 |
| 163 | |
| | (CTU) 21 |
| 164 | |
| | (CTU) 23 |
| 165 | |
| | (CTU) 26 |
| 166 | |
| | (CTU) 41 |
| | (CTR) 40 |
| 167 | |
| | (CTU) 28 |
| 170 | |
| | (CTU) 49 |
| 171 | |
| | (CTU) 14 |
| 172 | |
| | (CTU) 55 |
| 173 | |
| | (CTU) 59 |
| 174 | |
| | Word-File Move 60 |
| 177 | |
| | File-Word Move 33 |
| 200 | |
| | Word-File Move 60 |
| | File-Word Move 33 |
| 201 | |
| | Seq. Output 124 |
| | Seq. Load 123 |
| | Word-File Move 60 |
| | File-Word Move 33 |
| 202 | |
| | Seq. Output 124 |
| | Seq. Load 123 |
| | Word-File Move 60 |
| | File-Word Move 33 |
| 203 | |
| | Seq. Output 124 |
| | Seq. Load 123 |
| | Word-File Move 60 |
| | File-Word Move 33 |

| Address | PC operation and references |
|---|---|
| 204 | Seq. Output 124<br>Seq. Load 123<br>Word-File Move 60<br>File-Word Move 33 |
| 205 | Seq. Output 124<br>Seq. Load 123<br>Word-File Move 60<br>File-Word Move 33 |
| 206 | Seq. Output 124<br>Seq. Load 123<br>Word-File Move 60<br>File-Word Move 33 |
| 207 | Seq. Output 124<br>Seq. Load 123<br>Word-File Move 60<br>File-Word Move 33 |
| 210 | Seq. Output 124<br>Seq. Load 123<br>Word-File Move 60<br>File-Word Move 33 |
| 211 | Seq. Output 124<br>Seq. Load 123<br>Word-File Move 60<br>File-Word Move 33 |
| 212 | Seq. Output 124<br>Seq. Load 123<br>Word-File Move 60<br>File-Word Move 33 |
| 213 | Seq. Output 124<br>Seq. Load 123<br>Word-File Move 60<br>File-Word Move 33 |
| 214 | Seq. Output 124<br>Seq. Load 123<br>Word-File Move 60<br>File-Word Move 33 |
| 215 | Seq. Output 124<br>Seq. Load 123<br>Word-File Move 60<br>File-Word Move 33 |
| 216 | Seq. Output 124<br>Seq. Load 123<br>Word-File Move 60<br>File-Word Move 33 |
| 217 | Seq. Output 124<br>Seq. Load 123<br>Word-File Move 60<br>File-Word Move 33 |
| 220 | Seq. Output 124<br>Seq. Load 123<br>Word-File Move 60<br>File-Word Move 33 |
| 221 | Seq. Output 124<br>Seq. Load 123 |

Undefined Description Report

| Address | PC operation and references |
|---------|------------------------------|
|         | Word-File Move 60            |
|         | File-Word Move 33            |
| 222     |                              |
|         | Seq. Output 124              |
|         | Seq. Load 123                |
|         | Word-File Move 60            |
|         | File-Word Move 33            |
| 223     |                              |
|         | Seq. Output 124              |
|         | Seq. Load 123                |
|         | Word-File Move 60            |
|         | File-Word Move 33            |
| 224     |                              |
|         | Seq. Output 124              |
|         | Seq. Load 123                |
|         | Word-File Move 60            |
|         | File-Word Move 33            |
| 225     |                              |
|         | Seq. Output 124              |
|         | Seq. Load 123                |
|         | Word-File Move 60            |
|         | File-Word Move 33            |
| 226     |                              |
|         | Seq. Output 124              |
|         | Seq. Load 123                |
|         | Word-File Move 60            |
|         | File-Word Move 33            |
| 227     |                              |
|         | Seq. Output 124              |
|         | Seq. Load 123                |
|         | Word-File Move 60            |
|         | File-Word Move 33            |
| 230     |                              |
|         | Seq. Output 124              |
|         | Seq. Load 123                |
|         | Word-File Move 60            |
|         | File-Word Move 33            |
| 231     |                              |
|         | Seq. Output 124              |
|         | Seq. Load 123                |
|         | Word-File Move 60            |
|         | File-Word Move 33            |
| 232     |                              |
|         | Seq. Output 124              |
|         | Seq. Load 123                |
|         | Word-File Move 60            |
|         | File-Word Move 33            |
| 233     |                              |
|         | Seq. Output 124              |
|         | Seq. Load 123                |
|         | Word-File Move 60            |
|         | File-Word Move 33            |
| 234     |                              |
|         | Seq. Output 124              |
|         | Seq. Load 123                |
|         | Word-File Move 60            |
|         | File-Word Move 33            |
| 235     |                              |
|         | Seq. Output 124              |
|         | Seq. Load 123                |
|         | Word-File Move 60            |
|         | File-Word Move 33            |
| 236     |                              |
|         | Seq. Output 124              |
|         | Seq. Load 123                |
|         | Word-File Move 60            |
|         | File-Word Move 33            |
| 237     |                              |

| Address | PC operation and references |
|---|---|
|  | Seq. Output 124 |
|  | Seq. Load 123 |
|  | Word-File Move 60 |
|  | File-Word Move 33 |
| 240 |  |
|  | Seq. Output 124 |
|  | Seq. Load 123 |
|  | Word-File Move 60 |
|  | File-Word Move 33 |
| 241 |  |
|  | Seq. Output 124 |
|  | Seq. Load 123 |
|  | Word-File Move 60 |
|  | File-Word Move 33 |
| 242 |  |
|  | Seq. Output 124 |
|  | Seq. Load 123 |
|  | Word-File Move 60 |
|  | File-Word Move 33 |
| 243 |  |
|  | Seq. Output 124 |
|  | Seq. Load 123 |
|  | Word-File Move 60 |
|  | File-Word Move 33 |
| 244 |  |
|  | Seq. Output 124 |
|  | Seq. Load 123 |
|  | Word-File Move 60 |
|  | File-Word Move 33 |
| 245 |  |
|  | Seq. Output 124 |
|  | Seq. Load 123 |
|  | Word-File Move 60 |
|  | File-Word Move 33 |
| 246 |  |
|  | Seq. Output 124 |
|  | Seq. Load 123 |
|  | Word-File Move 60 |
|  | File-Word Move 33 |
| 247 |  |
|  | Seq. Output 124 |
|  | Seq. Load 123 |
|  | Word-File Move 60 |
|  | File-Word Move 33 |
| 250 |  |
|  | Seq. Output 124 |
|  | Seq. Load 123 |
|  | Word-File Move 60 |
|  | File-Word Move 33 |
| 251 |  |
|  | Seq. Output 124 |
|  | Seq. Load 123 |
|  | Word-File Move 60 |
|  | File-Word Move 33 |
| 252 |  |
|  | Seq. Output 124 |
|  | Seq. Load 123 |
|  | Word-File Move 60 |
|  | File-Word Move 33 |
| 253 |  |
|  | Seq. Output 124 |
|  | Seq. Load 123 |
|  | Word-File Move 60 |
|  | File-Word Move 33 |
| 254 |  |
|  | Seq. Output 124 |
|  | Seq. Load 123 |

| Address | PC operation and references |
|---------|------------------------------|
|         | Word-File Move 60            |
|         | File-Word Move 33            |
| 255     |                              |
|         | Seq. Output 124              |
|         | Seq. Load 123                |
|         | Word-File Move 60            |
|         | File-Word Move 33            |
| 256     |                              |
|         | Seq. Output 124              |
|         | Seq. Load 123                |
|         | Word-File Move 60            |
|         | File-Word Move 33            |
| 257     |                              |
|         | Seq. Output 124              |
|         | Seq. Load 123                |
|         | Word-File Move 60            |
|         | File-Word Move 33            |
| 260     |                              |
|         | Seq. Output 124              |
|         | Seq. Load 123                |
|         | Word-File Move 60            |
|         | File-Word Move 33            |
| 261     |                              |
|         | Seq. Output 124              |
|         | Seq. Load 123                |
|         | Word-File Move 60            |
|         | File-Word Move 33            |
| 262     |                              |
|         | Seq. Output 124              |
|         | Seq. Load 123                |
|         | Word-File Move 60            |
|         | File-Word Move 33            |
| 263     |                              |
|         | Seq. Output 124              |
|         | Seq. Load 123                |
|         | Word-File Move 60            |
|         | File-Word Move 33            |
| 264     |                              |
|         | Seq. Output 124              |
|         | Seq. Load 123                |
|         | Word-File Move 60            |
|         | File-Word Move 33            |
| 265     |                              |
|         | Seq. Output 124              |
|         | Seq. Load 123                |
|         | Word-File Move 60            |
|         | File-Word Move 33            |
| 266     |                              |
|         | Seq. Output 124              |
|         | Seq. Load 123                |
|         | Word-File Move 60            |
|         | File-Word Move 33            |
| 267     |                              |
|         | Seq. Output 124              |
|         | Seq. Load 123                |
|         | Word-File Move 60            |
|         | File-Word Move 33            |
| 270     |                              |
|         | Seq. Output 124              |
|         | Seq. Load 123                |
|         | Word-File Move 60            |
|         | File-Word Move 33            |
| 271     |                              |
|         | Seq. Output 124              |
|         | Seq. Load 123                |
|         | Word-File Move 60            |
|         | File-Word Move 33            |

| Address | PC operation and references |
|---|---|
| 272 | Seq. Output 124<br>Seq. Load 123<br>Word-File Move 60<br>File-Word Move 33 |
| 273 | Seq. Output 124<br>Seq. Load 123<br>Word-File Move 60<br>File-Word Move 33 |
| 274 | Seq. Output 124<br>Seq. Load 123<br>Word-File Move 60<br>File-Word Move 33 |
| 275 | Seq. Output 124<br>Seq. Load 123<br>Word-File Move 60<br>File-Word Move 33 |
| 276 | Seq. Output 124<br>Seq. Load 123<br>Word-File Move 60<br>File-Word Move 33 |
| 277 | Seq. Output 124<br>Seq. Load 123<br>Word-File Move 60<br>File-Word Move 33 |
| 300 | Seq. Output 124<br>Seq. Load 123<br>Word-File Move 60<br>File-Word Move 33 |
| 301 | Seq. Output 124<br>Seq. Load 123<br>Word-File Move 60<br>File-Word Move 33 |
| 302 | Seq. Output 124<br>Seq. Load 123<br>Word-File Move 60<br>File-Word Move 33 |
| 303 | Seq. Output 124<br>Seq. Load 123<br>Word-File Move 60<br>File-Word Move 33 |
| 304 | Seq. Output 124<br>Seq. Load 123<br>Word-File Move 60<br>File-Word Move 33 |
| 305 | Seq. Output 124<br>Seq. Load 123<br>Word-File Move 60<br>File-Word Move 33 |
| 306 | Seq. Output 124<br>Seq. Load 123<br>Word-File Move 60<br>File-Word Move 33 |

BOEING PROGRAMMABLE MACHINE CONTROL -- 20-Mar-85
Undefined Description Report

| Address | PC operation and references |
|---------|------------------------------|
| 307 | Seq. Output 124<br>Seq. Load 123<br>Word-File Move 60<br>File-Word Move 33 |
| 310 | Seq. Output 124<br>Seq. Load 123<br>Word-File Move 60<br>File-Word Move 33 |
| 311 | Seq. Output 124<br>Seq. Load 123<br>Word-File Move 60<br>File-Word Move 33 |
| 312 | Seq. Output 124<br>Seq. Load 123<br>Word-File Move 60<br>File-Word Move 33 |
| 313 | Seq. Output 124<br>Seq. Load 123<br>Word-File Move 60<br>File-Word Move 33 |
| 314 | Seq. Output 124<br>Seq. Load 123<br>Word-File Move 60<br>File-Word Move 33 |
| 315 | Seq. Output 124<br>Seq. Load 123<br>Word-File Move 60<br>File-Word Move 33 |
| 316 | Seq. Output 124<br>Seq. Load 123<br>Word-File Move 60<br>File-Word Move 33 |
| 317 | Seq. Output 124<br>Seq. Load 123<br>Word-File Move 60<br>File-Word Move 33 |
| 320 | Seq. Output 124<br>Seq. Load 123<br>Word-File Move 60<br>File-Word Move 33 |
| 321 | Seq. Output 124<br>Seq. Load 123<br>Word-File Move 60<br>File-Word Move 33 |
| 322 | Seq. Output 124<br>Seq. Load 123<br>Word-File Move 60<br>File-Word Move 33 |
| 323 | Seq. Output 124<br>Seq. Load 123<br>Word-File Move 60<br>File-Word Move 33 |

| Address | PC operation and references |
|---|---|
| 324 | Seq. Output 124<br>Seq. Load 123<br>Word-File Move 60<br>File-Word Move 33 |
| 325 | Seq. Output 124<br>Seq. Load 123<br>Word-File Move 60<br>File-Word Move 33 |
| 326 | Seq. Output 124<br>Seq. Load 123<br>Word-File Move 60<br>File-Word Move 33 |
| 327 | Seq. Output 124<br>Seq. Load 123<br>Word-File Move 60<br>File-Word Move 33 |
| 330 | Seq. Output 124<br>Seq. Load 123<br>Word-File Move 60<br>File-Word Move 33 |
| 331 | Seq. Output 124<br>Seq. Load 123<br>Word-File Move 60<br>File-Word Move 33 |
| 332 | Seq. Output 124<br>Seq. Load 123<br>Word-File Move 60<br>File-Word Move 33 |
| 333 | Seq. Output 124<br>Seq. Load 123<br>Word-File Move 60<br>File-Word Move 33 |
| 334 | Seq. Output 124<br>Seq. Load 123<br>Word-File Move 60<br>File-Word Move 33 |
| 335 | Seq. Output 124<br>Seq. Load 123<br>Word-File Move 60<br>File-Word Move 33 |
| 336 | Seq. Output 124<br>Seq. Load 123<br>Word-File Move 60<br>File-Word Move 33 |
| 337 | Seq. Output 124<br>Seq. Load 123<br>Word-File Move 60<br>File-Word Move 33 |
| 340 | Seq. Output 124<br>Seq. Load 123<br>Word-File Move 60<br>File-Word Move 33 |
| 341 | Seq. Output 124<br>Seq. Load 123 |

```
Address    PC operation and references
           ---------+---------+--------
           Word-File Move 60
           File-Word Move 33
342
           Seq. Output 124
           Seq. Load 123
           Word-File Move 60
           File-Word Move 33
343
           Seq. Output 124
           Seq. Load 123
           Word-File Move 60
           File-Word Move 33
344
           Seq. Output 124
           Seq. Load 123
           File-Word Move 33
345
           (PUT) 36
           File-Word Move 33
346
           (PUT) 56
           Seq. Output 124
347
           [G] 35
           (+) 34
350
           [<] 35
113/0
           [B] 66
015/00
           ( ) 125
015/01
           ( ) 126
015/02
           ( ) 127
015/03
           ( ) 128
015/04
           ( ) 129
015/05
           ( ) 130
015/06
           ( ) 131
015/07
           ( ) 132
015/10
           ( ) 133
015/11
           ( ) 134
015/12
           ( ) 135
015/13
           ( ) 136
015/14
           ( ) 137
015/15
           ( ) 138
015/16
           ( ) 139
015/17
           ( ) 140
016/00
           ( ) 141
016/01
           ( ) 142
016/02
           ( ) 143
```

```
Address    PC operation and references
---------  -------------------------------

016/03
           ( ) 144
016/04
           ( ) 145
016/05
           ( ) 146
016/06
           ( ) 147
016/07
           ( ) 148
016/10
           ( ) 149
016/11
           ( ) 150
016/12
           ]/[ 29,30
           ( ) 151
016/13
           ( ) 152
016/14
           ( ) 153
016/15
           ( ) 154
016/16
           ( ) 155
016/17
           ( ) 156
017/00
           ( ) 161
017/01
           ( ) 162
017/02
           ( ) 163
017/03
           ( ) 164
017/04
           ( ) 165
017/05
           ( ) 166
017/06
           ( ) 167
017/07
           ( ) 168
017/10
           ( ) 157
017/11
           ( ) 169
017/12
           ( ) 158
017/13
           ( ) 170
017/14
           ( ) 171
017/15
           ( ) 172
017/16
           ( ) 173
020/00
           ] [ 2,3,160
           ( ) 1
020/01
           ] [ 4,29,30
           ( ) 3
020/02
           ] [ 4,5,12,150,155,156,157,158,160,172
           ( ) 4
```

```
20-Mar-85                BOEING PROGRAMMABLE MACHINE CONTROL -- 20-Mar-85
00:42:30                          Full Cross Reference Report
-------------------------------------------------------------------------------

Address    PC operation and references
 -------    ---------+-------+---------
 020/03
            ] [ 133,155,156,172
            ]/[ 8,9
            ( ) 6
 020/04
            ] [ 168
            ( ) 5
 020/05
            ] [ 170
            ( ) 8
 020/06
            ] [ 171
            ( ) 9
 020/07
            ] [ 27,173
            ( ) 12
 020/10
            ] [ 22,103
            ]/[ 100,101,102
            ( ) 13
 020/11
            ] [ 41
            ( ) 7
 020/12
            ] [ 21,23,24,26
            ]/[ 6
            ( ) 24
 020/13
            ] [ 21,23,25,26,28
            ( ) 25
 020/14
            ] [ 11,99,101
            ]/[ 169
            ( ) 10
 020/15
            ] [ 13,22,108,109,110,111,112,113,167
            ]/[ 15,16,17,18,19,20
            ( ) 27
 020/16
            ]/[ 101
            ( ) 103
 020/17
            ] [ 101
            ( ) 104
 021/00
            ] [ 5,6,7,13,29,41,45,46,51,55,58,71,99,149,154,167
            ]/[ 21,28,53,56,65,75
            ( ) 29
 021/01
            ] [ 7,13,15,16,17,18,19,20,28,30,99,108,108,109,109,110,110,111,111,112,112,113,113,149,167
            ]/[ 13,27,28,53
            ( ) 30
 021/02
            ] [ 28,40
            ]/[ 29,30,31
            ( ) 39
 021/03
            ] [ 31,32,33,34,35,37,39,149
            ]/[ 21,23,26,28,36,53,69,70,72,114,115,118,119,120,123,125,126,127,128,129,130,133,134,139,140
            ( ) 31
 021/04
            ] [ 43
            ]/[ 42
            ( ) 43
 021/05
            ] [ 48,50
            ( ) 48
```

```
Address    PC operation and references
---------  ------------------------------

021/06
           ] [ 46
           ]/[ 45
           ( ) 46
021/07
           ] [ 53,54,75,121
           ]/[ 46,57,65
           ( ) 53
021/10
           ] [ 14,15,16,17,18,19,20,21,28,42,43,44,55,61,73,123
           ( ) 64
021/11
           ] [ 55,67,68
           ]/[ 46,58
           ( ) 65
021/12
           ] [ 37,67
           ]/[ 38,68
           ( ) 74
021/13
           ] [ 58,58,71
           ]/[ 29,75,124
           ( ) 58
021/14
           ] [ 51,52
           ]/[ 124
           ( ) 51
022/00
           ] [ 141
           ( ) 76
022/01
           ] [ 142
           ( ) 77
022/02
           ] [ 143
           ( ) 78
022/03
           ] [ 144
           ( ) 79
022/04
           ] [ 145
           ( ) 80
022/05
           ] [ 146
           ( ) 81
022/06
           ] [ 147
           ( ) 82
022/07
           ] [ 148
           ( ) 83
022/10
           ] [ 99
           ]/[ 101
           ( ) 88
022/11
           ] [ 99
           ]/[ 101
           ( ) 93
022/12
           ] [ 99
           ]/[ 101
           ( ) 98
022/13
           ] [ 22,30,46,49,99,100,101,102,103,105,106,107,108,109,110,111,112,113,124,161,162,163,164,165,166,169
           ]/[ 47,50,51,58
           ( ) 99
```

```
Address    PC operation and references

022/14
           ] [ 11,101,122,169
           ]/[ 100,161,162,163,164,165,166,167
           ( ) 101
022/15
           ] [ 105
           ]/[ 103,108,108,109,109
           ( ) 105
022/16
           ] [ 106
           ]/[ 103,110,110,111,111
           ( ) 106
022/17
           ] [ 107
           ]/[ 103,112,112,113,113
           ( ) 107
023/00
           ] [ 13,84,85,125,161,161
           ]/[ 88,88
           ( ) 108
023/01
           ] [ 13,86,87,126,162,162
           ]/[ 88,88
           ( ) 109
023/02
           ] [ 13,89,90,127,163,163
           ]/[ 93,93
           ( ) 110
023/03
           ] [ 13,91,92,128,164,164
           ]/[ 93,93
           ( ) 111
023/04
           ] [ 13,97,129,165,165
           ]/[ 93
           ( ) 112
023/05
           ] [ 13,94,95,96,130,166,166
           ]/[ 98,98,98
           ( ) 113
023/06
           ] [ 22,131,167
           ( ) 114
023/07
           ] [ 5,132
           ( ) 115
023/10
           ] [ 6
           ( ) 116
023/11
           ] [ 134
           ( ) 117
023/12
           ] [ 135
           ( ) 118
023/13
           ] [ 136
           ( ) 119
023/14
           ] [ 137
           ( ) 120
023/15
           ] [ 138
           ( ) 121
023/17
           ] [ 140
           ( ) 122
```

| Address | PC operation and references |
|---|---|
| 030/15 | |
| | ]/[ 99,99 |
| 031/15 | |
| | ] [ 10,167 |
| 031/17 | |
| | ]/[ 99 |
| 032/15 | |
| | ] [ 59 |
| 032/17 | |
| | ] [ 60,61,62 |
| | ]/[ 64,73 |
| 033/15 | |
| | ] [ 88 |
| 033/17 | |
| | ] [ 84 |
| 034/15 | |
| | ] [ 88 |
| 034/17 | |
| | ] [ 85 |
| 035/15 | |
| | ] [ 88 |
| 035/17 | |
| | ] [ 86 |
| 036/15 | |
| | ] [ 88 |
| 036/17 | |
| | ] [ 87 |
| 037/15 | |
| | ] [ 93 |
| 037/17 | |
| | ] [ 89 |
| 040/15 | |
| | ] [ 93 |
| 040/17 | |
| | ] [ 90 |
| 041/15 | |
| | ] [ 93 |
| 041/17 | |
| | ] [ 91 |
| 042/15 | |
| | ] [ 93 |
| 042/17 | |
| | ] [ 92 |
| 043/15 | |
| | ] [ 98 |
| 043/17 | |
| | ] [ 94 |
| 044/15 | |
| | ] [ 98 |
| 044/17 | |
| | ] [ 95 |
| 045/15 | |
| | ] [ 98 |
| 045/17 | |
| | ] [ 96 |
| 046/15 | |
| | ] [ 98 |
| 046/17 | |
| | ] [ 97 |
| 047/15 | |
| | ] [ 23 |
| | ]/[ 51,99 |
| 047/17 | |
| | ]/[ 22 |
| 050/15 | |
| | ] [ 53,54 |
| 050/17 | |
| | ] [ 57 |

BOEING PROGRAMMABLE MACHINE CONTROL -- 20-Mar-85
Full Cross Reference Report

| Address | PC operation and references |
|---------|-----------------------------|
| 051/00  | ] [ 42,42,43,44,119 |
| 052/00  | ] [ 42,44,44,120 |
|         | ]/[ 43 |
| 053/15  | ] [ 101 |
| 054/15  | ] [ 49 |
| 054/17  | ] [ 50 |
|         | ]/[ 46,48 |
| 055/00  | ] [ 15,15,15,15,108,108,108,125 |
|         | ]/[ 16 |
| 056/00  | ] [ 16,16,16,16,109,109,109,126 |
|         | ]/[ 15 |
| 057/00  | ] [ 17,17,17,17,110,110,110,127 |
|         | ]/[ 18 |
| 060/00  | ] [ 18,18,18,18,111,111,111,128 |
|         | ]/[ 17 |
| 061/00  | ] [ 19,19,19,19,112,112,112,129 |
|         | ]/[ 20 |
| 062/00  | ] [ 20,20,20,20,113,113,113,130 |
|         | ]/[ 19 |
| 063/00  | ] [ 21,21,21,21,24,25,114 |
| 064/00  | ] [ 5,23,23,23,24,25,115 |
| 065/00  | ] [ 6,24,25,26,26,26,26,133 |
| 066/00  | ] [ 41,41,139 |
|         | ]/[ 22,41,100,161,162,163,164,165,166 |
| 066/15  | ] [ 39 |
| 067/00  | ] [ 15,16,17,18,19,20,25,28,28,28,28,28,99,105,106,107,108,109,110,111,112,113,134 |
| 070/00  | ] [ 49,49,50,50,50,152 |
|         | ]/[ 47,48,51 |
| 071/00  | ] [ 14,14,140 |
| 072/00  | ] [ 53,55,55,55,55,55,118 |
|         | ]/[ 69 |
| 073/00  | ] [ 59,59,61,73,153 |
|         | ]/[ 63,123 |
| 074/15  | ]/[ 61 |
|         | Word-File Move 60 |
| 075/15  | Seq. Load 123 |
| 075/17  | Seq. Load 123 |
| 076/15  | Seq. Output 124 |
| 076/17  | ] [ 161,162,163,164,165,166 |
|         | Seq. Output 124 |
| 077/15  | |

| Address | PC operation and references |
|---|---|
| | File-Word Move 33 |
| 110/00 | |
| | ] [ 15,16 |
| 110/01 | |
| | ] [ 15,16 |
| 110/02 | |
| | ] [ 17,18 |
| 110/03 | |
| | ] [ 17,18 |
| 110/04 | |
| | ] [ 19,20 |
| 110/05 | |
| | ] [ 19,20 |
| 110/06 | |
| | ] [ 21 |
| 110/07 | |
| | ] [ 23,23,23 |
| 110/10 | |
| | ] [ 26,26,26 |
| 110/11 | |
| | ] [ 28 |
| 110/12 | |
| | ] [ 55 |
| 110/13 | |
| | ] [ 42 |
| 110/14 | |
| | ] [ 44 |
| 110/15 | |
| | ] [ 53,54,55,69 |
| | ]/[ 46,48,51,58,70 |
| 110/16 | |
| | ] [ 39,41 |
| | ]/[ 39 |
| 110/17 | |
| | ] [ 14 |
| 111/00 | |
| | ] [ 29,30,31,41,52,55 |
| | ]/[ 58,71 |
| 111/02 | |
| | ] [ 64,65 |
| | ]/[ 53,72 |
| 111/03 | |
| | ] [ 49 |
| 111/04 | |
| | ] [ 59 |
| 111/05 | |
| | ] [ 4 |
| 111/06 | |
| | ]/[ 4 |
| 111/07 | |
| | ] [ 27 |
| 111/10 | |
| | ] [ 14,21,23,23,24,26,26,28,31,42,42,44,44,55,59,64,69,70,72,73,76,77,78,79,80,81,82,83 |
| | ]/[ 15,16,17,18,19,20,22,23,26,26,42,44,59,160 |
| 111/11 | |
| | ] [ 14,21,23,23,26,26,27,30,41,55,161,162,163,164,165,166 |
| | ]/[ 53,74 |
| 111/12 | |
| | ] [ 5,6,10,15,16,17,18,19,20,21,23,25,26,28,29,41,48,49,55,55,65,71,75,76,77,78,79,80,81,82,83,124,161,162,163,164,165 166 |
| | ]/[ 15,16,17,18,19,20,21,28,39,49 |
| 111/13 | |
| | ] [ 4,6 |
| | ]/[ 26 |
| 111/14 | |
| | ] [ 7 |

| Address | PC operation and references | Address | PC operation and references |
|---|---|---|---|
| 111/15 | | 114/03 | |
| | ]/[ 7 | | ]/[ 151 |
| 111/16 | | 114/04 | |
| | ] [ 4 | | ]/[ 7 |
| 112/00 | | 114/05 | |
| | ] [ 88 | | ]/[ 6,8,9,26,20 |
| | ]/[ 86 | 114/06 | |
| 112/01 | | | ] [ 4 |
| | ] [ 88 | 114/07 | |
| | ]/[ 87 | | ] [ 4 |
| 112/02 | | 121/00 | |
| | ] [ 88 | | ] [ 76 |
| | ]/[ 84 | 121/01 | |
| 112/03 | | | ] [ 77 |
| | ] [ 88 | 121/02 | |
| | ]/[ 85 | | ] [ 78 |
| 112/04 | | 121/03 | |
| | ] [ 93 | | ] [ 79 |
| | ]/[ 91 | 121/04 | |
| 112/05 | | | ] [ 80 |
| | ] [ 93 | 121/05 | |
| | ]/[ 92 | | ] [ 81 |
| 112/06 | | 121/06 | |
| | ] [ 93 | | ] [ 82 |
| | ]/[ 89 | 121/07 | |
| 112/07 | | | ] [ 83 |
| | ] [ 93 | 126/00 | |
| | ]/[ 90 | | ] [ 76 |
| 112/10 | | 126/01 | |
| | ] [ 93 | | ] [ 77 |
| | ]/[ 94 | 126/02 | |
| 112/11 | | | ] [ 78 |
| | ] [ 93 | 126/03 | |
| | ]/[ 95 | | ] [ 79 |
| 112/12 | | 126/04 | |
| | ] [ 93 | | ] [ 80 |
| | ]/[ 96 | 126/05 | |
| 112/13 | | | ] [ 81 |
| | ] [ 93 | 126/06 | |
| | ]/[ 97 | | ] [ 82 |
| 112/14 | | 126/07 | |
| | ]/[ 15,16,104,105 | | ] [ 83 |
| 112/15 | | 345/00 | |
| | ]/[ 19,20,104,107 | | ] [ 108 |
| 112/16 | | 345/01 | |
| | ]/[ 17,18,104,106 | | ] [ 109 |
| 112/17 | | 345/02 | |
| | ]/[ 49 | | ] [ 110 |
| 113/10 | | 345/03 | |
| | ] [ 6,26,26 | | ] [ 111 |
| | ]/[ 26 | 345/04 | |
| 113/11 | | | ] [ 112 |
| | ] [ 6 | 345/05 | |
| 113/12 | | | ] [ 113 |
| | ]/[ 1 | 345/06 | |
| 113/13 | | | ] [ 114 |
| | ] [ 5,23,23 | 345/07 | |
| | ]/[ 23 | | ] [ 115 |
| 113/14 | | 345/10 | |
| | ] [ 5,115 | | ] [ 133 |
| 113/17 | | 345/11 | |
| | ]/[ 99,99,99 | | ] [ 117 |
| 114/00 | | 345/12 | |
| | ] [ 8 | | ] [ 118 |
| 114/01 | | 345/13 | |
| | ] [ 9 | | ] [ 119 |
| 114/02 | | 345/14 | |
| | ] [ 3,167 | | ] [ 120 |

```
BOEING PROGRAMMABLE MACHINE CONTROL -- 20-Mar-85
                    Full Cross Reference Report
---------------------------------------------------------------------------
Address    PC operation and references        Address    PC operation and references
---------  ---------------------------        ---------  ---------------------------
345/15                                        042
           ] [ 121                                       (TON .01) 92
345/17                                        043
           ] [ 122                                       (TON .01) 94
346/00                                        044
           ] [ 100,108                                   (TON .01) 95
           ]/[ 109                            045
346/01                                                   (TON .01) 96
           ] [ 109,109                        046
           ]/[ 108                                       (TON .01) 97
346/02                                        047
           ] [ 110,110                                   (TON 0.1) 100
           ]/[ 111                            050
346/03                                                   (TOF 0.1) 57
           ] [ 111,111                        051
           ]/[ 110                                       (CTU) 42
346/04                                        052
           ] [ 112,112                                   (CTU) 44
           ]/[ 113                            053
346/05                                                   (TON 0.1) 102
           ] [ 113,113                        054
           ]/[ 112                                       (TON 0.1) 59
346/06                                        055
           ] [ 114                                       (CTU) 15
346/07                                        056
           ] [ 115                                       (CTU) 16
346/10                                        057
           ] [ 116                                       (CTU) 17
346/11                                        060
           ] [ 99,103,104,105,106,107,108,109,110,111,112,113,117   (CTU) 18
           ]/[ 10,103,109,110,111,112,113    061
346/12                                                   (CTU) 19
           ] [ 48,51,55,57,58,118             062
           ]/[ 47                                        (CTU) 20
346/13                                        063
           ] [ 45,46,47,48,50,119                        (CTU) 21
346/14                                        064
           ] [ 47,48,50,51,120                           (CTU) 23
           ]/[ 45                             065
346/15                                                   (CTU) 26
           ] [ 57                             066
346/17                                                   (CTU) 41
           ] [ 99,101,102,103,104,122                    (CTR) 40
           ]/[ 10                             067
015                                                      (CTU) 28
           [G] 72                             070
030                                                      (CTU) 49
           (TON 0.1) 11                       071
031                                                      (CTU) 14
           (TON 1.0) 22                       072
032                                                      (CTU) 55
           (TON 0.1) 61                       073
           [G] 62,63                                     (CTU) 59
033                                           074
           (TON .01) 84                                  (PUT) 62,63
034                                                      Word-File Move 60
           (TON .01) 85                       075
035                                                      [G] 70
           (TON .01) 86                                  (PUT) 37,69,73
036                                                      (-) 38
           (TON .01) 87                                  Seq. Load 123
037                                           076
           (TON .01) 89                                  [G] 45,71,75
040                                                      (PUT) 47,52,54,67
           (TON .01) 90                                  (-) 68
041                                                      Seq. Output 124
           (TON .01) 91
```

| Address | PC operation and references | Address | PC operation and references |
|---|---|---|---|
| 077 | | 154 | |
| | [G] 32 | | (TON 0.1) 50 |
| | (PUT) 35 | 155 | |
| | File-Word Move 33 | | (CTU) 15 |
| 120 | | 156 | |
| | [G] 34,37,38,67,68,74 | | (CTU) 16 |
| | (PUT) 66 | 157 | |
| 121 | | | (CTU) 17 |
| | (PUT) 71 | 160 | |
| | (+) 75 | | (CTU) 18 |
| 122 | | 161 | |
| | Seq. Output 124 | | (CTU) 19 |
| 123 | | 162 | |
| | [G] 36,54,56,69,73 | | (CTU) 20 |
| | Word-File Move 60 | 163 | |
| 124 | | | (CTU) 21 |
| | [G] 32,34,38,45,68,70,75 | 164 | |
| | [(] 74 | | (CTU) 23 |
| 125 | | 165 | |
| | [G] 47,52 | | (CTU) 26 |
| | (-) 45 | 166 | |
| 126 | | | (CTU) 41 |
| | (+) 70 | | (CTR) 40 |
| | (-) 32 | 167 | |
| 127 | | | (CTU) 28 |
| | (PUT) 72 | 170 | |
| | Seq. Load 123 | | (CTU) 49 |
| 130 | | 171 | |
| | (TON 0.1) 11 | | (CTU) 14 |
| 131 | | 172 | |
| | (TON 1.0) 22 | | (CTU) 55 |
| 132 | | 173 | |
| | (TON 0.1) 61 | | (CTU) 59 |
| 133 | | 174 | |
| | (TON .01) 84 | | Word-File Move 60 |
| 134 | | 177 | |
| | (TON .01) 85 | | File-Word Move 33 |
| 135 | | 200 | |
| | (TON .01) 86 | | Word-File Move 60 |
| 136 | | | File-Word Move 33 |
| | (TON .01) 87 | 201 | |
| 137 | | | Seq. Output 124 |
| | (TON .01) 89 | | Seq. Load 123 |
| 140 | | | Word-File Move 60 |
| | (TON .01) 90 | | File-Word Move 33 |
| 141 | | 202 | |
| | (TON .01) 91 | | Seq. Output 124 |
| 142 | | | Seq. Load 123 |
| | (TON .01) 92 | | Word-File Move 60 |
| 143 | | | File-Word Move 33 |
| | (TON .01) 94 | 203 | |
| 144 | | | Seq. Output 124 |
| | (TON .01) 95 | | Seq. Load 123 |
| 145 | | | Word-File Move 60 |
| | (TON .01) 96 | | File-Word Move 33 |
| 146 | | 204 | |
| | (TON .01) 97 | | Seq. Output 124 |
| 147 | | | Seq. Load 123 |
| | (TON 0.1) 100 | | Word-File Move 60 |
| 150 | | | File-Word Move 33 |
| | (TOF 0.1) 57 | 205 | |
| 151 | | | Seq. Output 124 |
| | (CTU) 42 | | Seq. Load 123 |
| 152 | | | Word-File Move 60 |
| | (CTU) 44 | | File-Word Move 33 |
| 153 | | 206 | |
| | (TON 0.1) 102 | | Seq. Output 124 |

| Address | PC operation and references | Address | PC operation and references |
|---|---|---|---|
| | Seq. Load 123<br>Word-File Move 60<br>File-Word Move 33 | | Seq. Load 123<br>Word-File Move 60<br>File-Word Move 33 |
| 207 | | 225 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 210 | | 226 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 211 | | 227 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 212 | | 230 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 213 | | 231 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 214 | | 232 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 215 | | 233 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 216 | | 234 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 217 | | 235 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 220 | | 236 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 221 | | 237 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 222 | | 240 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 223 | | 241 | |
| | Seq. Output 124<br>Seq. Load 123<br>Word-File Move 60<br>File-Word Move 33 | | Seq. Output 124<br>Seq. Load 123<br>Word-File Move 60<br>File-Word Move 33 |
| 224 | | | |
| | Seq. Output 124 | | |

| Address | PC operation and references | Address | PC operation and references |
|---------|-----------------------------|---------|-----------------------------|
| 242 | | | Word-File Move 60 |
| | Seq. Output 124 | | File-Word Move 33 |
| | Seq. Load 123 | 260 | |
| | Word-File Move 60 | | Seq. Output 124 |
| | File-Word Move 33 | | Seq. Load 123 |
| 243 | | | Word-File Move 60 |
| | Seq. Output 124 | | File-Word Move 33 |
| | Seq. Load 123 | 261 | |
| | Word-File Move 60 | | Seq. Output 124 |
| | File-Word Move 33 | | Seq. Load 123 |
| 244 | | | Word-File Move 60 |
| | Seq. Output 124 | | File-Word Move 33 |
| | Seq. Load 123 | 262 | |
| | Word-File Move 60 | | Seq. Output 124 |
| | File-Word Move 33 | | Seq. Load 123 |
| 245 | | | Word-File Move 60 |
| | Seq. Output 124 | | File-Word Move 33 |
| | Seq. Load 123 | 263 | |
| | Word-File Move 60 | | Seq. Output 124 |
| | File-Word Move 33 | | Seq. Load 123 |
| 246 | | | Word-File Move 60 |
| | Seq. Output 124 | | File-Word Move 33 |
| | Seq. Load 123 | 264 | |
| | Word-File Move 60 | | Seq. Output 124 |
| | File-Word Move 33 | | Seq. Load 123 |
| 247 | | | Word-File Move 60 |
| | Seq. Output 124 | | File-Word Move 33 |
| | Seq. Load 123 | 265 | |
| | Word-File Move 60 | | Seq. Output 124 |
| | File-Word Move 33 | | Seq. Load 123 |
| 250 | | | Word-File Move 60 |
| | Seq. Output 124 | | File-Word Move 33 |
| | Seq. Load 123 | 266 | |
| | Word-File Move 60 | | Seq. Output 124 |
| | File-Word Move 33 | | Seq. Load 123 |
| 251 | | | Word-File Move 60 |
| | Seq. Output 124 | | File-Word Move 33 |
| | Seq. Load 123 | 267 | |
| | Word-File Move 60 | | Seq. Output 124 |
| | File-Word Move 33 | | Seq. Load 123 |
| 252 | | | Word-File Move 60 |
| | Seq. Output 124 | | File-Word Move 33 |
| | Seq. Load 123 | 270 | |
| | Word-File Move 60 | | Seq. Output 124 |
| | File-Word Move 33 | | Seq. Load 123 |
| 253 | | | Word-File Move 60 |
| | Seq. Output 124 | | File-Word Move 33 |
| | Seq. Load 123 | 271 | |
| | Word-File Move 60 | | Seq. Output 124 |
| | File-Word Move 33 | | Seq. Load 123 |
| 254 | | | Word-File Move 60 |
| | Seq. Output 124 | | File-Word Move 33 |
| | Seq. Load 123 | 272 | |
| | Word-File Move 60 | | Seq. Output 124 |
| | File-Word Move 33 | | Seq. Load 123 |
| 255 | | | Word-File Move 60 |
| | Seq. Output 124 | | File-Word Move 33 |
| | Seq. Load 123 | 273 | |
| | Word-File Move 60 | | Seq. Output 124 |
| | File-Word Move 33 | | Seq. Load 123 |
| 256 | | | Word-File Move 60 |
| | Seq. Output 124 | | File-Word Move 33 |
| | Seq. Load 123 | 274 | |
| | Word-File Move 60 | | Seq. Output 124 |
| | File-Word Move 33 | | Seq. Load 123 |
| 257 | | | Word-File Move 60 |
| | Seq. Output 124 | | File-Word Move 33 |
| | Seq. Load 123 | | |

| Address | PC operation and references | Address | PC operation and references |
|---|---|---|---|
| 275 | Seq. Output 124<br>Seq. Load 123<br>Word-File Move 60<br>File-Word Move 33 | 312 | Seq. Output 124<br>Seq. Load 123<br>Word-File Move 60<br>File-Word Move 33 |
| 276 | Seq. Output 124<br>Seq. Load 123<br>Word-File Move 60<br>File-Word Move 33 | 313 | Seq. Output 124<br>Seq. Load 123<br>Word-File Move 60<br>File-Word Move 33 |
| 277 | Seq. Output 124<br>Seq. Load 123<br>Word-File Move 60<br>File-Word Move 33 | 314 | Seq. Output 124<br>Seq. Load 123<br>Word-File Move 60<br>File-Word Move 33 |
| 300 | Seq. Output 124<br>Seq. Load 123<br>Word-File Move 60<br>File-Word Move 33 | 315 | Seq. Output 124<br>Seq. Load 123<br>Word-File Move 60<br>File-Word Move 33 |
| 301 | Seq. Output 124<br>Seq. Load 123<br>Word-File Move 60<br>File-Word Move 33 | 316 | Seq. Output 124<br>Seq. Load 123<br>Word-File Move 60<br>File-Word Move 33 |
| 302 | Seq. Output 124<br>Seq. Load 123<br>Word-File Move 60<br>File-Word Move 33 | 317 | Seq. Output 124<br>Seq. Load 123<br>Word-File Move 60<br>File-Word Move 33 |
| 303 | Seq. Output 124<br>Seq. Load 123<br>Word-File Move 60<br>File-Word Move 33 | 320 | Seq. Output 124<br>Seq. Load 123<br>Word-File Move 60<br>File-Word Move 33 |
| 304 | Seq. Output 124<br>Seq. Load 123<br>Word-File Move 60<br>File-Word Move 33 | 321 | Seq. Output 124<br>Seq. Load 123<br>Word-File Move 60<br>File-Word Move 33 |
| 305 | Seq. Output 124<br>Seq. Load 123<br>Word-File Move 60<br>File-Word Move 33 | 322 | Seq. Output 124<br>Seq. Load 123<br>Word-File Move 60<br>File-Word Move 33 |
| 306 | Seq. Output 124<br>Seq. Load 123<br>Word-File Move 60<br>File-Word Move 33 | 323 | Seq. Output 124<br>Seq. Load 123<br>Word-File Move 60<br>File-Word Move 33 |
| 307 | Seq. Output 124<br>Seq. Load 123<br>Word-File Move 60<br>File-Word Move 33 | 324 | Seq. Output 124<br>Seq. Load 123<br>Word-File Move 60<br>File-Word Move 33 |
| 310 | Seq. Output 124<br>Seq. Load 123<br>Word-File Move 60<br>File-Word Move 33 | 325 | Seq. Output 124<br>Seq. Load 123<br>Word-File Move 60<br>File-Word Move 33 |
| 311 | Seq. Output 124<br>Seq. Load 123<br>Word-File Move 60<br>File-Word Move 33 | 326 | Seq. Output 124<br>Seq. Load 123<br>Word-File Move 60<br>File-Word Move 33 |

Full Cross Reference Report

| Address | PC operation and references | Address | PC operation and references |
|---|---|---|---|
| 327 | | 337 | |
| | Seq. Output 124 | | Seq. Output 124 |
| | Seq. Load 123 | | Seq. Load 123 |
| | Word-File Move 60 | | Word-File Move 60 |
| | File-Word Move 33 | | File-Word Move 33 |
| 330 | | 340 | |
| | Seq. Output 124 | | Seq. Output 124 |
| | Seq. Load 123 | | Seq. Load 123 |
| | Word-File Move 60 | | Word-File Move 60 |
| | File-Word Move 33 | | File-Word Move 33 |
| 331 | | 341 | |
| | Seq. Output 124 | | Seq. Output 124 |
| | Seq. Load 123 | | Seq. Load 123 |
| | Word-File Move 60 | | Word-File Move 60 |
| | File-Word Move 33 | | File-Word Move 33 |
| 332 | | 342 | |
| | Seq. Output 124 | | Seq. Output 124 |
| | Seq. Load 123 | | Seq. Load 123 |
| | Word-File Move 60 | | Word-File Move 60 |
| | File-Word Move 33 | | File-Word Move 33 |
| 333 | | 343 | |
| | Seq. Output 124 | | Seq. Output 124 |
| | Seq. Load 123 | | Seq. Load 123 |
| | Word-File Move 60 | | Word-File Move 60 |
| | File-Word Move 33 | | File-Word Move 33 |
| 334 | | 344 | |
| | Seq. Output 124 | | Seq. Output 124 |
| | Seq. Load 123 | | Seq. Load 123 |
| | Word-File Move 60 | | File-Word Move 33 |
| | File-Word Move 33 | 345 | |
| 335 | | | (PUT) 36 |
| | Seq. Output 124 | | File-Word Move 33 |
| | Seq. Load 123 | 346 | |
| | Word-File Move 60 | | (PUT) 56 |
| | File-Word Move 33 | | Seq. Output 124 |
| 336 | | 347 | |
| | Seq. Output 124 | | [C] 35 |
| | Seq. Load 123 | | [+] 34 |
| | Word-File Move 60 | 350 | |
| | File-Word Move 33 | | [C] 35 |
| | | 113/0 | |
| | | | [B] 66 |

Data Table Listing

| Address | Contents in Decimal | | | | | | | |
|---|---|---|---|---|---|---|---|---|
| | —00— | —01— | —02— | —03— | —04— | —05— | —06— | —07— |
| 000 | 0 | 0 | 0 | 0 | 0 | 0 | 0 | 0 |
| 010 | 0 | 0 | 0 | 0 | 0 | 0 | 0 | 0 |
| 020 | 0 | 0 | 0 | 0 | 0 | 0 | 0 | 0 |
| 030 | 0 | 0 | 0 | 0 | 0 | 0 | 0 | 0 |
| 040 | 0 | 0 | 0 | 0 | 0 | 0 | 0 | 0 |
| 050 | 1 | 8466 | 8456 | 0 | 0 | 13616 | 13106 | 12436 |
| 060 | 12834 | 8208 | 13184 | 14434 | 13704 | 13936 | 0 | 14440 |
| 070 | 13316 | 12304 | 14694 | 12336 | 0 | 0 | 9 | 1 |
| 100 | 0 | 0 | 0 | 0 | 0 | 0 | 0 | 0 |
| 110 | 0 | 8704 | -65 | 1024 | 140 | 0 | 0 | 0 |
| 120 | 0 | 16 | -16335 | 0 | 1 | 4 | 0 | 0 |
| 130 | 16 | 3 | 153 | 16 | 16 | 16 | 16 | 16 |
| 140 | 16 | 16 | 16 | 16 | 16 | 16 | 16 | 5 |
| 150 | 1 | 0 | 0 | 4 | 5 | 2457 | 2457 | 2457 |
| 160 | 2457 | 0 | 2457 | 2457 | 2457 | 2457 | 2 | 2457 |
| 170 | 2457 | 2457 | 2457 | 2457 | 256 | 256 | 256 | 257 |
| 200 | 0 | 0 | 0 | 0 | 0 | 0 | 0 | 0 |
| 210 | 0 | 0 | 0 | 0 | 0 | 0 | 0 | 0 |
| 220 | 0 | 0 | 0 | 0 | 0 | 0 | 0 | 0 |

```
20-Mar-85         BOEING PROGRAMMABLE MACHINE CONTROL -- 20-Mar-85
00:42:30                       Data Table Listing
```

| Address | Contents in Decimal |     |     |     |     |     |     |     |
|---------|---------------------|-----|-----|-----|-----|-----|-----|-----|
| 230     | 0                   | 0   | 0   | 0   | 0   | 0   | 0   | 0   |
| 240     | 0                   | 0   | 0   | 0   | 0   | 0   | 0   | 0   |
| 250     | 0                   | 0   | 0   | 0   | 0   | 0   | 0   | 0   |
| 260     | 0                   | 0   | 0   | 0   | 0   | 0   | 0   | 0   |
| 270     | 0                   | 0   | 0   | 0   | 0   | 0   | 0   | 0   |
| 300     | 0                   | 0   | 0   | 0   | 0   | 0   | 0   | 0   |
| 310     | 0                   | 0   | 0   | 0   | 0   | 0   | 0   | 0   |
| 320     | 0                   | 0   | 0   | 0   | 0   | 0   | 0   | 0   |
| 330     | 0                   | 0   | 0   | 0   | 0   | 0   | 0   | 0   |
| 340     | 0                   | 0   | 0   | 0   | 0   | 0   | 0   | 1   |
| 350     | 257                 | 0   | 0   | 0   | 0   | 0   | 0   | 0   |
| 360     | 0                   | 0   | 0   | 0   | 0   | 0   | 17  | 0   |
| 370     | 0                   | 0   | 0   | 0   | 0   | 0   | 0   | 0   |

```
20-Mar-85         BOEING PROGRAMMABLE MACHINE CONTROL -- 20-Mar-85
00:42:30                   Data Handling Report - Messages
```

Message #            Message text
--------             ------------

---- No messages ----

```
20-Mar-85         BOEING PROGRAMMABLE MACHINE CONTROL -- 20-Mar-85
00:42:30            Xycom 4820 LDT   Release 4.3    Allen-Bradley
```

PROGRAM INFORMATION

```
    PC Program name ........... : BOEINGJB
    Description ............... : BOEING PROGRAMMABLE MACHINE CONTROL
    Date/time stored on disk .. : 20-Mar-85 at 00:13:49
    PC type ................... : Allen-Bradley PLC-2 series
    Program size .............. : 1562
    Data table size ........... : 256
```

LISTING INFORMATION

```
    Time at which listing finished ......... : 03:22:16
    Ladder listing uses .................... : rung numbers
    Cross reference data ................... : shown to right
    Closest control for each element ....... : shown
    Maximum number of elements per line .... : 11
    Maximum cross references listed per rung : 0
    Implied cross references ............... : included
    One rung per page ...................... : no
    Lines per page ......................... : 60
    Data table listing format .............. : decimal
```

REPORT TABLE OF CONTENTS

```
    Ladder diagram ......................... : 1
    Address usage report ................... : 29
    Unreferenced description report ........ : 31
    Undefined description report ........... : 32
    Full cross reference report ............ : 60
    Data table listing ..................... : 88
    Data handling report ................... : 89
```

```
20 ... -85                    BOEING PROGRAMMABLE MACHINE CONTROL -- 20-Mar-85
00:42:30                      Xycom 4820 LDT Release 4.3    Allen-Bradley
-----------------------------------------------------------------------------

PROGRAM INFORMATION
    -----------------------

LADDER LISTING SYMBOL KEY
    -------------------------

!27 character                              ! output
        !contact                                   ! coil
        !description                               ! description
        !   aaaaa         aaaaa         aaaaa      !
    bbbb +---]/[---------...] [...-----------------( )---+ optional
        !ccc                                       ! cross
        !                                          ! reference aaaaa = Contact address
        bbbb  = Line or rung number
        ccc   = Closest line or rung number where this
                contact is an output coil
        ...   = Marks a contact that is a real I/O address

ADDRESS USAGE REPORT SYMBOL KEY
    -------------------------------

.  = Address not used in program and not assigned as real I/O
        $  = Address used in program but not assigned as real I/O
        0  = Address not used in program but is assigned as real I/O
        *  = Address used in program and assigned as real I/O
```

What is claimed is:

1. A method for the "open loop" control of a machine whose functions are operated by a microprocessor, comprising the following steps:
preprogramming said microprocessor to operate said machine in accordance with an operator control program entered by a machine operator;
providing motion limiter means for setting certain positions at which machine movement is to be limited;
providing a control panel having a plurality of machine function controls corresponding to desired machine functions which a machine operator may want said machine to perform, wherein such functions may include certain machine movements and certain work operations;
using said control panel to enter said operator control program into said microprocessor, including performing the following steps in sequence:
(1) activating at least some of said controls on said control panel corresponding to certain machine functions which said operator wants performed by said machine;
(2) displaying on said control panel said activated controls;
(3) entering into said microprocessor the machine functions corresponding to said activated controls, such entry being one step of said operator control program; and
(4) sequentially entering additional steps of said program in the manner set forth in steps 1-3, and after said steps are entered;
running said operator control program, wherein said microprocessor executes the steps of said control program, said microprocessor executing a step that includes a movement function by moving said machine in the direction commanded during such step, said microprocessor being responsive to said motion limiter means to limit motion of said machine in accordance with position limits set by said motion limiter means, and with said microprocessor executing a step that includes a work operation function by causing said machine to perform said work operation during such step, and continuing to cause said machine to perform such work operation until such work operation is cancelled in another step of said control program; and
displaying each step on said control panel while it is being executed by said microprocessor.

2. The method in accordance with claim 1, including:
providing said control panel with machine function controls comprising a plurality of push buttons, some push buttons corresponding to certain desired machine movements, and other push buttons corresponding to certain desired machine work operations;
illuminating with light each push button when it is activated;

extinguishing the light illuminating each activated push button when its associated machine function is entered into said microprocessor;

and further, when said operator control program is executed by said microprocessor, illuminating the corresponding push button for each movement and work operation function executed during a particular step of said operator control program while such step is executed, to indicate to said machine operator the machine functions being performed as said machine operates.

3. The method in accordance with claim 2, including:

providing machine function controls for inputting a subcycle operation into said operator control program, said subcycle operation permitting said microprocessor to repeatedly execute preselected steps of said control program;

providing subcycle limiter means for setting limitations on machine movements and operations when a subcycle operation is executed by said microprocessor, wherein said microprocessor is responsive to said subcycle limiter means to cancel said subcycle operation in accordance with the limits set by said subcycle limiter means.

4. The method in accordance with claim 3, including:

providing dwell time between each executed step of said operator control program.

5. The method in accordance with claim 4, including:

providing a manual override means for permitting said machine operator to directly control machine functions independently of said control program.

6. The method in accordance with claim 5, including editing said operator control program by:

selecting a program step which is to be edited;

displaying said step on said control panel, wherein said control panel push buttons associated with the machine functions of such step are illuminated on said control panel;

editing said step by replacing at least some of the machine functions originally entered into said step, by activating and/or deactivating said push buttons until only desired machine functions are displayed;

entering said desired machine functions displayed on said control panel into said microprocessor, wherein such entering places said edited step back into said control program at the same place in said program that said step was in prior to editing.

7. The method in accordance with claim 1, including editing said operator control program by:

selecting a step of said operator control program which is to be edited;

displaying said step on said control panel;

editing said step by replacing at least some of the machine functions originally entered into said step, by activating and/or deactivating appropriate machine function controls until only desired machine functions are displayed;

entering said desired machine functions displayed on said control panel into said microprocessor, wherein such entering places said edited step into said control program at the same place said step was in prior to editing.

8. The method in accordance with claim 1, including:

providing a manual override means for permitting said machine operator to directly control machine functions independently of said control program.

9. The method in accordance with claim 1, including:

providing dwell time between each executed step of said operator control program.

10. The method in accordance with claim 1, including:

providing machine function controls for inputting a subcycle operation into said operator control program, said subcycle operation permitting said microprocessor to repeatedly execute certain preselected steps of said control program;

providing subcycle limiter means for setting limitations on machine movements and operations when a subcycle operation is executed by said microprocessor, wherein said microprocessor is responsive to said subcycle limiter means to cancel said subcycle operation in accordance with the limits set by said subcycle limiter means.

* * * * *